US012807073B2

United States Patent
(12) United States Patent
Imamura et al.

(10) Patent No.: US 12,807,073 B2
(45) Date of Patent: Nov. 24, 2026

(54) DISPLAY SYSTEM

(71) Applicant: Panasonic Automotive Systems Co., Ltd., Kanagawa (JP)

(72) Inventors: Norihiro Imamura, Osaka (JP); Kenji Nagatomi, Osaka (JP); Keiichi Matsuzaki, Kyoto (JP); Yusuke Nihei, Tokyo (JP); Michihiro Yamagata, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/185,783

(22) Filed: Apr. 22, 2025

(65) Prior Publication Data

US 2025/0381914 A1 Dec. 18, 2025

(30) Foreign Application Priority Data

Jun. 14, 2024 (JP) ................................ 2024-096377
Nov. 5, 2024 (JP) ................................ 2024-193612

(51) Int. Cl.
*B60R 1/25* (2022.01)
*B60R 1/26* (2022.01)

(52) U.S. Cl.
CPC .................. *B60R 1/25* (2022.01); *B60R 1/26* (2022.01); *B60R 2300/8026* (2013.01); *B60R 2300/8093* (2013.01)

(58) Field of Classification Search
CPC ..... B60R 1/25; B60R 1/26; B60R 2300/8026; B60R 2300/8093
See application file for complete search history.

(56) References Cited

U.S. PATENT DOCUMENTS

| | | | | |
|---|---|---|---|---|
| 2010/0194596 A1* | 8/2010 | Wang | B60R 1/27 340/936 |
| 2012/0140074 A1 | 6/2012 | Taguchi et al. | |
| 2015/0183373 A1* | 7/2015 | Hayasaka | B60K 35/215 345/660 |
| 2017/0349173 A1* | 12/2017 | Nishiguchi | B60W 30/09 |
| 2024/0001850 A1* | 1/2024 | Nakamura | B60R 1/24 |
| 2024/0426623 A1* | 12/2024 | Gamalath | G01C 21/3602 |
| 2025/0271929 A1* | 8/2025 | Nowinski | B60K 35/235 |

FOREIGN PATENT DOCUMENTS

| | | | |
|---|---|---|---|
| CN | 102271964 A * | 12/2011 | B60Q 1/2665 |
| JP | 2010-183170 | 8/2010 | |
| JP | 2012-116357 | 6/2012 | |
| JP | 2018-176874 | 11/2018 | |

* cited by examiner

*Primary Examiner* — Michael Lee
(74) *Attorney, Agent, or Firm* — Greenblum & Bernstein, P.L.C.

(57) ABSTRACT

A display system includes a first display device that displays a display image ahead of a user in a vehicle, and a controller that causes the first display device to display a surround view image obtained by an imager that captures an image of a surrounding area of the vehicle. The controller controls the first display device to display an emphatic display in which one of the surround view image displayed by the first display device or at least a part of a periphery of the surround view image is displayed more emphatically relative to the other.

19 Claims, 45 Drawing Sheets

DISPLAY SYSTEM

CROSS REFERENCE TO RELATED APPLICATION

The present application is based on and claims priority of Japanese Patent Application No. 2024-096377 filed on Jun. 14, 2024, and Japanese Patent Application No. 2024-193612 filed on Nov. 5, 2024.

FIELD

The present disclosure relates to a display system.

BACKGROUND

Patent Literature (PTL) 1 discloses a monitor (a display system) that displays an image captured by a left view camera that captures an image of the space at the rear left of the vehicle and an image captured by a right view camera that captures an image of the space at the rear right of the vehicle.

CITATION LIST

Patent Literature

PTL 1: Japanese Unexamined Patent Application Publication No. 2018-176874

SUMMARY

However, the display system above can be improved upon.

In view of this, the present disclosure provides a display system capable of improving upon the above related art.

A display system according to one aspect of the present disclosure includes: a first display device that displays a display image ahead of a user in a vehicle; and a controller that causes the first display device to display a surround view image obtained by an imager that captures an image of a surrounding area of the vehicle, wherein the controller controls the first display device to display an emphatic display in which one of the surround view image displayed by the first display device or at least a part of a periphery of the surround view image is displayed more emphatically relative to an other of the surround view image displayed by the first display device or at least the part of the periphery of the surround view image.

A display system according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
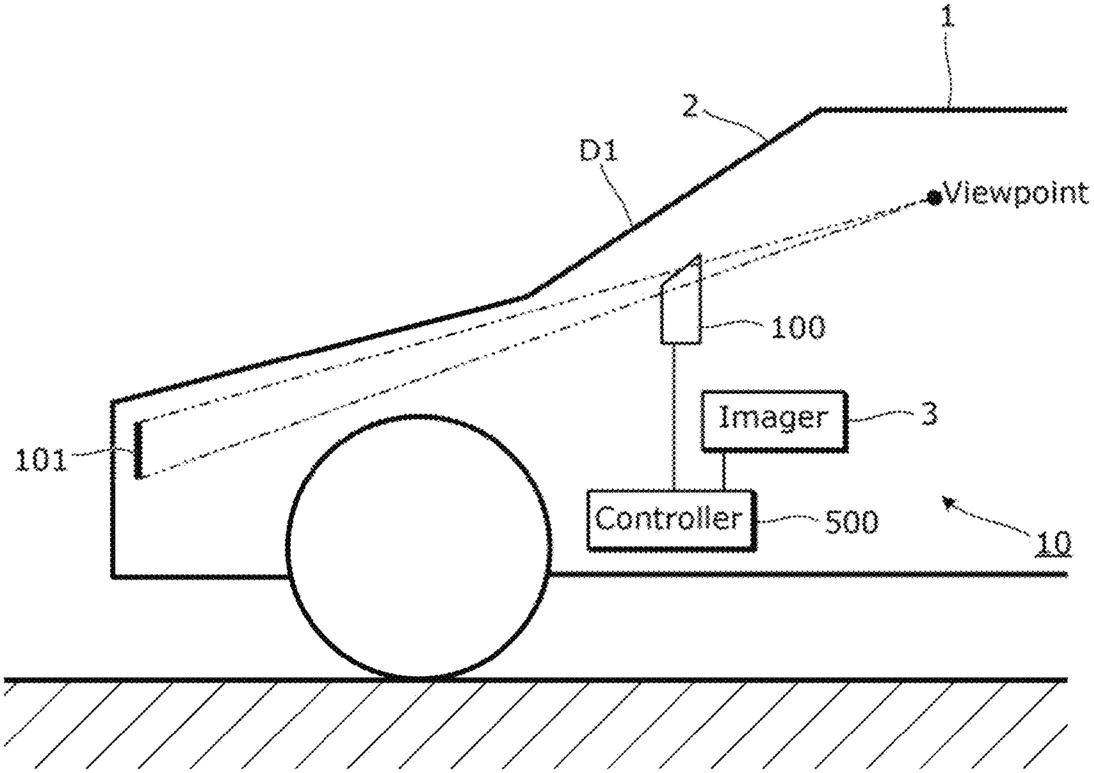
FIG. 1 is a schematic diagram showing a state in which a display system according to Embodiment 1 is provided in a vehicle.

DESCRIPTION OF EMBODIMENTS (Underlying Knowledge Forming Basis of the Present Disclosure)

In recent years, there has been a demand that a user concentrated on driving wants to grasp intuitively which direction an image displayed in a display system corresponds to. In other words, the present disclosure provides a display system that makes it possible for a user to grasp intuitively which direction a displayed image corresponds to.

A display system according to one aspect of the present disclosure includes a first display device that displays a display image ahead of a user in a vehicle, and a controller that causes the first display device to display a surround view image obtained by an imager that captures an image of a surrounding area of the vehicle. The controller controls the first display device to display an emphatic display in which one of the surround view image displayed by the first display device or at least a part of a periphery of the surround view image is displayed more emphatically relative to an other of the surround view image displayed by the first display device or at least the part of the periphery of the surround view image.

According to this configuration, the surround view image is displayed more emphatically relative to the at least part of the periphery of the surround view image, or the at least part of the periphery of the surround view image is displayed more emphatically relative to the surround view image. Therefore, this configuration makes it possible to inform the user which direction the displayed surround view image corresponds to, based on the position or the shape of the emphatic display. Accordingly, this configuration makes it possible for the user to grasp intuitively which direction the displayed surround view image corresponds to.

Furthermore, the controller may control the first display device to display an emphatic display in which one of the surround view image or at least a part of an edge image surrounding the periphery of the surround view image is displayed more emphatically relative to an other of the surround view image or at least the part of the edge image surrounding the periphery of the surround view image.

According to this configuration, the surround view image is displayed more emphatically relative to the at least part of the edge image, or the at least part of the edge image is displayed more emphatically relative to the surround view image. Therefore, this configuration makes it possible to inform the user which direction the displayed surround view image corresponds to, based on the position or the shape of the emphatic display.

Furthermore, when the controller causes the first display device to display a frame image showing a side view mirror frame of the vehicle as the edge image, the controller may use, of an image captured by the imager, a rear view image showing a space behind the vehicle as the surround view image, and cause the first display device to display the surround view image within a region corresponding to a mirror in the frame image.

According to this configuration, along with the frame image showing the side view mirror frame, the rear view image is displayed, as the surround view image, within the region corresponding to the mirror in the frame image. Therefore, this configuration makes it possible to show the side view mirror frame and a mirror image in the side view mirror in the form of an image. Accordingly, this configuration makes it possible for the user to grasp more intuitively which direction the displayed rear view image corresponds to by looking at the frame image and the rear view image. Displaying the frame image can keep the user from mistaking the rear view image for an image showing the space ahead of the vehicle.

Furthermore, the controller may control the first display device to display the emphatic display by blurring the periphery of the surround view image.

According to this configuration, the emphatic display can be realized by blurring the periphery of the surround view image.

Furthermore, the controller may cause the first display device to display, along with the frame image, an arm image showing an arm extending from the side view mirror frame.

According to this configuration, the arm image and the frame image are displayed. Therefore, this configuration makes it possible for the user to grasp more intuitively which direction the displayed image corresponds to, based on the arm image.

Furthermore, the controller may cause the first display device to display, along with the frame image, an interior image showing an interior of the vehicle.

According to this configuration, the interior image and the frame image are displayed. Therefore, this configuration makes it possible for the user to grasp more intuitively which direction the displayed image corresponds to, based on the interior image.

Furthermore, the controller may cause the first display device to display the frame image in which the side view mirror frame is rendered realistically.

According to this configuration, the frame image renders the side view mirror frame realistically, and this realistic frame image can increase the sense of realism.

Furthermore, the controller may cause the first display device to display, along with the frame image, a vehicle body image showing a vehicle body of the vehicle.

According to this configuration, the vehicle body image and the frame image are displayed. Therefore, this configuration makes it possible for the user to grasp more intuitively which direction the displayed image corresponds to, based on the vehicle body image.

Furthermore, the controller may cause the first display device to display, along with the frame image, a lighting image showing a lighting state of a blinker of the vehicle.

According to this configuration, the lighting image is displayed. Therefore, this configuration makes it possible for the user to grasp the lighting state of the blinker, based on the lighting image.

Furthermore, the controller may cause the first display device to display the frame image with an aspect ratio different from an aspect ratio of the side view mirror frame.

According to this configuration, the aspect ratio of the frame image differs from the aspect ratio of the side view mirror frame. Therefore, this configuration makes it possible to display an image with a wider angle in the vertical direction or in the horizontal direction within the frame image.

Furthermore, the controller may cause the first display device to display, of an image captured by the imager, a front view image showing a space ahead of the vehicle in a background of the frame image.

According to this configuration, the front view image is displayed in the background of the frame image, and this can increase the sense of realism.

Furthermore, the controller may control the first display device to vary a background color of the frame image in accordance with an environment surrounding the vehicle.

According to this configuration, the background color is varied in accordance with the environment surrounding the vehicle. Therefore, this configuration makes it possible for the user to grasp the environment surrounding the vehicle simply by recognizing the background color.

Furthermore, the controller may cause the first display device to display, of the surround view image, a front view image showing a space ahead of the vehicle next to the frame image.

According to this configuration, the front view image and the frame image are displayed, and thus a rear view image and a front view image can be displayed at once. Accordingly, this configuration makes it possible for the user to grasp simultaneously the rear view image and the front view image.

Furthermore, the frame image may include a right frame image showing the side view mirror frame disposed on a right side of the vehicle, and a left frame image showing the side view mirror frame disposed on a left side of the vehicle, and the controller may control the first display device to display the right frame image on a right side and the left frame image on a left side.

According to this configuration, the right frame image is displayed on the right side, and the left frame image is displayed on the left side. Therefore, this configuration makes it possible for the user to grasp more intuitively which direction the displayed surround view image corresponds to, based on the display layout.

Furthermore, the controller may control the first display device to display the right frame image and the left frame image in a horizontally asymmetric manner.

According to this configuration, the right frame image and the left frame image are horizontally asymmetric. Therefore, this configuration makes it possible for the user to grasp more intuitively which direction the displayed image corresponds to, based on the shape of the frame image.

Furthermore, the controller may control the first display device to display the right frame image close to an upper right portion of a display region of the first display device and to display the left frame image close to an upper left portion of the display region of the first display device.

According to this configuration, for example, the right frame image is displayed close to the upper right portion of the display region of the first display device. Therefore, this configuration can reduce the amount of movement of the gaze in the up-down direction experienced when the user looking ahead of the vehicle moves his or her gaze to the right frame image. Accordingly, the configuration above can reduce the stress that the user experiences when moving his or her gaze. This also applies in a similar manner to the left frame image.

Furthermore, when an alarming object is displayed in the surround view image, the controller may cause the first display device to display the alarming object emphatically.

According to this configuration, an alarming object within the surround view image is displayed emphatically. Therefore, this configuration makes it possible for the user to grasp intuitively the alarming object.

Furthermore, the controller may cause the first display device to display the surround view image that is distorted.

According to this configuration, a distorted surround view image is displayed. Therefore, this configuration makes it possible for the user to grasp that a wide-angle image is displayed.

The controller may cause the first display device to display, along with the surround view image, an icon showing a situation surrounding the vehicle.

According to this configuration, an icon showing the situation surrounding the vehicle is displayed along with the surround view image. Therefore, this configuration makes it possible for the user to grasp easily the situation surrounding the vehicle based on the icon.

Furthermore, the controller may cause the first display device to display the surround view image in conjunction with navigation information for the vehicle.

According to this configuration, the surround view image is displayed in conjunction with the navigation information. Therefore, this configuration makes it possible for the user to grasp at once the navigation information and the surround view image.

Furthermore, the controller may control the first display device to use a scrolling effect when switching between a reference image and an auxiliary image including the surround view image.

According to this configuration, the reference image and the auxiliary image are switched therebetween through scrolling. Therefore, this configuration makes it possible for the user to realize that the switching has been executed without any sense of discomfort.

Furthermore, the first display device may display the display image by projecting a first virtual image ahead of the user, and the first virtual image may be positioned ahead of the first display device, as viewed from the user.

According to this configuration, the first virtual image, or the display image, is positioned ahead of the first display device. Therefore, this configuration can reduce the stress that the user looking ahead of the vehicle experiences when moving his or her gaze to the first virtual image. Furthermore, since the display image is the first virtual image, this configuration can add the sense of depth to the display image, as compared to the case in which the user directly looks at a surround view image displayed on a planar display surface.

Furthermore, the display system may further include a second display device that projects a second virtual image ahead of the user and above the display image, and the controller may control the second display device to project the second virtual image that includes a guiding image for guiding a gaze of the user to the surround view image.

According to this configuration, the second virtual image includes the guiding image, and the guiding image can guide the user's gaze to the surround view image in the display image. Accordingly, this configuration makes it possible for the user to move his or her gaze smoothly to the surround view image.

Furthermore, the controller may control the first display device to display the edge image that differs visually between when a predetermined condition is not satisfied and when the predetermined condition is satisfied.

According to this configuration, the edge image differs visually between when the predetermined condition is not satisfied and when the predetermined condition is satisfied. Therefore, this configuration makes it possible for the user to grasp whether the predetermined condition is satisfied by looking at the difference.

Furthermore, the controller may control the first display device to display the edge image that differs in size between when the predetermined condition is not satisfied and when the predetermined condition is satisfied.

According to this configuration, the edge image differs in size between when the predetermined condition is not satisfied and when the predetermined condition is satisfied. Therefore, this configuration makes it possible for the user to grasp whether the predetermined condition is satisfied by looking at the difference.

Furthermore, the controller may control the first display device to display the edge image that differs in frame line thickness between when the predetermined condition is not satisfied and when the predetermined condition is satisfied.

According to this configuration, the edge image differs in frame line thickness between when the predetermined condition is not satisfied and when the predetermined condition is satisfied. Therefore, this configuration makes it possible for the user to grasp whether the predetermined condition is satisfied by looking at the difference.

Furthermore, the controller may control the first display device to display or not to display the edge image depending on whether the predetermined condition is satisfied.

According to this configuration, the edge image is displayed or is not displayed depending on whether the predetermined condition is satisfied. Therefore, this configuration makes it possible for the user to grasp whether the predetermined condition is satisfied by looking at the difference.

Furthermore, the controller may control the first display device to display the edge image that differs in color between when the predetermined condition is not satisfied and when the predetermined condition is satisfied.

According to this configuration, the edge image differs in color between when the predetermined condition is not satisfied and when the predetermined condition is satisfied. Therefore, this configuration makes it possible for the user to grasp whether the predetermined condition is satisfied by looking at the difference.

Furthermore, the controller may control the first display device to display the edge image that differs in background between when the predetermined condition is not satisfied and when the predetermined condition is satisfied.

According to this configuration, the edge image differs in background between when the predetermined condition is not satisfied and when the predetermined condition is satisfied. Therefore, this configuration makes it possible for the user to grasp whether the predetermined condition is satisfied by looking at the difference.

Furthermore, when the controller causes the first display device to display a pillar image showing a pillar of the vehicle as the edge image, the controller may use, of an image captured by the imager, a front view image showing a space ahead of the vehicle as the surround view image, and cause the first display device to display the surround view image within the pillar image.

According to this configuration, the front view image is displayed within the pillar image as the surround view image. Therefore, this configuration can achieve an emphatic display in the pillar image or the surround view image as well. Accordingly, the pillar image as well makes it possible for the user to grasp intuitively which direction the displayed surround view image corresponds to.

Furthermore, when the controller causes the display device to display a hood image showing a hood of the vehicle as the edge image, the controller may use, of an image captured by the imager, a front view image showing a space ahead of the vehicle as the surround view image, and cause the display device to display the surround view image within the hood image.

According to this configuration, the front view image is displayed within the hood image as the surround view image. Therefore, this configuration can display an emphatic display in the hood image or the front view image as well. Accordingly, the hood image as well makes it possible for the user to grasp intuitively which direction the displayed front view image corresponds to.

Furthermore, the display system may further include a receiver that receives, from the user, a shape specification specifying a shape of the edge image, and the controller may control the first display device to display the edge image matching the shape specification received by the receiver.

According to this configuration, an edge image having a shape matching the shape specification received by the receiver is displayed. Therefore, an edge image matching the user's preference can be displayed. Accordingly, the configuration above can increase the usability.

(Embodiments)

Hereinafter, some embodiments will be described in specific terms with reference to the drawings. It is to be noted that the embodiments described hereinafter all illustrate specific examples of the present disclosure. The numerical values, the shapes, the materials, the constituent elements, the arrangement positions and the connection modes of the constituent elements, the steps, the order of the steps, and so on illustrated according to the following embodiments are examples and are not intended to limit the present disclosure. Furthermore, among the constituent elements according to the following embodiments, any constituent elements that are not cited in the independent claims expressing the broadest concept are to be construed as optional constituent elements.

In the following description of the embodiments, terms, such as "parallel" and "orthogonal", that describe a relative orientation of two directions may be used, but these terms encompass cases in which the two directions are not strictly in the relationship referred to by a given term. For example, when two directions are said to be parallel, this means, unless particularly indicated otherwise, not only that these two directions are exactly parallel but also that these two directions are substantially parallel. That is, the expression encompasses a case in which there are a few percentages of error, for example. Each of the optical paths illustrated in the drawings according to the following embodiments is to show a theoretical path and is not necessarily to reflect an actual optical path.

Embodiment 1

FIG. 1 is a schematic diagram showing a state in which display system 10 according to Embodiment 1 is provided in vehicle 1. In FIG. 1, vehicle 1 is shown in section.

As shown in FIG. 1, display system 10 includes first display device 100 and controller 500. First display device 100 is disposed, for example, in the dashboard of vehicle 1. First display device 100 displays, for example, vehicle information pertaining to vehicle 1 in the form of first virtual image 101. Examples of the vehicle information include, for example, the vehicle speed of vehicle 1, the rate of rotation of the engine, a detection result of an object approaching vehicle 1, navigation information from the current location of vehicle 1 to a destination, and image information showing an image captured by a camera that captures an image of the space behind or around vehicle 1. Note that, although FIG. 1 shows an example case in which first display device 100 is disposed in the dashboard, the location where first display device 100 is installed is not limited by this example. For example, first display device 100 may instead be disposed near the upper end of windshield 2, in the center console, or the like.

[First Display Device]

As shown in FIG. 1, first display device 100 projects image light toward a user of display system 10, that is, the driver. The driver perceives the image light entering his or her eyes as first virtual image 101 appearing far beyond opening 121 (see FIG. 2) of first display device 100. First virtual image 101 is one example of a display image displayed ahead of the driver.

Figure 2:
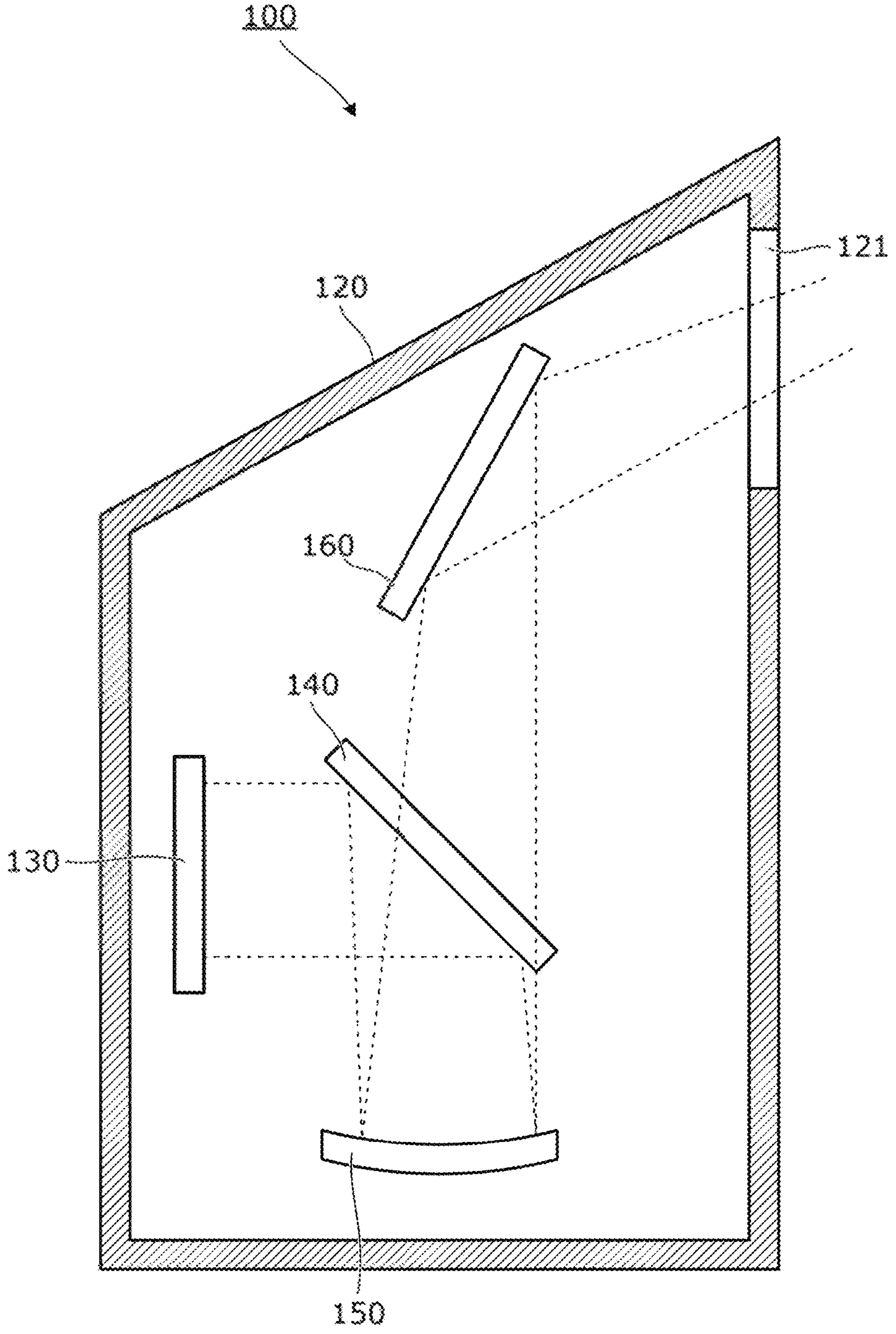
FIG. 2 is a schematic sectional view showing a first display device according to Embodiment 1.

FIG. 2 is a schematic sectional view showing first display device 100 according to Embodiment 1. As shown in FIG. 2, first display device 100 includes housing 120, display element 130, polarizing half-silvered mirror 140, first reflective mirror 150, and second reflective mirror 160. Polarizing half-silvered mirror 140, first reflective mirror 150, and second reflective mirror 160 constitute an optical system for projecting image light from display element 130 to form first virtual image 101.

Housing 120 is a box-shaped member formed of a light blocking resin or metal. Opening 121, which faces rearward, is formed in the upper end portion of the rear part of housing 120 (the right direction of FIG. 2 is defined as the rear part or the rearward direction). Image light to form first virtual image 101 is projected through opening 121. The inner space of housing 120 houses display element 130, polarizing half-silvered mirror 140, first reflective mirror 150, and second reflective mirror 160.

Display element 130 is, for example, a liquid crystal panel, and when illuminated with light from a light source (not shown), emits image light that forms first virtual image 101 toward polarizing half-silvered mirror 140. Display element 130 may be an organic electroluminescent (EL) panel. Display element 130 is disposed in an orientation in which the display surface of display element 130 faces rearward. Although the illustration is omitted, the display surface of display element 130 is laminated with a quarter-wave retardation plate (abbreviated below as a quarter-wave plate). The quarter-wave plate is a quarter-wave retardation plate that causes a phase difference of a quarter of wavelength A to the light incident on the quarter-wave plate. For example, when light emitted from the display surface is linearly polarized light of S polarization, this light, by passing through the quarter-wave plate, is converted to circularly polarized light.

Polarizing half-silvered mirror 140 is configured to reflect P-polarized light and to transmit S-polarized light, and is constituted by a planar glass substrate provided with a reflective polarizing plate. Furthermore, the surface of polarizing half-silvered mirror 140 is laminated with a quarter-wave plate. Polarizing half-silvered mirror 140 is disposed in an orientation in which polarizing half-silvered mirror 140 faces display element 130 and first reflective mirror 150. The image light of S polarization emitted from display element 130 is converted to circularly polarized light by the quarter-wave plate on display element 130, and the resulting circularly polarized light travels toward polarizing half-silvered mirror 140. This image light of circular polarization is converted to P-polarized light by the quarter-wave plate on polarizing half-silvered mirror 140, and the resulting P-polarized light is reflected by a reflective polarizing plate of polarizing half-silvered mirror 140. The reflected image light of P polarization, by being transmitted through the quarter-wave plate again, is converted to circularly polarized light. In this manner, polarizing half-silvered mirror 140 is disposed in an orientation in which, with the quarter-wave plate and the reflective polarizing plate on polarizing half-silvered mirror 140, image light incident on polarizing half-silvered mirror 140 as circularly polarized light is reflected toward first reflective mirror 150 as circularly polarized light.

First reflective mirror 150 is a concave mirror and is disposed below polarizing half-silvered mirror 140, in the paper plane of FIG. 2. First reflective mirror 150 is disposed in an orientation in which its concave surface constituting the reflective surface faces upward. The image light of circular polarization reflected by polarizing half-silvered mirror 140 is reflected by first reflective mirror 150 as circularly polarized light with no change, and travels back toward polarizing half-silvered mirror 140. The image light incident on polarizing half-silvered mirror 140 is converted to S-polarized light by the quarter-wave plate on polarizing half-silvered mirror 140, is transmitted through the reflective polarizing plate of polarizing half-silvered mirror 140, and travels upward, in the paper plane of FIG. 2.

Second reflective mirror 160 is a plane mirror and is disposed above polarizing half-silvered mirror 140. Therefore, the image light that is transmitted through polarizing half-silvered mirror 140 and travels upward is reflected by second reflective mirror 160. Second reflective mirror 160 is disposed in an orientation in which second reflective mirror 160 reflects image light toward opening 121. In other words, the image light reflected by second reflective mirror 160 travels toward the eyes of the driver in the driver's seat via opening 121 and forms first virtual image 101. FIG. 1 shows the position where, from the driver's viewpoint, he or she perceives first virtual image 101 to appear. This position can be set by adjusting the apparent distance of the image light emitted from display element 130 of first display device 100. The driver's viewpoint is, for example, a reference eye point. A reference eye point is "a point representative of the position of the driver's eyes in a normal driving state".

[Controller]

As shown in FIG. 1, controller 500 is electrically connected to first display device 100 and controls the content to be displayed by display element 130. Specifically, controller 500 includes, for example, a central processing unit (CPU), a random access memory (RAM), and a read only memory (ROM), and executes each process as the CPU loads a program stored in the ROM onto the RAM and executes the program.

Imager 3 that is provided in vehicle 1 and captures an image of the space surrounding vehicle 1 is connected to controller 500 such that imager 3 can communicate with controller 500 through wired or wireless connection. Imager 3 may be provided in display system 10.

Imager 3 includes, for example, a front view camera that captures an image of the space ahead of vehicle 1, a rear view camera that captures an image of the space behind vehicle 1, a right rear view camera that captures an image of the space at the rear right of vehicle 1, and a left rear view camera that captures an image of the space at the rear left of vehicle 1. An image captured by the front view camera (a front view image), an image captured by a right front view camera (a right front view image), and an image captured by a left front view camera (a left front view image) are all included in a front view image showing the space ahead of vehicle 1. An image captured by the rear view camera (a rear view image), an image captured by the right rear view camera (a right rear view image), and an image captured by the left rear view camera (a left rear view image) are all included in a rear view image showing the space behind vehicle 1.

Controller 500, by controlling first display device 100, displays a part of an image captured by imager 3 within first virtual image 101 as a surround view image.

[Display Examples]

Now, some examples of display by first display device 100 will be described. First display device 100 displays, as first virtual image 101, reference image G10 (see FIG. 3) and auxiliary image G20 (see FIG. 4) such that reference image G10 and auxiliary image G20 can be switched freely therebetween. Reference image G10 is an image displayed mainly during normal driving. Auxiliary image G20 is an image that includes surround view image G30 of vehicle 1 for drive assistance and is an image that displays content different from the content of reference image G10.

Controller 500 switches between reference image G10 and auxiliary image G20 by controlling display element 130 based on a predetermined timing. For example, controller 500 switches from reference image G10 to auxiliary image G20 at a timing at which an alarming object, such as another vehicle (an automobile, a motorcycle, a bicycle, or the like) or an animal (a person, a dog, a cat, or the like), is detected within the image of surround view image G30 obtained by imager 3. Conversely, controller 500 switches from auxiliary image G20 to reference image G10 at a timing at which an alarming object ceases to be detected in surround view image G30.

Controller 500 may switch between reference image G10 and auxiliary image G20 based on the vehicle speed. Specifically, controller 500 switches from reference image G10 to auxiliary image G20 at a timing at which the vehicle speed becomes lower than or equal to a predetermined speed, or switches from auxiliary image G20 to reference image G10 at a timing at which the vehicle speed becomes higher than or equal to the predetermined speed.

Controller 500 may switch between reference image G10 and auxiliary image G20 based on the presence or absence of an operation on the blinker. Specifically, controller 500 switches from reference image G10 to auxiliary image G20 for the right hand side at a timing at which the blinker is operated to indicate a right turn, or switches from reference image G10 to auxiliary image G20 for the left hand side at a timing at which the blinker is operated to indicate a left turn. Controller 500 switches from auxiliary image G20 to reference image G10 upon the operation on the blinker being released.

Aside from the above, controller 500 may switch between reference image G10 and auxiliary image G20 at a timing at which a dedicated switch button is operated, or may switch between reference image G10 and auxiliary image G20 based on the presence or absence of an operation on the reverse gear of vehicle 1.

Figure 3:
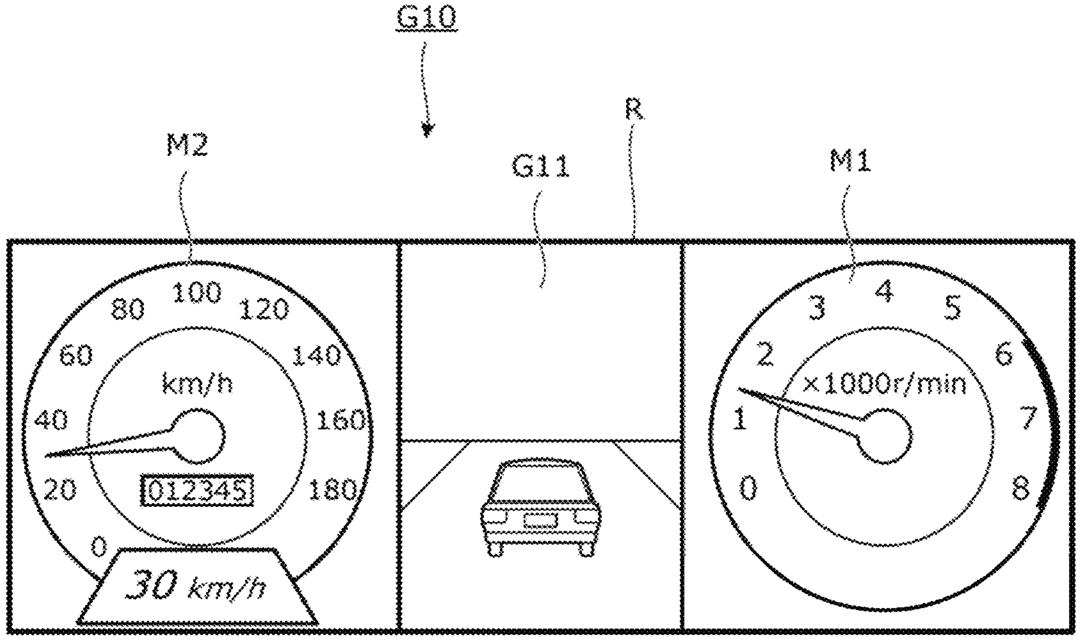
FIG. 3 is an explanatory drawing showing a reference image according to Embodiment 1.

Next, reference image G10 and auxiliary image G20 will be described more specifically. FIG. 3 is an explanatory drawing showing reference image G10 according to Embodiment 1. As shown in FIG. 3, reference image G10 is contained within display region R of first virtual image 101. In reference image G10, tachometer M1 is disposed in the right side, and vehicle speed meter M2 is disposed in the left side. In reference image G10, surround view image G11 obtained by imager 3 and showing the space ahead of vehicle 1 is disposed between tachometer M1 and vehicle speed meter M2.

Figure 4:
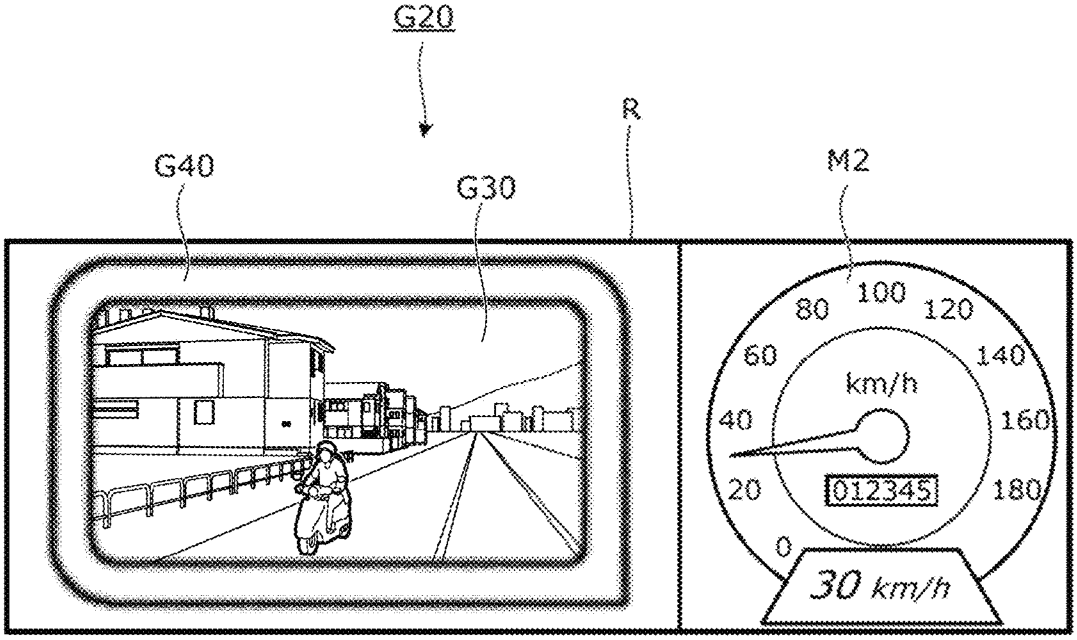
FIG. 4 is an explanatory drawing showing an auxiliary image according to Embodiment 1.

FIG. 4 is an explanatory drawing showing auxiliary image G20 according to Embodiment 1. FIG. 4 shows auxiliary image G20 for the left hand side. As shown in FIG. 4, auxiliary image G20 is contained within display region R of first virtual image 101. In auxiliary image G20, vehicle speed meter M2 is disposed in the right side, and surround view image G30 is disposed in the left side. Specifically, surround view image G30 is displayed along with frame image G40 showing the frame of a side view mirror of vehicle 1. Frame image G40 is one example of an edge image surrounding the periphery of surround view image G30. Frame image G40 may show a side view mirror frame, a door mirror frame, or a fender mirror frame.

Frame image G40 is a rectangular frame-shaped image showing a deformed side view mirror frame, and surround view image G30 is contained in the region within frame image G40 that corresponds to the mirror. Surround view image G30 is a left rear view image showing the space at the rear left of vehicle 1. In other words, surround view image G30 and frame image G40 show, in the form of an image, the left side view mirror and the mirror image appearing in the left side view mirror. Since surround view image G30 is disposed in the left side of display region R, this configuration makes it possible for the driver to grasp intuitively that this surround view image G30 displays the mirror image appearing within the left side view mirror frame. Herein, when surround view image G30 is a right rear view image showing the space at the rear right of vehicle 1, surround view image G30 may be disposed in the right side of display region R, and vehicle speed meter M2 may be displayed in the left side.

In the example described here, controller 500 displays surround view image G30 such that at least a part of the periphery of surround view image G30 is blurred relative to the image inward of the periphery. According to the present embodiment, the periphery of surround view image G30 as well as the entire periphery of frame image G40 is blurred.

Figure 5:
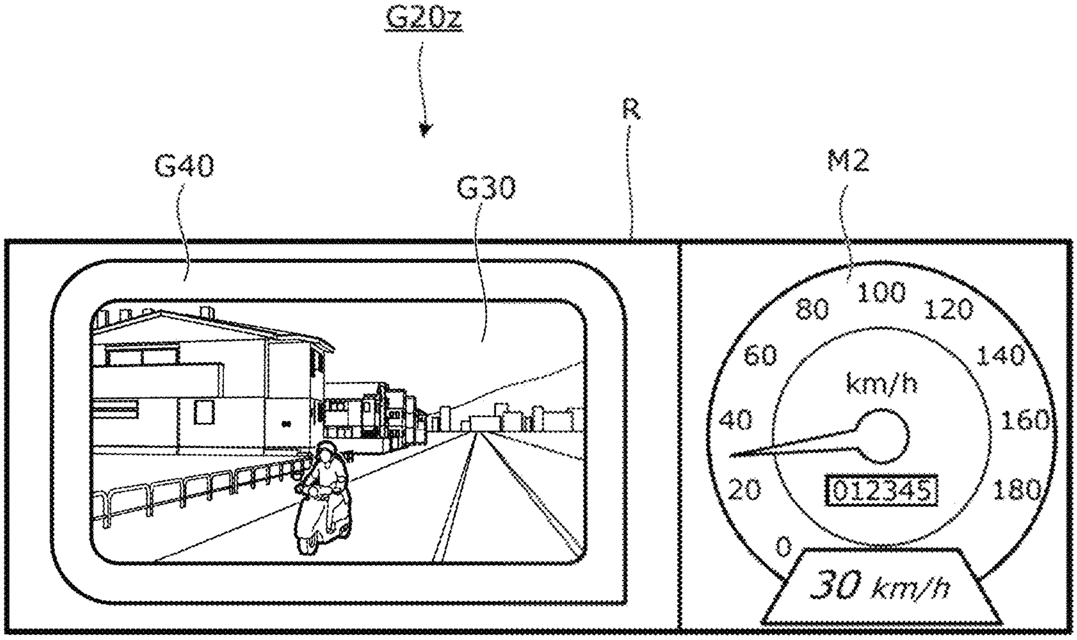
FIG. 5 is an explanatory drawing showing an auxiliary image according to a comparative example.

FIG. 5 is an explanatory drawing showing auxiliary image G20*z* according to a comparative example. As shown in FIG. 5, in auxiliary image G20*z*, neither the periphery of surround view image G30 nor frame image G40 is blurred, and they are displayed with sharp lines.

As compared to the comparative example shown in FIG. 5, it can be said with regard to the example shown in FIG. 4 that the periphery of surround view image G30 and the entire periphery of frame image G40 are both blurred and displayed emphatically with thick lines. Herein, as can be seen in FIG. 4, in contrast to at least a part blurred of the periphery of surround view image G30 (the entire periphery in the example shown in FIG. 4), the part of surround view image G30 that is not blurred is displayed more emphatically relative to the blurred part. In this manner, blurring the periphery of surround view image G30 is referred to below as displaying emphatically (an emphatic display). Blurring the entire periphery of surround view image G30 makes it possible to give the driver an impression that more perspective is given to surround view image G30. Furthermore, blurring the entire periphery of surround view image G30 makes it possible to direct the driver's attention to the content displayed by surround view image G30. Herein, the lower right corner of blurred frame image G40 is substantially a right angle, and the radius of curvature at the lower right corner is smaller than the radii of curvature of the upper right corner, the lower left corner, and the upper left corner. Therefore, the driver can image that the left side view mirror is fixed to vehicle 1 at the portion corresponding to the lower right of frame image G40. Accordingly, the shape of frame image G40 makes it possible for the driver to grasp intuitively that surround view image G30 is an image showing the space at the rear left of vehicle 1.

In the example case illustrated above, the periphery of surround view image G30 and the entire periphery of frame image G40 are blurred uniformly. Alternatively, the right hand side and the vicinity thereof, which are closer to the driver, of surround view image G30 and frame image G40 may be made more emphatic and blurred relative to the remaining sides. In other words, since the driver can focus less easily on the right side closer to the driver, the right side of the periphery of surround view image G30 and the right side of frame image G40 may be made emphatic and blurred. Such a configuration makes it possible for the driver to grasp intuitively that this surround view image G30 displays the mirror image appearing in the left side view mirror frame.

Meanwhile, at least a part alone of the periphery of surround view image G30 may be blurred to display an emphatic display. For example, when surround view image G30 is an image showing the space at the rear left of vehicle 1, controller 500 blurs, of surround view image G30, only the right hand side and the vicinity thereof, which are closer to the driver, and refrains from blurring the remaining sides. Such a configuration as well makes it possible for the driver to grasp intuitively that this surround view image G30 displays the mirror image appearing in the left side view mirror frame.

Herein, with regard to an "emphatic display", a mode of display in which the periphery of surround view image G30 is blurred to make the periphery less noticeable relative to the image inward of the periphery and thus the image inward becomes more visually emphatic has been described. "Emphatic display" may also include other modes of display in which, for example, at least one selected from the luminance, the color, the size, and so on of the periphery is adjusted to make the periphery more visually emphatic.

Since surround view image G30 as well as frame image G40 showing a side view mirror frame is displayed within the region corresponding to the mirror in frame image G40, the side view mirror frame and the mirror image appearing in the side view mirror can be shown in the form of an image. With this configuration, the driver can grasp more intuitively which direction displayed surround view image G30 corresponds to by looking at frame image G40 and surround view image G30. Displaying frame image G40 can keep the driver from mistaking surround view image G30 for an image showing the space ahead of the vehicle.

Since first virtual image 101, an image displayed, is positioned ahead of first display device 100, this configuration can reduce the stress that the driver looking ahead of vehicle 1 experiences when moving his or her gaze to first virtual image 101. Furthermore, since the image displayed is first virtual image 101, this configuration can add the sense of depth to the display image, as compared to the case in which the driver directly looks at a surround view image displayed on a planar display surface.

Embodiment 2

Embodiment 2 will now be described. In the following description, components identical to those according to Embodiment 1 are given identical reference characters, and description thereof may be omitted.

Figure 6:
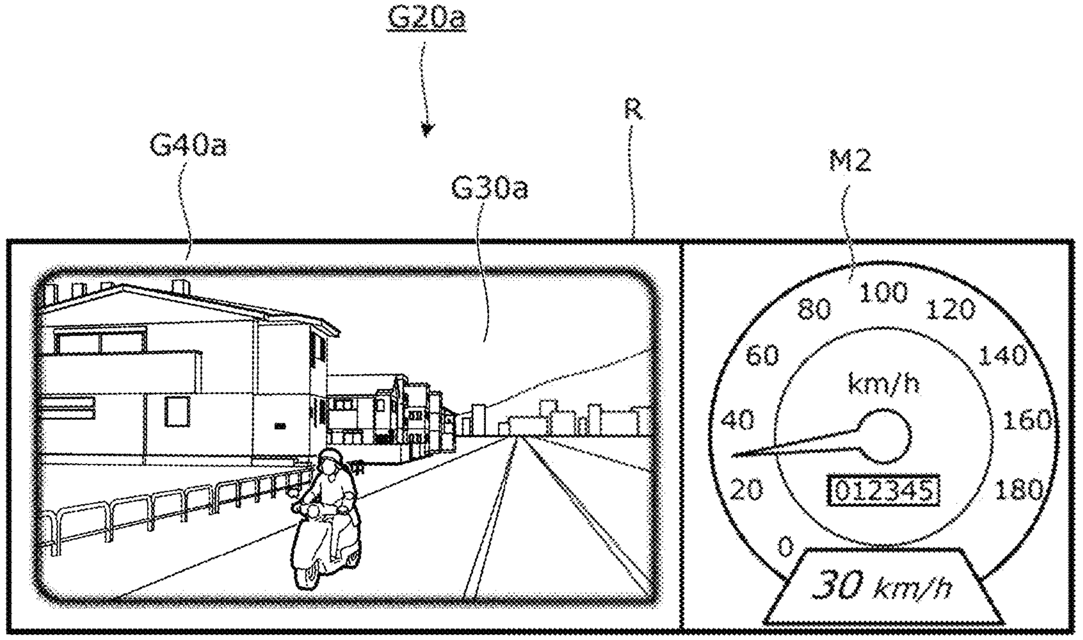
FIG. 6 is an explanatory drawing showing an auxiliary image according to Embodiment 2.

FIG. 6 is an explanatory drawing showing auxiliary image G20*a* according to Embodiment 2. As shown in FIG. 6, in comparison with the image shown in FIG. 5, frame image G40*a* and surround view image G30*a* are larger, and the outer periphery of frame image G40*a* is not displayed. Therefore, the entire periphery of surround view image G30*a* is blurred and displayed emphatically. In this case, since the outer peripheral portion of frame image G40*a* is not displayed, this configuration can increase the display range of surround view image G30*a*.

Herein, since the outer peripheral portion of frame image G40*a* is not displayed in the example shown in FIG. 6, in order to indicate that surround view image G30*a* is an image showing the space at the rear left, the lower right corner of the blurred periphery of surround view image G30*a* is substantially a right angle, and the radius of curvature at the lower right corner is set smaller than the radii of curvature at the upper right corner, at the lower left corner, and at the upper left corner. This configuration makes it possible for the driver to grasp intuitively that surround view image G30*a* is an image showing the space at the rear left of vehicle 1 based on the shape of the periphery of surround view image G30*a*.

Embodiment 3

Figure 7:
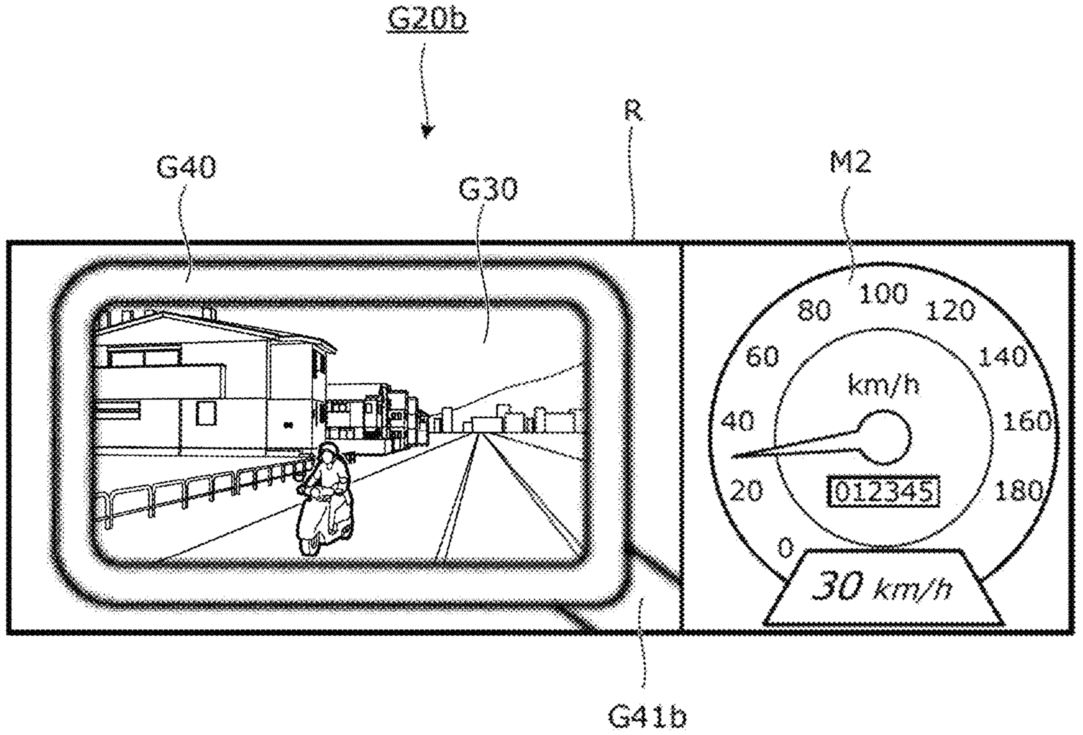
FIG. 7 is an explanatory drawing showing an auxiliary image according to Embodiment 3.

Embodiment 3 will now be described. FIG. 7 is an explanatory drawing showing auxiliary image G20*b* according to Embodiment 3. As shown in FIG. 7, in auxiliary image G20*b*, arm image G41*b* showing an arm extending from the frame of a side view mirror of vehicle 1, frame image G40, and surround view image G30 are displayed. Arm image G41*b* extends downward and to the right from the lower right corner portion of frame image G40. This configuration makes it possible for the driver to grasp more intuitively that frame image G40 is an image representing the left side view mirror of vehicle 1. In FIG. 7, the periphery of surround view image G30, frame image G40, and arm image G41*b* are all blurred. In a similar manner, the periphery of a surround view image, a frame image, and so on are all blurred in the examples described below according to Embodiments 4 to 7 (FIG. 8 to FIG. 12).

Embodiment 4

Figure 8:
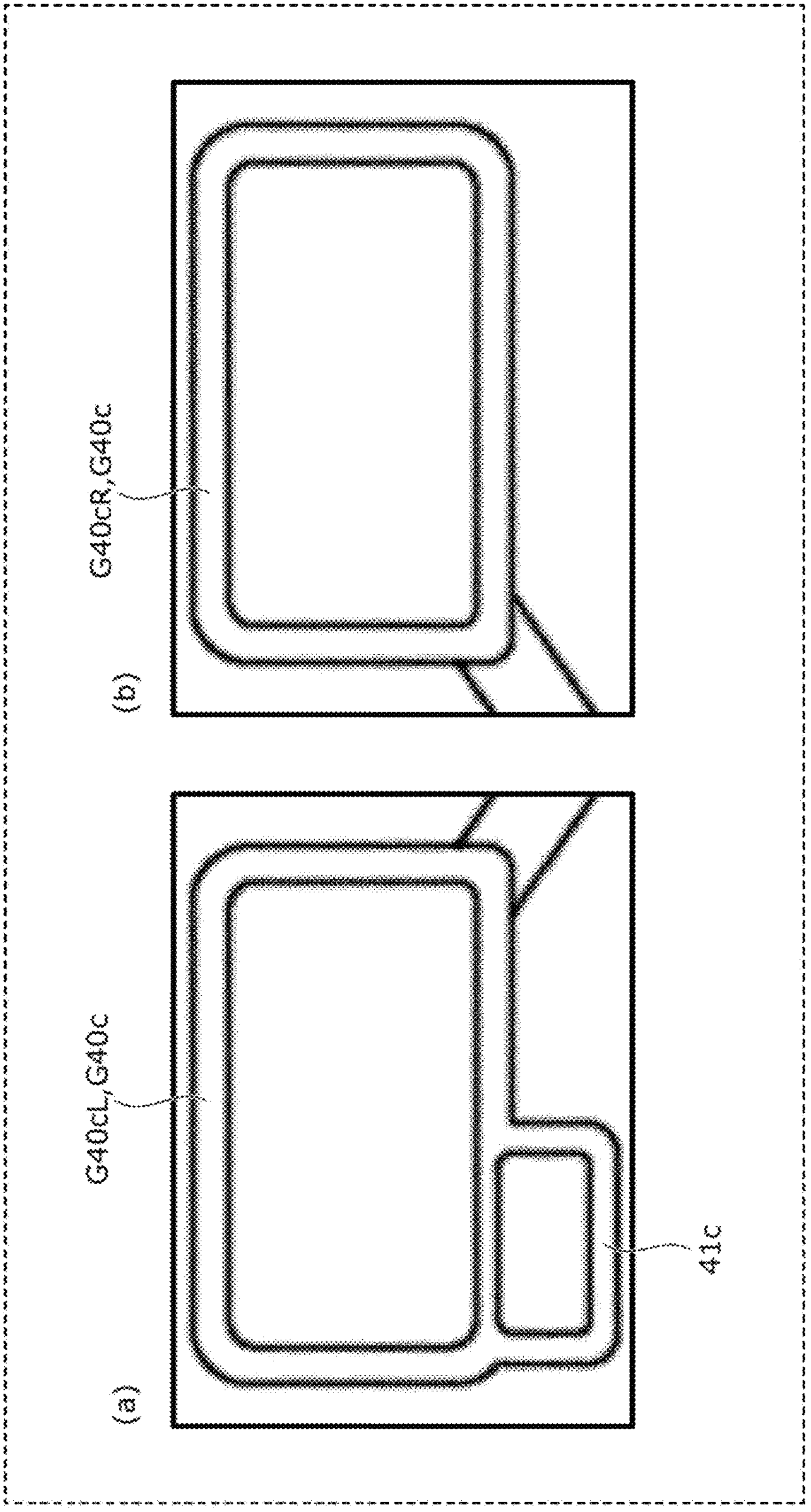
FIG. 8 is an explanatory drawing showing a frame image according to Embodiment 4.

Embodiment 4 will now be described. FIG. 8 is an explanatory drawing showing frame image G40*c* according to Embodiment 4. Frame image G40*c* includes left frame image G40*c*L showing the frame of the side view mirror disposed on the left side of vehicle 1 (see (a) of FIG. 8), and right frame image G40*c*R showing the frame of the side view mirror disposed on the right side of vehicle 1. Depending on the type of vehicle 1, the right and left side view mirror frames may have different shapes. For example, in the case of a recreational vehicle (RV) or the like, when the driver's seat is the right front seat, an auxiliary mirror may be provided next to the frame of the left side view mirror. In the case of a vehicle with the right and left side view mirrors of different shapes in this manner, left frame image G40*c*L and right frame image G40*c*R are displayed in auxiliary image G20 in horizontally asymmetric shapes in accordance with the shapes of the right and left side view mirrors. Specifically, auxiliary mirror frame image G41*c* is disposed at the lower left corner of left frame image G40*c*L, whereas no auxiliary mirror frame image is added to right frame image G40*c*R.

Since left frame image G40*c*L and right frame image G40*c*R are horizontally asymmetric in this manner, this configuration makes it possible for the driver to grasp more intuitively which directions left frame image G40*c*L and right frame image G40*c*R correspond to, based on the shape.

Figure 9:
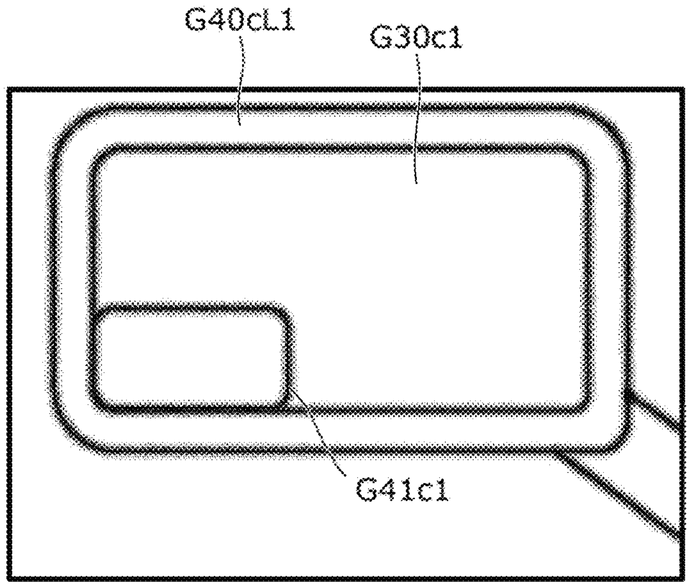
FIG. 9 is an explanatory drawing showing a variation of a left frame image according to Embodiment 4.

FIG. 9 is an explanatory drawing showing a variation of a left frame image according to Embodiment 4. In left frame image G40*c*L1 shown in FIG. 9, auxiliary mirror frame G41*c*1 is disposed within surround view image G30*c*1. Specifically, auxiliary mirror frame G41*c*1 is disposed at the lower left corner within surround view image G30*c*1. In this case as well, left frame image G40*c*L1 is horizontally asymmetric to frame image G40*c*.

Embodiment 5

Figure 10:
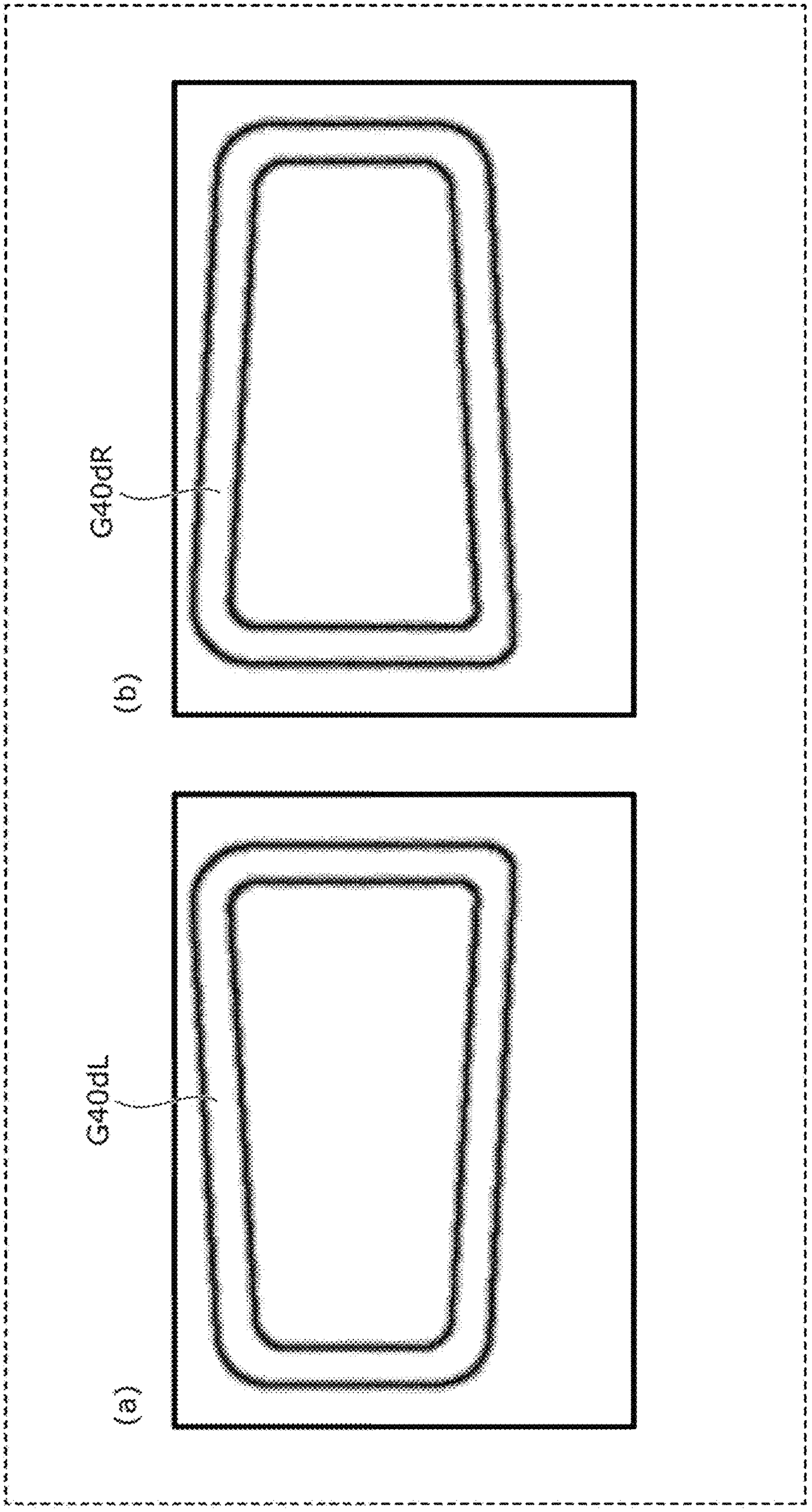
FIG. 10 is an explanatory drawing showing a left frame image and a right frame image according to Embodiment 5.

Embodiment 5 will now be described. FIG. 10 is an explanatory drawing showing left frame image G40*d*L and right frame image G40*d*R according to Embodiment 5. Left frame image G40*d*L and right frame image G40*d*R each have a shape tapered toward the outer side. Specifically, the width of left frame image G40*d*L in the up-down direction decreases toward the left. Meanwhile, the width of right frame image G40*d*R in the up-down direction decreases toward the right. This configuration as well makes it possible for the driver to grasp more intuitively which directions left frame image G40*d*L and right frame image G40*d*R correspond to.

Embodiment 6

Figure 11:
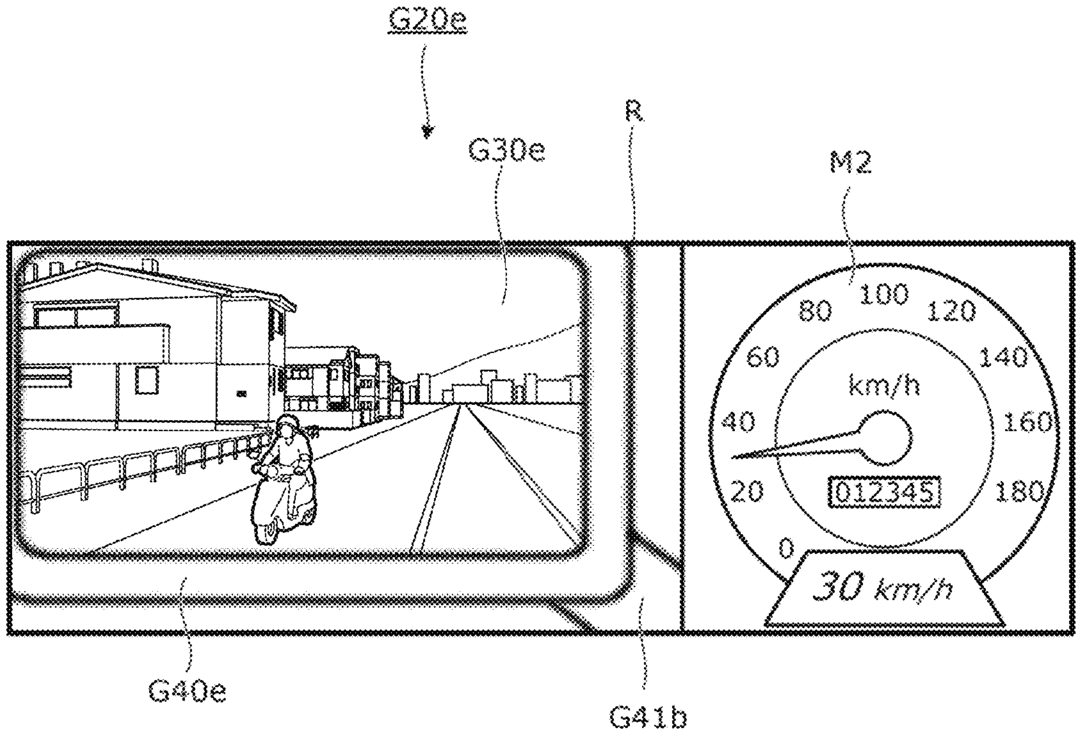
FIG. 11 is an explanatory drawing showing an auxiliary image according to Embodiment 6.

Embodiment 6 will now be described. FIG. 11 is an explanatory drawing showing auxiliary image G20*e* according to Embodiment 6. As shown in FIG. 11, in comparison with the image shown in FIG. 7, frame image G40*e* and surround view image G30*e* in auxiliary image G20*e* are larger, and a part of the outer periphery of frame image G40*e* is not displayed. Since a part of the outer peripheral portion of frame image G40*e* is not displayed in this manner, this configuration can increase the display range of surround view image G30*e*.

Embodiment 7

Figure 12:
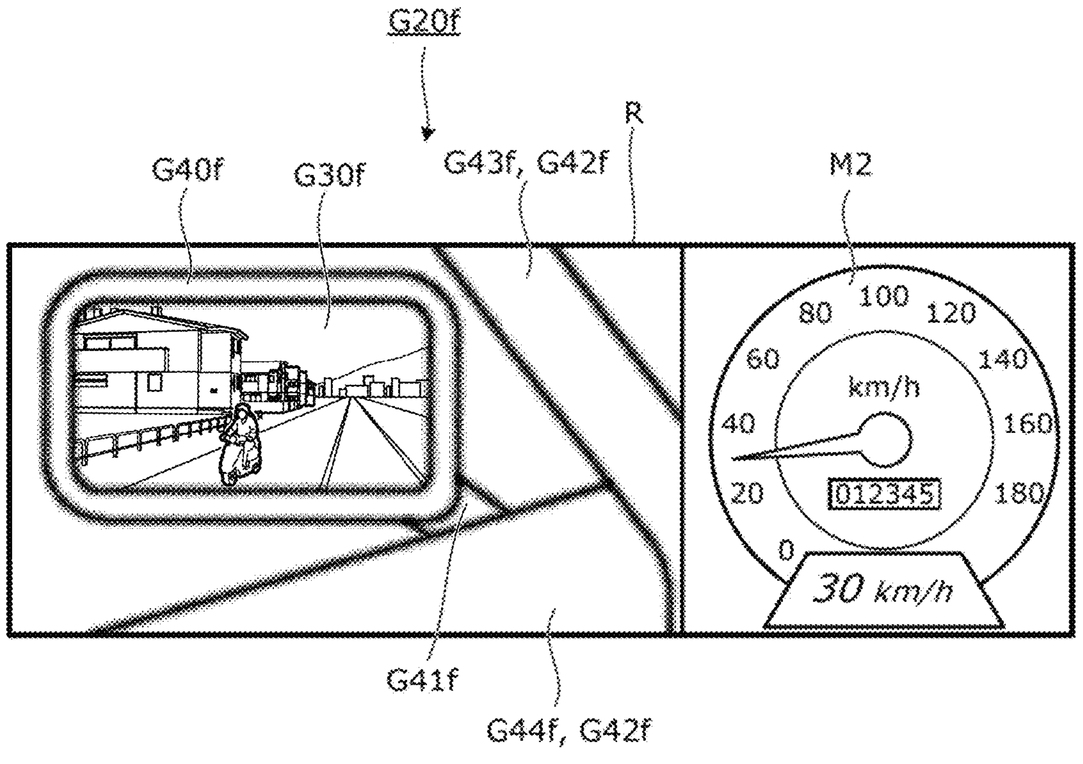
FIG. 12 is an explanatory drawing showing an auxiliary image according to Embodiment 7.

Embodiment 7 will now be described. FIG. 12 is an explanatory drawing showing auxiliary image G20*f* according to Embodiment 7. As shown in FIG. 12, in auxiliary image G20*f*, interior image G42*f* showing a part of the interior of vehicle 1, arm image G41*f*, frame image G40*f*, and surround view image G30*f* are displayed. Interior image G42*f* includes pillar image G43*f* showing a pillar of vehicle 1, and door interior image G44*f* showing the interior of a door of vehicle 1. Since interior image G42*f* and frame image G40*f* are displayed in this manner, this configuration makes it possible for the driver to grasp more intuitively which direction surround view image G30*f* corresponds to, based on interior image G42*f*. Herein, interior image G42*f* may include only one of pillar image G43*f* and door interior image G44*f*.

Embodiment 8

Figure 13:
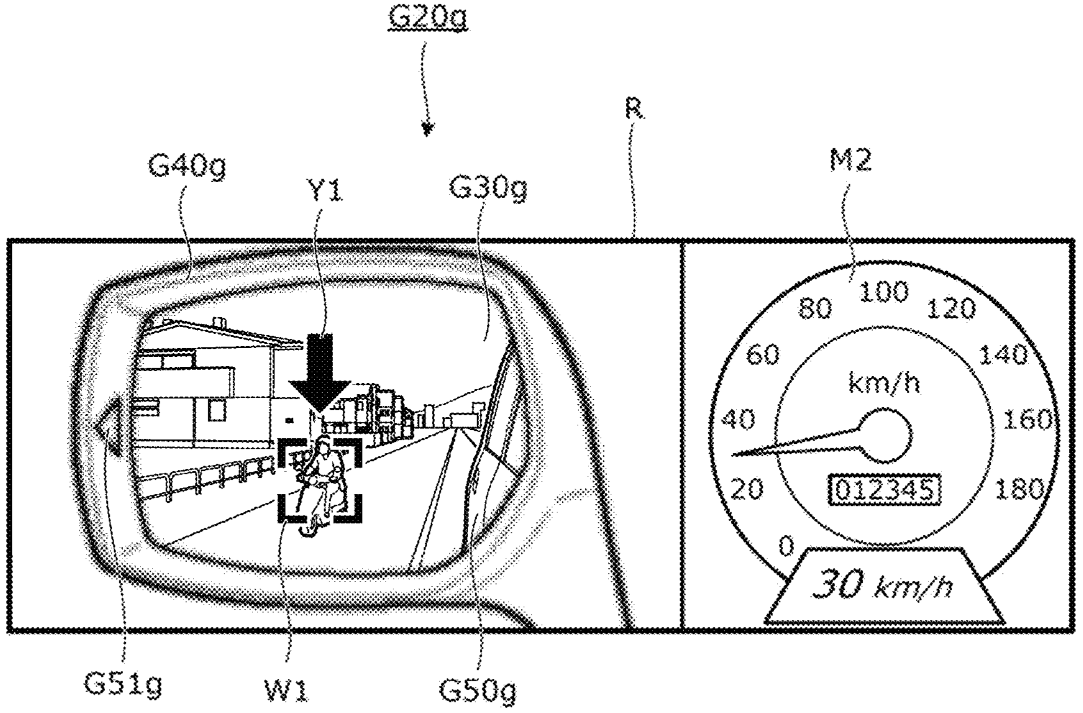
FIG. 13 is an explanatory drawing showing an auxiliary image according to Embodiment 8.

Embodiment 8 will now be described. FIG. 13 is an explanatory drawing showing auxiliary image G20*g* according to Embodiment 8. As shown in FIG. 13, in auxiliary image G20*g*, the frame of a side view mirror of vehicle 1 is represented realistically and shown as blurred frame image G40*g*. Specifically, frame image G40*g* may be created based on a captured image obtained by capturing an image of an actual side view mirror frame or may be a computer graphics (CG) image created from the design data of a side view mirror frame. Since frame image G40*g* represents a side view mirror frame realistically in this manner, this realistic frame image G40*g* can increase the sense of realism. As frame image G40*g* represents a side view mirror frame realistically, this configuration makes it possible for the driver to grasp more intuitively the direction that surround view image G30*g* corresponds to, based on the shape of frame image G40*g*.

Furthermore, in auxiliary image G20*g*, vehicle body image G50*g* showing the vehicle body of vehicle 1 is included in surround view image G30*g* and displayed along with frame image G40*g*. For example, in the example shown in FIG. 13, surround view image G30*g* is an image showing the space at the rear left of the vehicle, and thus vehicle body image G50*g* is an image showing the rear left portion of the vehicle body and is displayed in the left end portion of surround view image G30*g*. Since vehicle body image G50*g* and frame image G40*g* are displayed in this manner, this configuration makes it possible for the driver to grasp more intuitively which direction surround view image G30*g* corresponds to, based on vehicle body image G50*g*. A function may be provided that can switch the color of vehicle body image G50*g* to match the body color of vehicle 1.

In this example, in one end portion of frame image G40*g*, lighting image G51*g* showing the lighting state of the blinker of vehicle 1 is provided. Controller 500 obtains the lighting state of the blinker of vehicle 1 and controls the display mode of lighting image G51*g* in accordance with the obtained lighting state. Specifically, when the blinker of vehicle 1 is blinking, controller 500 turns on lighting image G51*g* or causes lighting image G51*g* to blink. When the blinker of vehicle 1 is off, on the other hand, controller 500 turns off lighting image G51*g*. Since lighting image G51*g* is displayed in this manner, this configuration makes it possible for the driver to grasp the lighting state of the blinker based on lighting image G51*g*. Herein, the blinking or the turned-off state of the blinker may be expressed by changing at least one of the color, the shape, or the size of lighting image G51*g*.

Controller 500 determines whether an alarming object is displayed by subjecting surround view image G30*g* to known image processing, and when an alarming object is displayed, controller 500 causes first display device 100 to display this alarming object with the alarming object made visually emphatic. Specifically, controller 500, for example, displays arrow Y1 pointing to the alarming object or displays frame form W1 enclosing the alarming object. Since an alarming object within surround view image G30*g* is displayed emphatically in this manner, this configuration makes it possible for the driver to grasp intuitively the alarming object. With regard to the method of adding emphasis to an alarming object, there is no limitation as long as an alarming object can be made visually emphatic. Some examples of the method include displaying an alarming object in an enlarged manner, causing an alarming object to blink, or changing the color or the brightness of an alarming object. Furthermore, when an alarming object is displayed in surround view image G30*g*, the driver may be informed through an audio warning or through a vibration of a vibrator provided in the seat or in the steering wheel.

Figure 14:
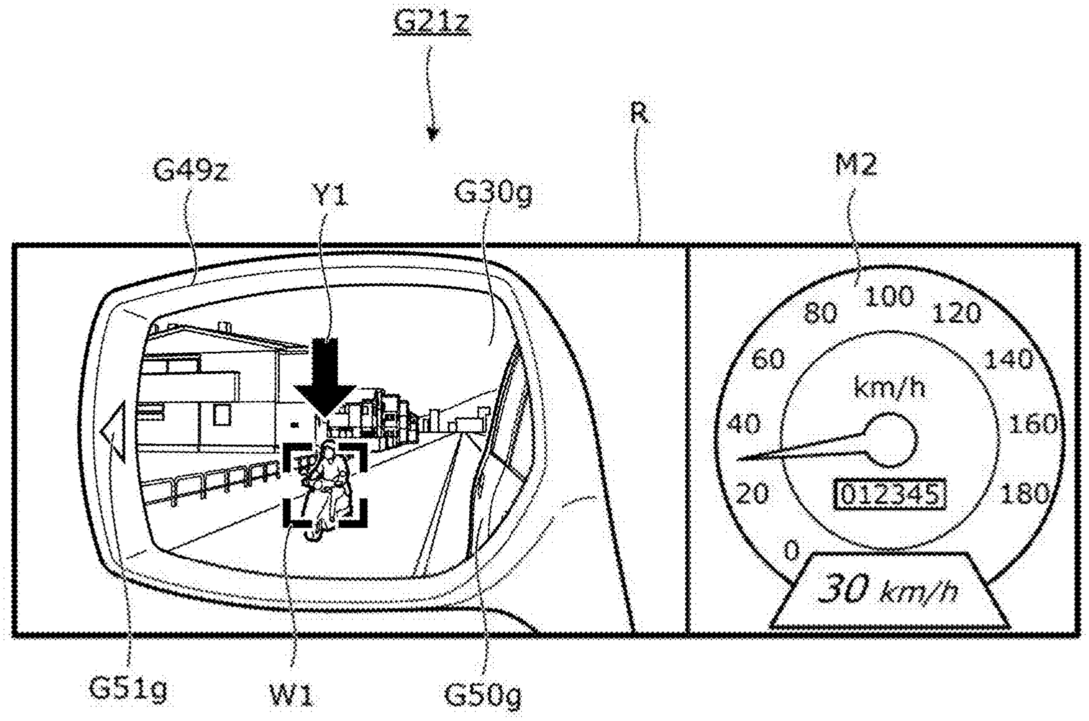
FIG. 14 is an explanatory drawing showing an auxiliary image according to a comparative example.

In this example, controller 500 blurs the periphery of surround view image G30*g* as well as the entire periphery of frame image G40*g*. FIG. 14 is an explanatory drawing showing auxiliary image G21*z* according to a comparative example. As shown in FIG. 14, in auxiliary image G21*z*, neither the periphery of surround view image G30*g* nor frame image G49*z* is blurred, and they are displayed with sharp lines. Controller 500 may create frame image G40*g* by blurring non-blurred frame image G49*z* through image processing or may create frame image G40*g* by capturing an intentionally blurred image of a side view mirror frame with imager 3.

According to the present embodiment, as the entire periphery of surround view image G30*g* is blurred as shown in FIG. 13, this image can give the driver an impression that more perspective is given to surround view image G30*g*. Furthermore, blurring the entire periphery of surround view image G30*g* makes it possible to direct more easily the driver's attention to the content displayed by surround view image G30*g*. Herein, the periphery of a surround view image, a frame image, and so on are all blurred in the examples shown in FIG. 15, FIG. 17 to FIG. 27, and FIG. 36 to FIG. 43 described below according to the following embodiments.

Embodiment 9

Figure 15:
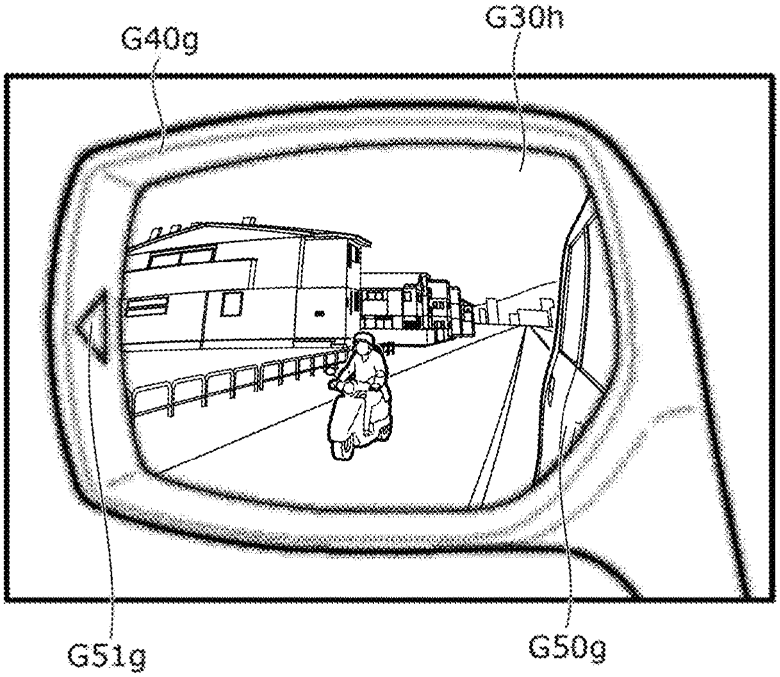
FIG. 15 is an explanatory drawing showing a surround view image according to Embodiment 9.

Embodiment 9 will now be described. FIG. 15 is an explanatory drawing showing surround view image G30*h* according to Embodiment 9. As shown in FIG. 15, controller 500 causes first display device 100 to display surround view image G30*h* that is distorted.

Figure 16:
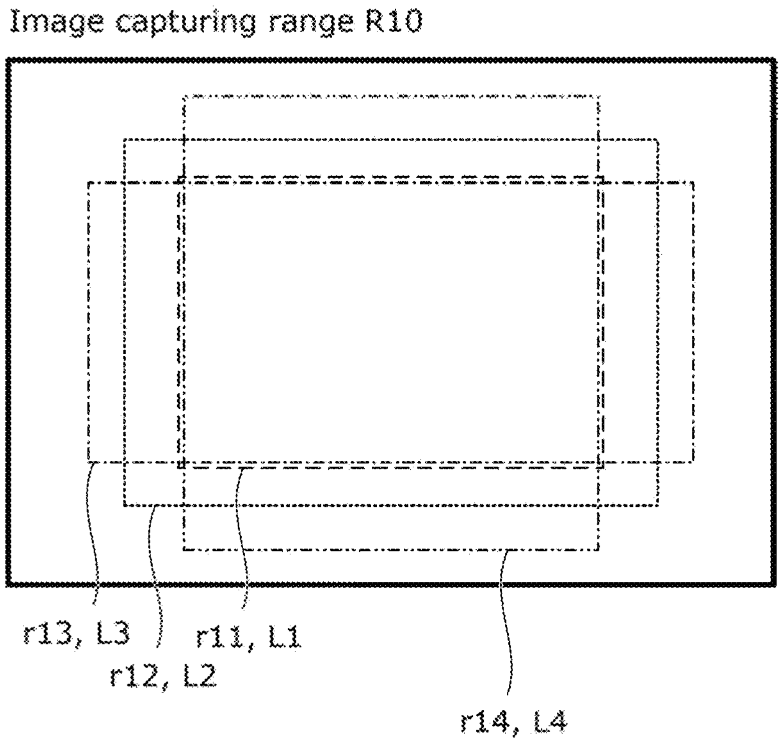
FIG. 16 is an explanatory drawing showing a display target according to Embodiment 9.

FIG. 16 is an explanatory drawing showing display target r12 according to Embodiment 9. As shown in FIG. 16, within image capturing range R10 of, for example, a left rear view camera, display target r11 of surround view image G30*g* shown in FIG. 13 is the range enclosed by dashed line L1. Display target r11 is disposed at the center of image capturing range R10. This display target r11 is cut out and displayed as surround view image G30*g*.

Meanwhile, within image capturing range R10, display target r12 of surround view image G30*h* is the range enclosed by dashed line L2. Display target r12 is a range larger than display target r11 both in the vertical direction (in the height direction) and in the horizontal direction (in the right-left direction). In order to cut out this display target r12 and display it as surround view image G30*h*, controller 500 displays display target r12 with the parts of the image at the top, at the bottom, at the right, and at the left being distorted. Since display target r12 of surround view image G30*h* covers a larger area than display target r11 of surround view image G30*g* and is displayed as being distorted in this manner, this configuration makes it possible for the driver to grasp that a wide-angle image is displayed.

Embodiment 10

Figure 17:
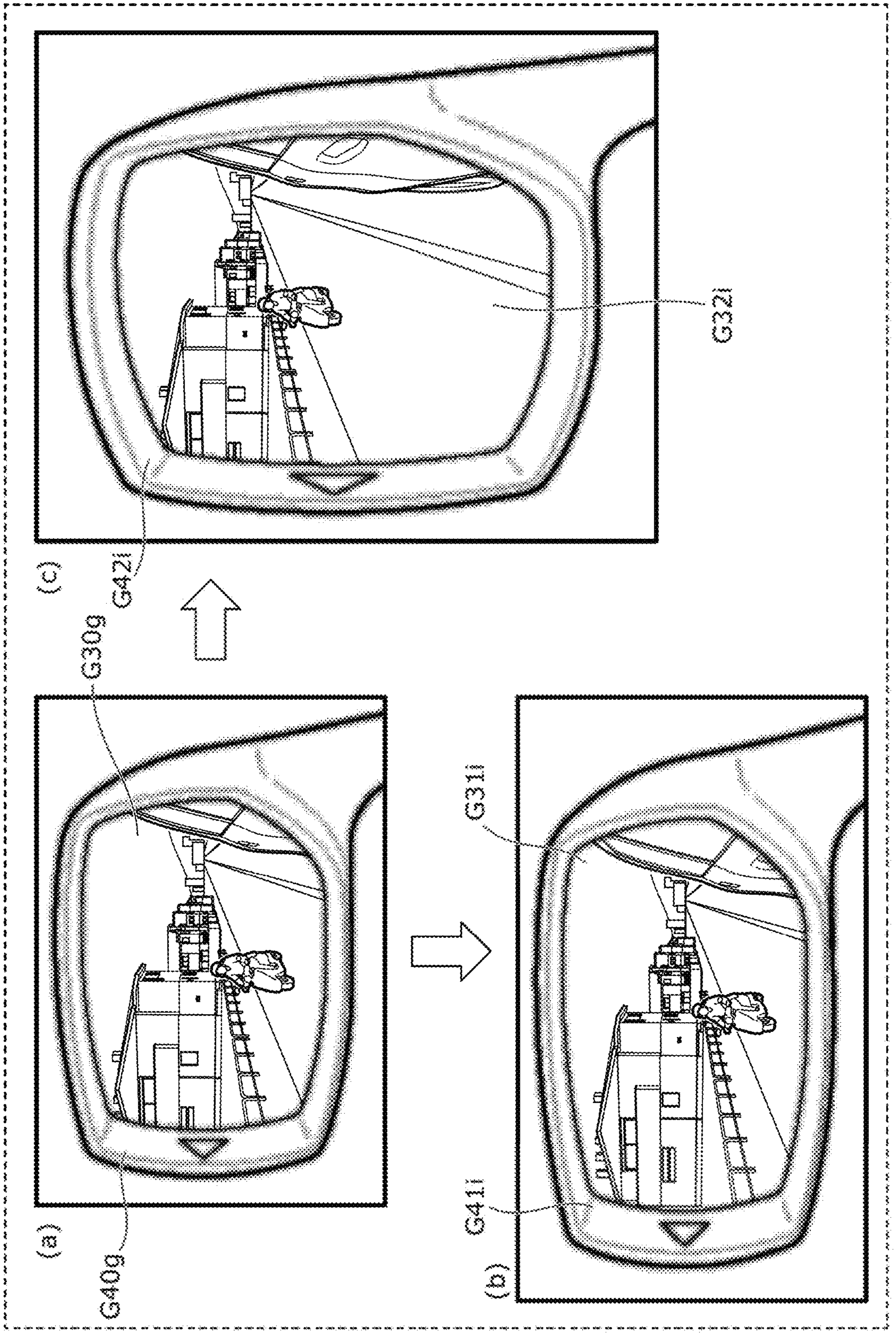
FIG. 17 is an explanatory drawing showing a frame image that is not adjusted and frame images that are adjusted according to Embodiment 10.

Embodiment 10 will now be described. In the case illustrated according to Embodiment 10, the aspect ratio of frame image G40*g* to be displayed by first display device 100 is varied and adjusted. FIG. 17 is an explanatory drawing showing frame image G40*g* that is not adjusted and frame images G41*i* and G412 that are adjusted according to Embodiment 10.

Here, (a) of FIG. 17 shows frame image G40*g* that is not adjusted, and the aspect ratio of this frame image G40*g* is substantially equal to the aspect ratio of the frame of a side view mirror of vehicle 1. Meanwhile, (b) of FIG. 17 shows frame image G41*i* that is adjusted, and this frame image G41*i* is larger in the horizontal direction relative to the aspect ratio of the frame of a side view mirror of vehicle 1. Meanwhile, (c) of FIG. 17 shows frame image G42*i* that is adjusted, and this frame image G42*i* is larger in the vertical direction relative to the aspect ratio of the frame of a side view mirror of vehicle 1.

Controller 500 adjusts the aspect ratio based on a predetermined operation. Specifically, in response to the operation for actuating the blinker, controller 500, by controlling first display device 100, switches from frame image G40*g* to frame image G41*i* (from (a) of FIG. 17 to (b) of FIG. 17). In accordance with this switch, controller 500 also switches from surround view image G30*g* to surround view image G31*i*. As shown in FIG. 16, display target r13 of surround view image G31*i* is the range enclosed by dashed-dotted line L3 in image capturing range R10. Display target r13 is a range that is as large as display target r11 in the vertical direction and is larger than display target r11 in the horizontal direction. This display target r13 is cut out and displayed as surround view image G31*i*.

In response to the operation for actuating the blinker being released, controller 500, by controlling first display device 100, switches from frame image G41*i* and surround view image G31*i* to, respectively, frame image G40*g* and surround view image G30*g* (from (b) of FIG. 17 to (a) of FIG. 17). In the example shown in (b) of FIG. 17, frame image G41*i* is increased in size in the horizontal direction. Alternatively, a frame image may be reduced in size in the vertical direction.

Meanwhile, in response to the reverse gear being operated, controller 500, by controlling first display device 100, switches from frame image G40*g* to frame image G42*i* (from (a) of FIG. 17 to (c) of FIG. 17). In accordance with this switch, controller 500 also switches from surround view image G30*g* to surround view image G32*i*. As shown in FIG. 16, display target r14 of surround view image G32*i* is the range enclosed by dashed-two-dotted line L4 in image capturing range R10. Display target r14 is a range that is as large as display target r11 in the horizontal direction and is larger than display target r11 in the vertical direction. This display target r14 is cut out and displayed as surround view image G32*i*.

In response to the operation on the reverse gear being released, controller 500, by controlling first display device 100, switches from frame image G42*i* and surround view image G32*i* to, respectively, frame image G40*g* and surround view image G30*g* (from (c) of FIG. 17 to (a) of FIG. 17). In the example shown in (c) of FIG. 17, frame image G42*i* is increased in size in the vertical direction. Alternatively, a frame image may be reduced in size in the horizontal direction.

Since the aspect ratio of frame image G41*i* or G42*i* differs from the aspect ratio of the side view mirror frame in this manner, an image with a wider angle in the vertical direction or in the horizontal direction can be displayed within frame image G41*i* or G42*i*.

Embodiment 11

Figure 18:
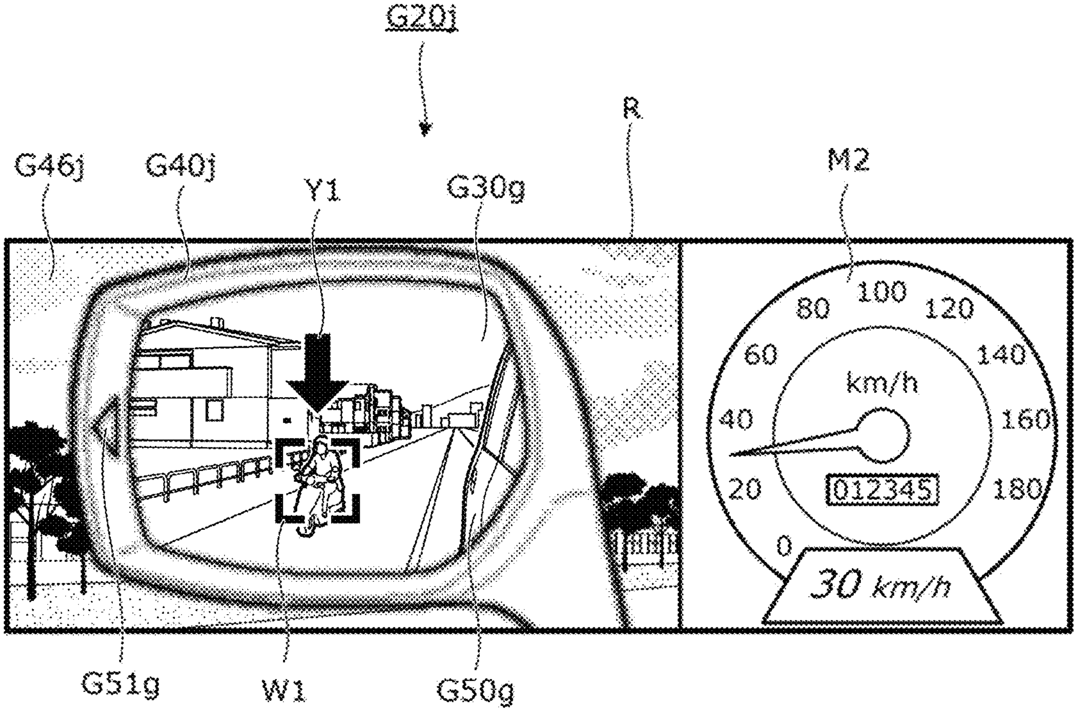
FIG. 18 is an explanatory drawing showing an auxiliary image according to Embodiment 11.

Embodiment 11 will now be described. FIG. 18 is an explanatory drawing showing auxiliary image G20*j* according to Embodiment 11. As shown in FIG. 18, controller 500 causes first display device 100 to display, of an image captured by imager 3, front view image G46*j* showing the space ahead of vehicle 1 (to be more specific, a front view image showing the space at the front left) in the background of frame image G40*j*. Since front view image G46*j* is displayed in the background of frame image G40*j* in this manner, this configuration can enhance the sense of realism. Herein, controller 500 may display the background that is blurred behind frame image G40*j*. Furthermore, an imager for capturing front view image G46*j* may be installed on the frame of a side view mirror of vehicle 1, or an imager that captures front view image G46*j* including a side view mirror frame may be installed in vehicle 1. In the case of the latter, frame image G40*j* is displayed over the portion within an image that corresponds to a side view mirror frame.

Moreover, controller 500 may control first display device 100 such that the background color of frame image G40*j* varies in accordance with the environment surrounding vehicle 1. Specifically, controller 500 estimates the environment surrounding vehicle 1 based on at least one of the current date and time, an illuminance sensor, an image captured by imager 3, weather information obtained through communication, or the current position information. Based on the estimation result, controller 500 determines the background color of frame image G40*j*. For example, controller 500 may select blue for the background color during daytime, or may select black or dark gray for the background color during nighttime. Meanwhile, controller 500 may select light gray for the background color when it is cloudy. Controller 500 may select white for the background color when it is snowing. Since the background color can be varied in accordance with the environment surrounding vehicle 1 in this manner, this configuration makes it possible for the driver to grasp the environment surrounding vehicle 1 simply by identifying the background color.

Embodiment 12

Figure 19:
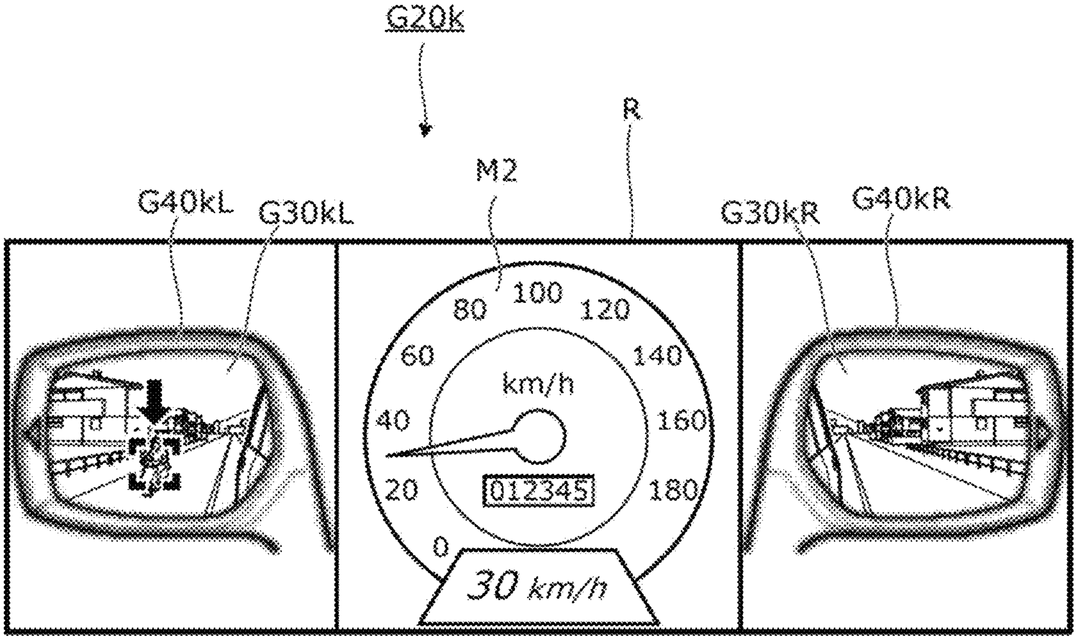
FIG. 19 is an explanatory drawing showing an auxiliary image according to Embodiment 12.

Embodiment 12 will now be described. FIG. 19 is an explanatory drawing showing auxiliary image G20*k* according to Embodiment 12. As shown in FIG. 19, in auxiliary image G20*k*, left frame image G40*k*L is disposed in the left side, right frame image G40*k*R is disposed in the right side, and vehicle speed meter M2 is disposed in the middle. Surround view image G30*k*L showing the space at the rear left of vehicle 1 is placed within left frame image G40*k*L, and surround view image G30*k*R showing the space at the rear right of vehicle 1 is placed within right frame image G40*k*R. Since left frame image G40*k*L is displayed in the left side and right frame image G40*k*R is disposed in the right side in this manner, this configuration makes it possible for the driver to grasp more intuitively which directions displayed surround view images G30*k*L and G30*k*R correspond to, based on the layout of the display. This mode of display may be adopted, for example, when the reverse gear is operated or when an alarming object is approaching from each of the rear right and rear left sides. A rear view image may also be displayed alongside the above display.

Figure 20:
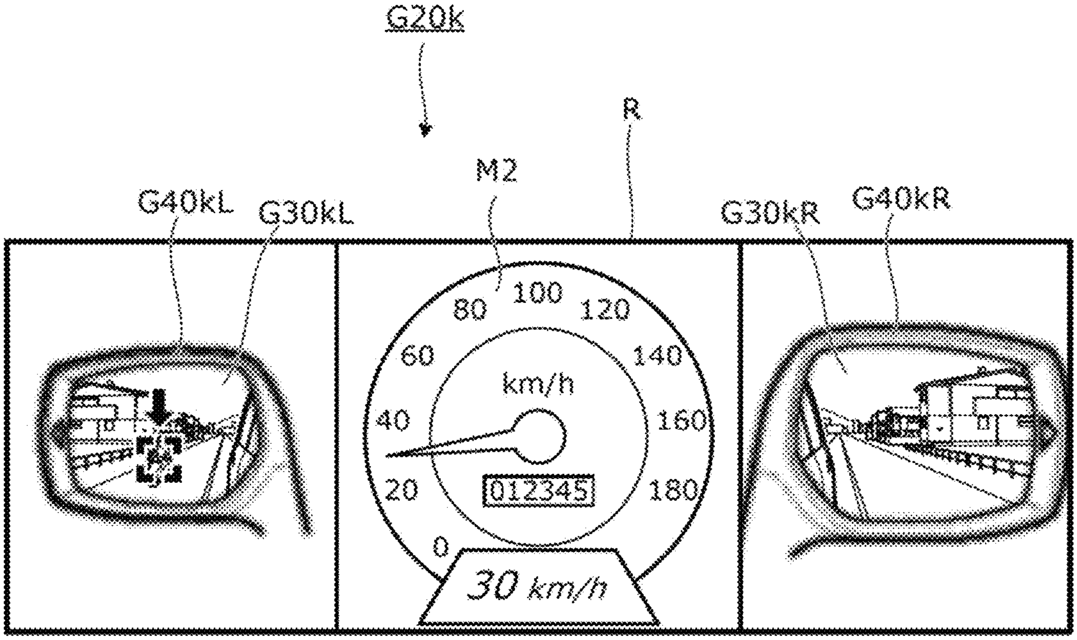
FIG. 20 is an explanatory drawing showing a variation of an auxiliary image according to Embodiment 12.

FIG. 20 is an explanatory drawing showing a variation of auxiliary image G20*k* according to Embodiment 12. For example, when the driver's seat is the right front seat, to the driver, the right side view mirror frame looks larger than the left side view mirror frame. In order to reproduce this effect, right frame image G40*k*R is displayed larger than left frame image G40*k*L in the example shown in FIG. 20. This configuration makes it possible for the driver to grasp more intuitively which directions displayed surround view images G30*k*L and 30GkL correspond to.

Embodiment 13

Figure 21:
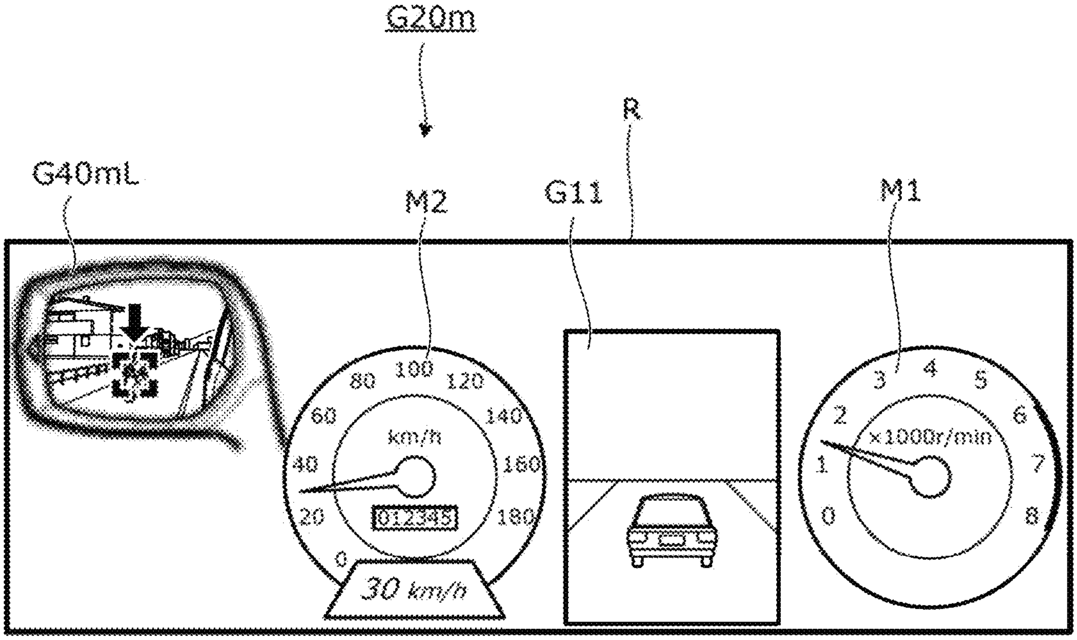
FIG. 21 is an explanatory drawing showing an auxiliary image according to Embodiment 13.
Figure 22:
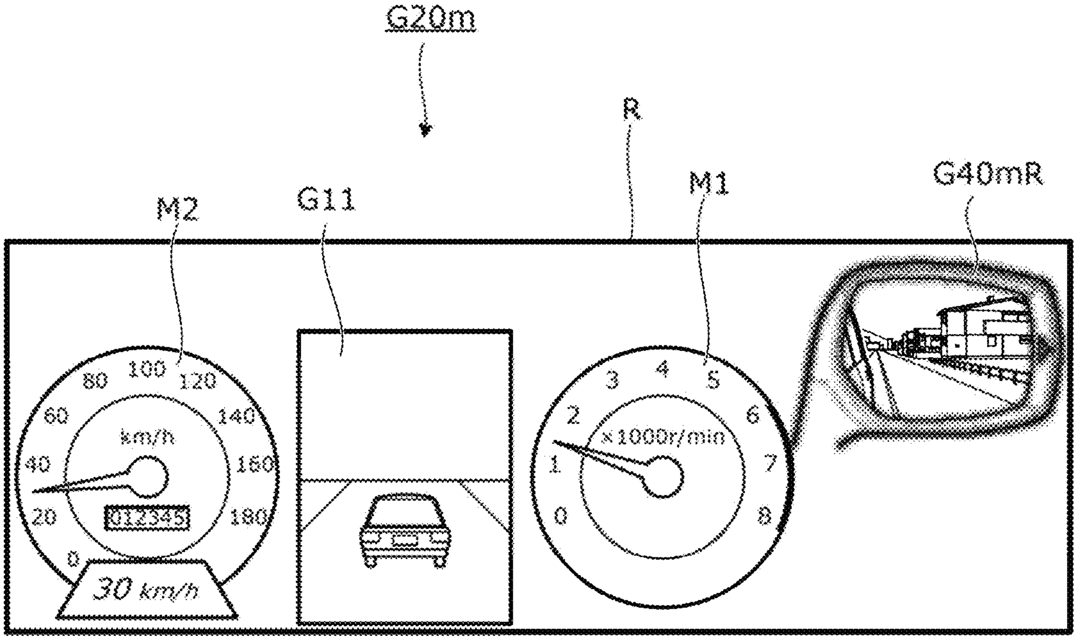
FIG. 22 is an explanatory drawing showing an auxiliary image according to Embodiment 13.

Embodiment 13 will now be described. FIG. 21 and FIG. 22 are each an explanatory drawing showing auxiliary image G20*m* according to Embodiment 13. As shown in FIG. 21 and FIG. 22, in auxiliary image G20*m*, vehicle speed meter M2, surround view image G11 showing the space ahead of vehicle 1, tachometer M1, and left frame image G40*m*L or right frame image G40*m*R are displayed such that they can be seen at once. Specifically, in the example shown in FIG. 21, in order from the left, left frame image G40*m*L, vehicle speed meter M2, surround view image G11, and tachometer M1 are arrayed. In the example shown in FIG. 22, in order from the left, vehicle speed meter M2, surround view image G11, tachometer M1, and right frame image G40*m*R are arrayed. Since various items of information are displayed such that they can be seen at once, this configuration makes it possible for the driver to grasp these items of information at once. Furthermore, in the case of the example shown in FIG. 22, right frame image G40*m*R is displayed in the upper right portion within display region R of first display device 100, and this configuration can thus reduce the amount of movement of the gaze in the up-down direction experienced when the user looking ahead of the vehicle moves his or her gaze to right frame image G40*m*R. Accordingly, the configuration above can reduce the stress that the driver experiences when moving his or her gaze. This description applies in a similar manner to left frame image G40*m*L shown in FIG. 21 as well.

Embodiment 14

Figure 23:
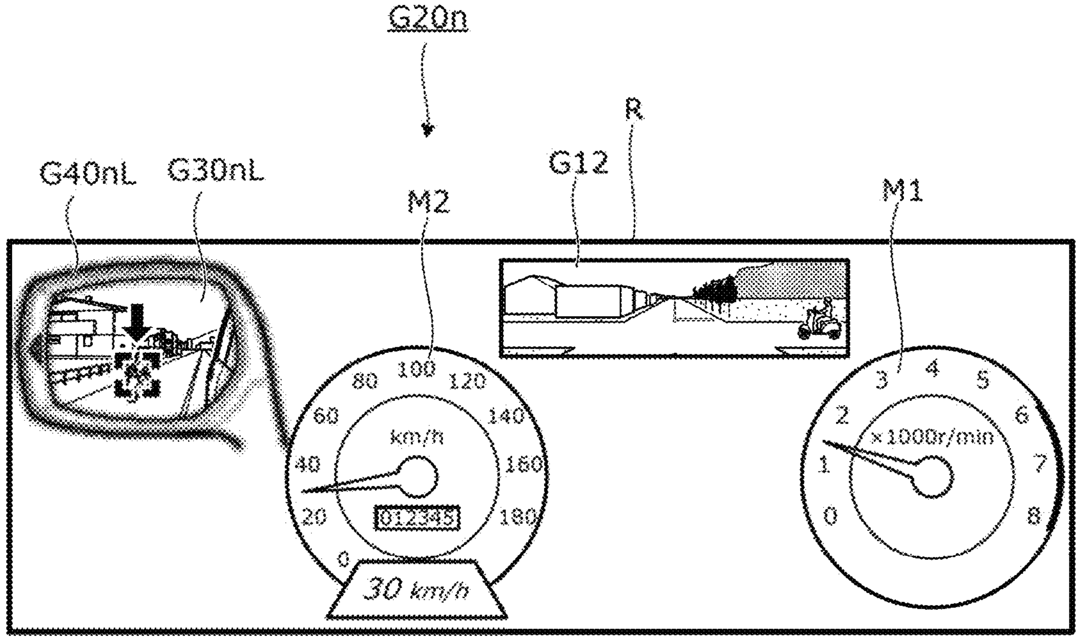
FIG. 23 is an explanatory drawing showing an auxiliary image according to Embodiment 14.
Figure 24:
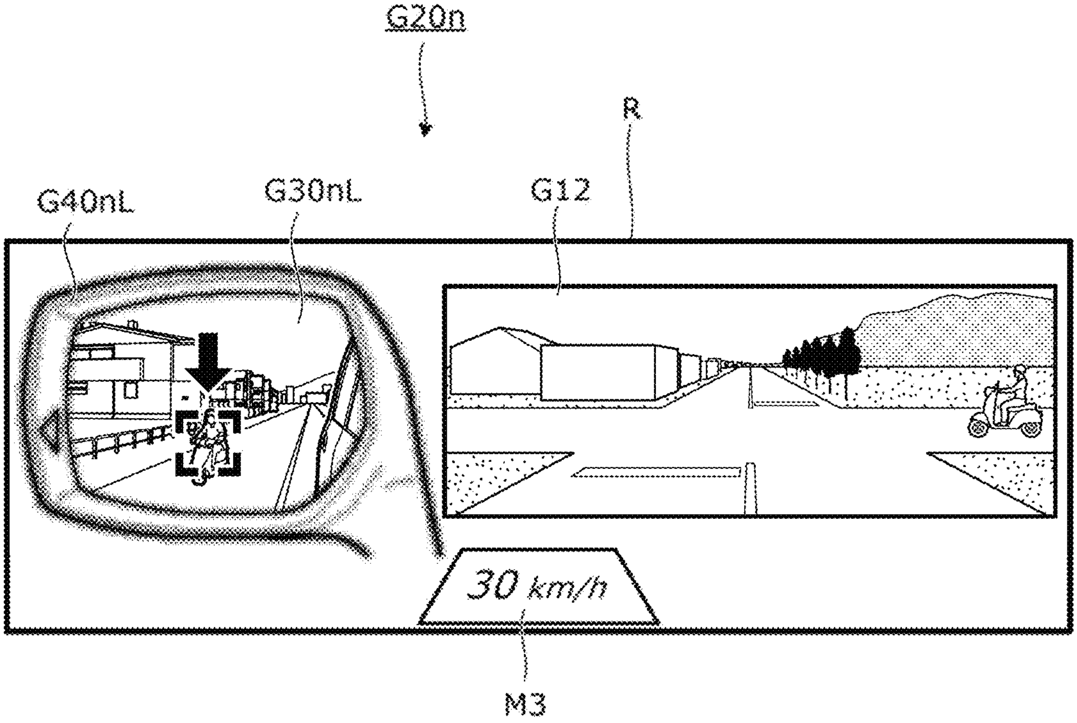
FIG. 24 is an explanatory drawing showing an auxiliary image according to Embodiment 14.

Embodiment 14 will now be described. FIG. 23 and FIG. 24 are each an explanatory drawing showing auxiliary image G20*n* according to Embodiment 14. In FIG. 23 and FIG. 24, an image captured by a front view camera of vehicle 1 is displayed as surround view image G12 (a front view image) by first display device 100. In this example, a front view camera is a camera that captures an image of the space in a wide-angle range ahead of vehicle 1 and can capture an image of an alarming object that is in the driver's blind spot created by an obstruction present ahead of the vehicle.

Specifically, in the example shown in FIG. 23, in order from the left, left frame image G40 nL, vehicle speed meter M2, surround view image G12, and tachometer M1 are arrayed. In the example shown in FIG. 24, left frame image G40 nL and surround view image G12 are disposed in the left and in the right, and vehicle speed meter M3 of digital display is disposed below surround view image G12.

In either of the examples, since surround view image G12 showing the space ahead of vehicle 1 and surround view image G30 nL within left frame image G40 nL are displayed such that they can be seen at once, this configuration makes it possible for the user to grasp simultaneously surround view images G12 and G30 nL.

Embodiment 15

Figure 25:
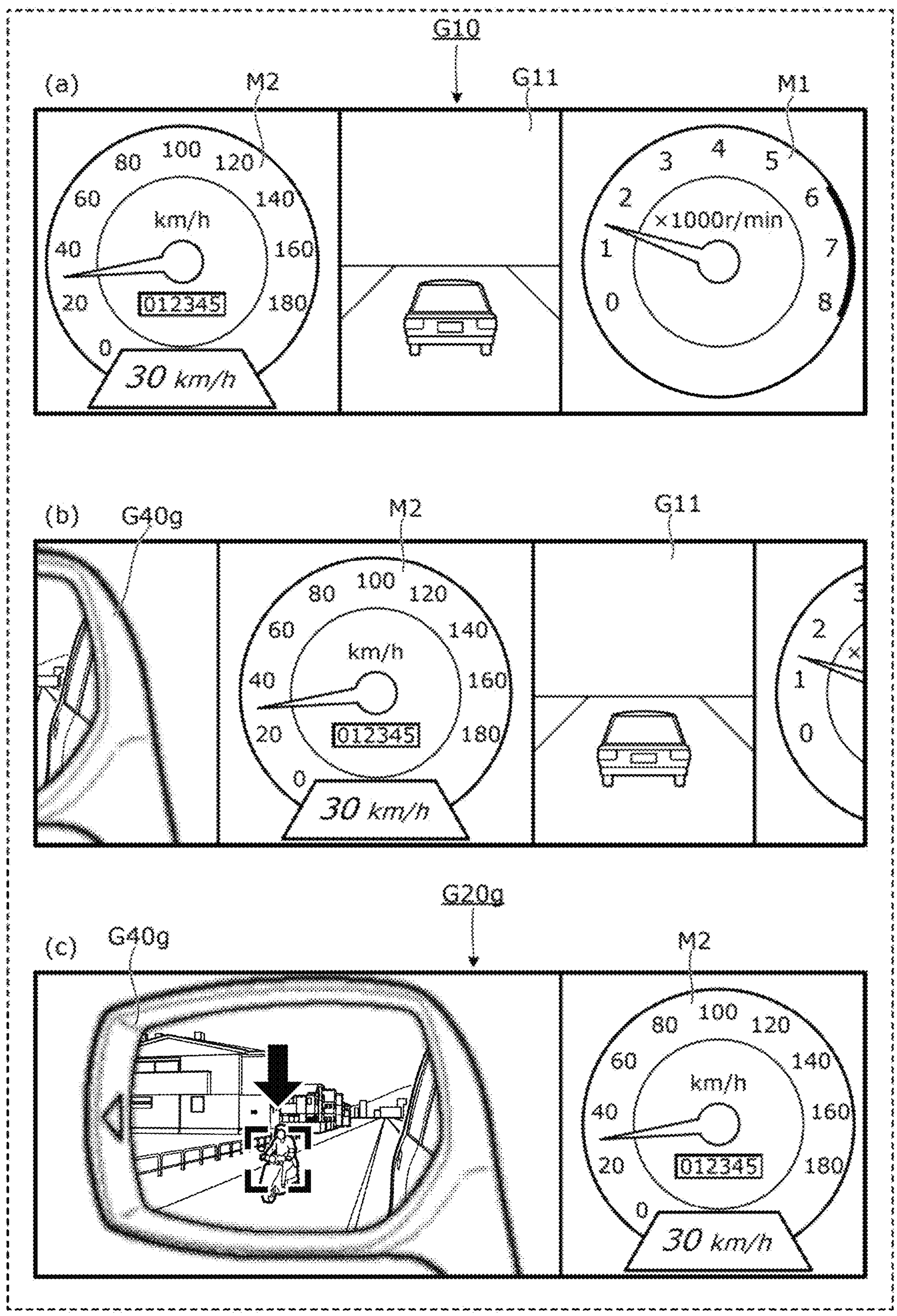
FIG. 25 is an explanatory diagram showing switching display in which display switches from a reference image to an auxiliary image according to Embodiment 15.

Embodiment 15 will now be described. According to Embodiment 15, a manner in which display is switched from reference image G10 to auxiliary image G20*g* will be described. FIG. 25 is an explanatory diagram showing switching display in which display switches from reference image G10 to auxiliary image G20*g* according to Embodiment 15. Herein, (a) of FIG. 25 shows reference image G10, (c) of FIG. 25 shows auxiliary image G20*g*, and (b) of FIG. 25 shows a state during the switch.

Specifically, while controller 500 is causing first display device 100 to display reference image G10 shown in (a) of FIG. 25, controller 500 starts to scroll reference image G10 to the right when a switching timing arrives. At this point, there is frame image G40*g* on the left side of reference image G10, and thus frame image G40*g* appears from the left side ((b) of FIG. 25). In the end, controller 500 causes first display device 100 to display auxiliary image G20*g*, as shown in (c) of FIG. 25. Since the switch between reference image G10 and auxiliary image G20*g* is performed by scrolling in this manner, this configuration can keep the driver from feeling disturbed by the execution of the switch.

Figure 26:
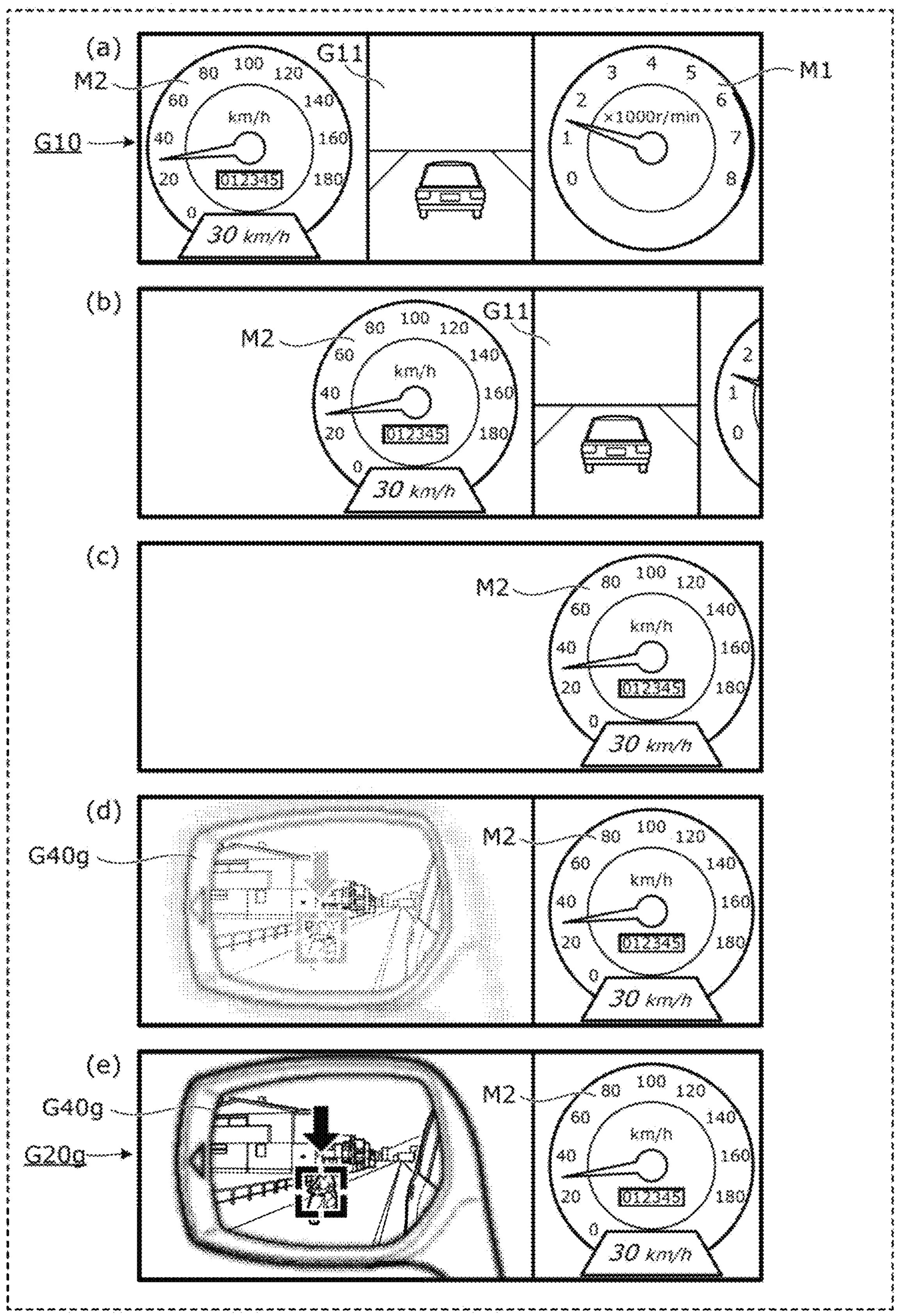
FIG. 26 is an explanatory drawing showing a variation of switching display in which display switches from a reference image to an auxiliary image according to Embodiment 15.

It is to be noted that switching display by scrolling is not limited to this example. FIG. 26 is an explanatory drawing showing a variation of switching display in which display switches from reference image G10 to auxiliary image G20*g* according to Embodiment 15. Herein, (a) of FIG. 26 shows reference image G10, (e) of FIG. 26 shows auxiliary image G20*g*, and (b) to (d) of FIG. 26 show states during the switch.

Specifically, while controller 500 is causing first display device 100 to display reference image G10 shown in (a) of FIG. 26, controller 500 starts to scroll reference image G10 to the right when a switching timing arrives. At this point, there is an empty space on the left side of reference image G10, and thus the empty space appears from the left side ((b) of FIG. 26). As the scrolling proceeds to reach the state in which only vehicle speed meter M2 is displayed as shown in (c) of FIG. 26, controller 500 displays frame image G40*g* in the empty space such that frame image G40*g* becomes darker gradually ((d) of FIG. 26). In the end, controller 500 causes first display device 100 to display auxiliary image G20*g*, as shown in (e) of FIG. 26.

Embodiment 16

Figure 27:
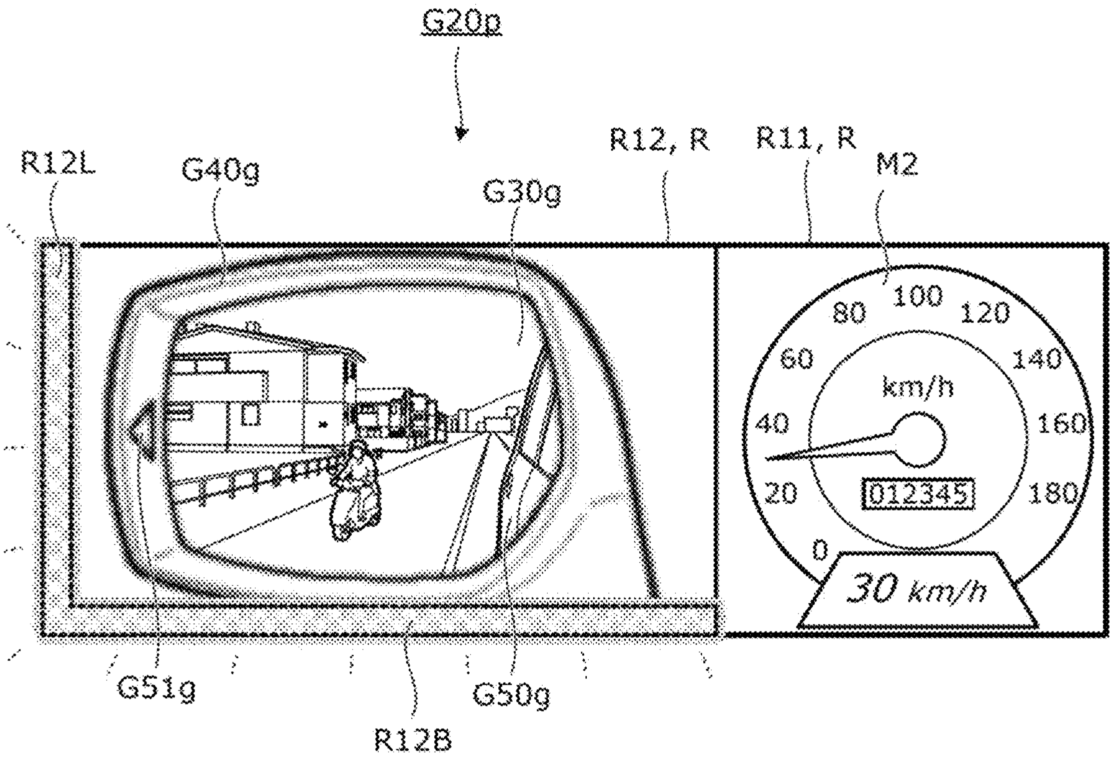
FIG. 27 is an explanatory drawing showing an auxiliary image according to Embodiment 16.

Embodiment 16 will now be described. FIG. 27 is an explanatory drawing showing auxiliary image G20*p* according to Embodiment 16. As shown in FIG. 27, of auxiliary image G20*p*, the region in which vehicle speed meter M2 is displayed is denoted as first region R11, and the region in which frame image G40*g* is displayed is denoted as second region R12. First region R11 and second region R12 are formed by dividing display region R of first virtual image 101 in the right-left direction. Controller 500 displays the periphery of second region R12 emphatically in accordance with the direction that surround view image G30*g* within frame image G40*g* corresponds to. Specifically, surround view image G30*g* is an image showing the space at the rear left of vehicle 1, and thus controller 500 causes left hand side R12L and lower side R12B of second region R12 to blink to thus display an emphatic display. Aside from the above, when surround view image G30*g* is an image showing the space at the rear right of vehicle 1, controller 500 causes the right hand side and the lower side of second region R12 to blink. Furthermore, for example, a plurality of light sources, such as light emitting diodes (LEDs), may be disposed on the outer periphery of display region R of first virtual image 101, and controller 500 may display an emphatic display by causing the light source or light sources at a position corresponding to the direction that surround view image G30*g* indicates to blink. In the example shown in FIG. 27, left hand side R12L and lower side R12B of second region R12 that constitute at least a part of the periphery of surround view image G30*g* blink, and thus that part of the periphery is displayed more emphatically relative to surround view image G30*g*. At the same time, the periphery of surround view image G30*g* and frame image G40*g* are blurred, and thus surround view image G30*g* is displayed more emphatically relative to the periphery of surround view image G30*g* and at least a part of frame image G40*g* (the entirety in the example shown in FIG. 27). However, these modes of an emphatic display do not have to be performed simultaneously, and in one example, only the former (causing left hand side R12L and lower side R12B of second region R12 to blink) may be performed, and neither the periphery of surround view image G30*g* nor frame image G40*g* may be blurred.

Since the direction that surround view image G30*g* corresponds to is indicated by frame image G40*g* as well as by the emphatic display, this configuration makes it possible for the driver to grasp more intuitively the direction that surround view image G30*g* corresponds to.

Embodiment 17

Figure 28:
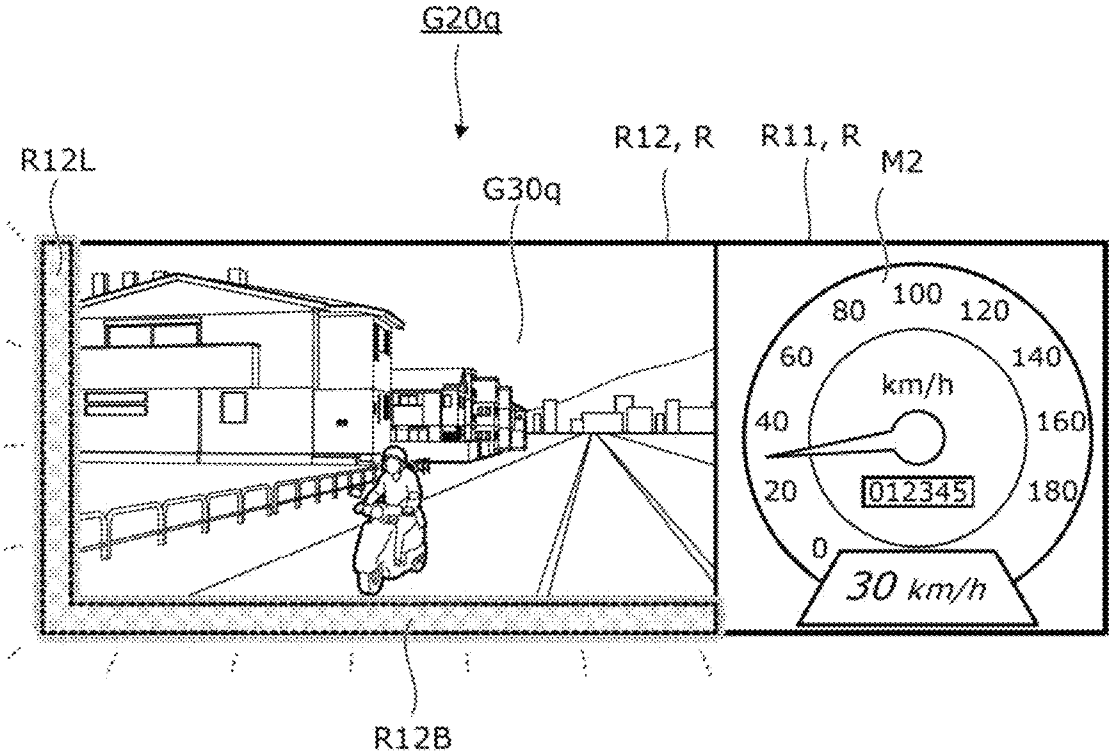
FIG. 28 is an explanatory drawing showing an auxiliary image according to Embodiment 17.

Embodiment 17 will now be described. FIG. 28 is an explanatory drawing showing auxiliary image G20*q* according to Embodiment 17. As shown in FIG. 28, in auxiliary image G20*q*, the entirety of second region R12 is filled by surround view image G30*q*. In this case, controller 500 displays a part of the periphery of surround view image G30*q* emphatically. Specifically, surround view image G30*q* is an image showing the space at the rear left of vehicle 1, and thus controller 500 causes left hand side R12L and lower side R12B of second region R12 to blink to thus display an emphatic display. Since the direction that surround view image G30*q* corresponds to is shown by the emphatic display in this manner, this configuration makes it possible for the driver to grasp intuitively which direction displayed surround view image G30*q* corresponds to.

Figure 29:
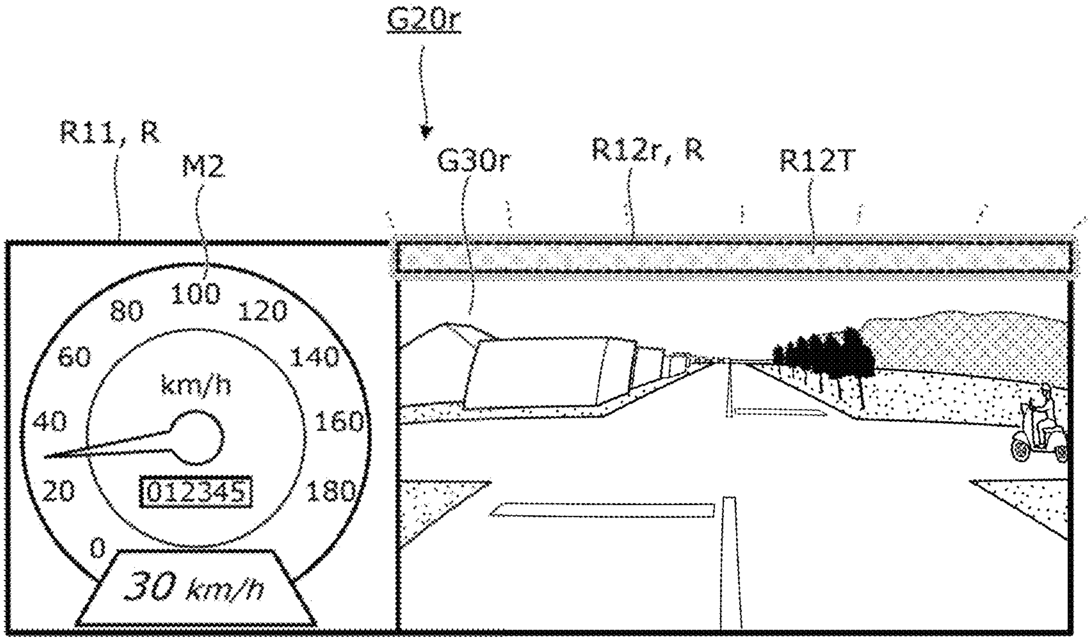
FIG. 29 is an explanatory drawing showing a variation of an auxiliary image according to Embodiment 17.

FIG. 29 is an explanatory drawing showing a variation of an auxiliary image according to Embodiment 17. As shown in FIG. 29, in auxiliary image G20*r*, the entirety of second region R12*r* is filled by surround view image G30*r*. Surround view image G30*r* is an image captured by a front view camera of vehicle 1. Since surround view image G30*r* is an image showing the space ahead of vehicle 1 in this manner, controller 500 displays an emphatic display by causing only upper side R12T of second region R12*r* to blink.

Embodiment 18

Figure 30:
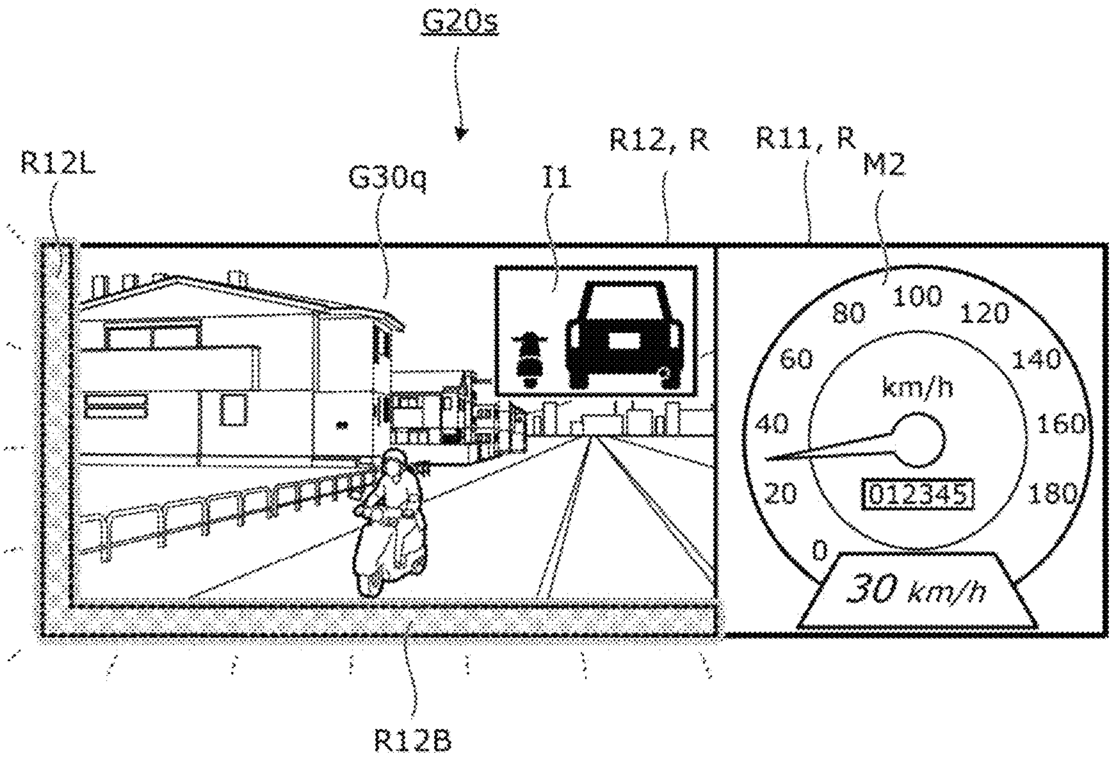
FIG. 30 is an explanatory drawing showing an auxiliary image according to Embodiment 18.

Embodiment 18 will now be described. FIG. 30 is an explanatory drawing showing auxiliary image G20*s* according to Embodiment 18. As shown in FIG. 30, controller 500 causes first display device 100 to display, along with surround view image G30*q*, icon 11 indicating the situation surrounding vehicle 1. Specifically, as the situation surrounding vehicle 1, icon I1 shows an alarming object displayed within surround view image G30*q*, along with vehicle 1. Icon I1 shown in FIG. 30 indicates that the alarming object is present close to and to the left of vehicle 1. Since icon I1 indicating the situation surrounding vehicle 1 is displayed along with surround view image G30*q* in this manner, this configuration makes it possible for the driver to grasp easily the situation surrounding the vehicle based on icon I1.

Figure 31:
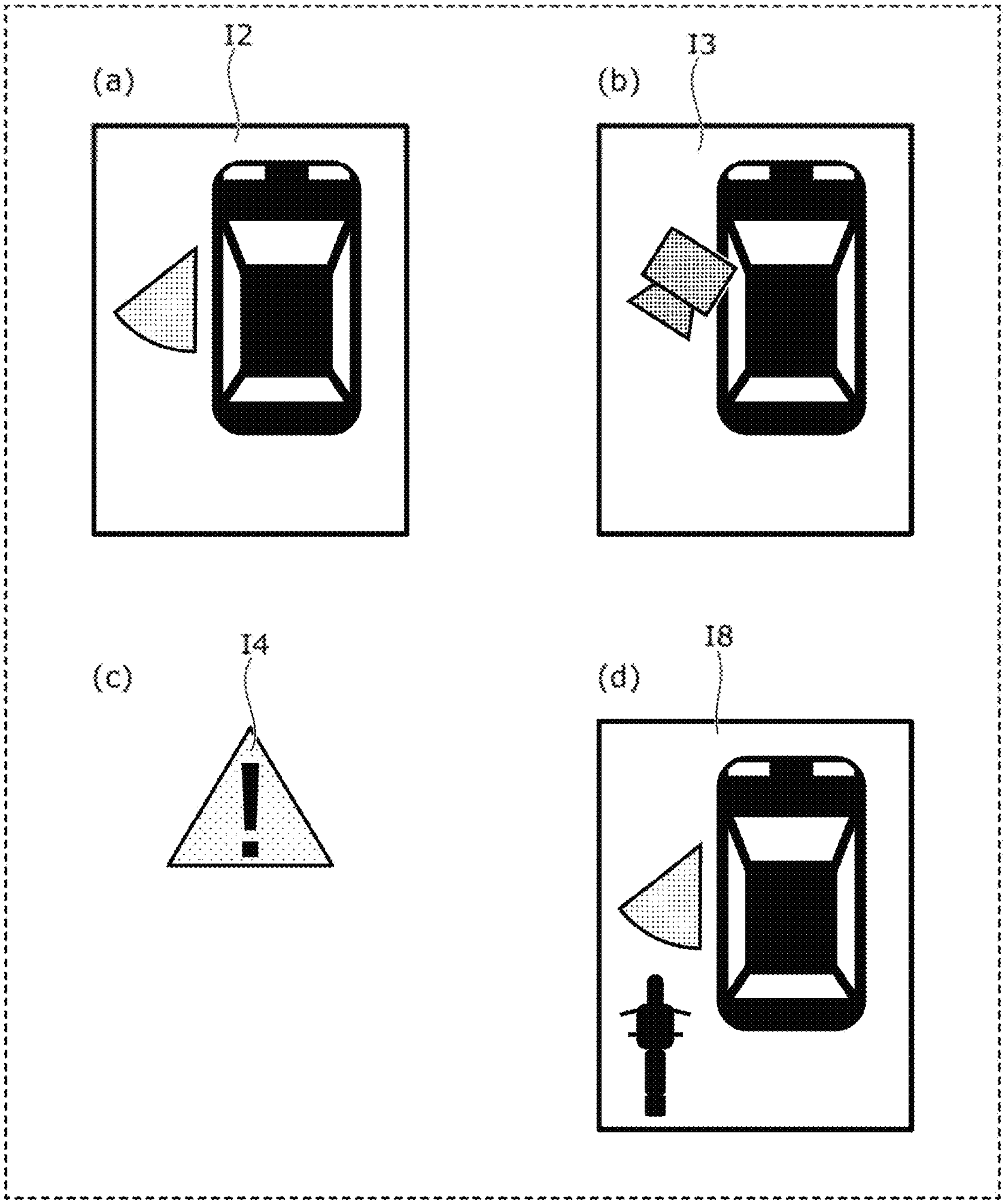
FIG. 31 is an explanatory drawing showing other examples of an icon according to Embodiment 18.

FIG. 31 is an explanatory drawing showing other examples of an icon according to Embodiment 18. Icon 12 shown in (a) of FIG. 31 indicates by the use of a fan-shaped mark that an alarming object is present behind and to the left of vehicle 1. Icon 13 shown in (b) of FIG. 31 indicates by the use of a camera mark that an alarming object is present behind and to the left of vehicle 1. Icon 14 shown in (c) of FIG. 31 indicates by the use of a warning mark that an alarming object is in surround view image G30*q*. Icon 18 shown in (d) of FIG. 31 indicates by the use of a fan-shaped mark that an alarming object is present behind and to the left of vehicle 1 and also indicates what the alarming object is by the use of a motorcycle mark. Herein, if the type of an alarming object (e.g., a motorcycle, a bicycle, an automobile, a kickboard, a pedestrian, or the like) can be detected with the use of, for example, a sensor, a mark corresponding to the detected type may be included in icon 18.

Figure 32:
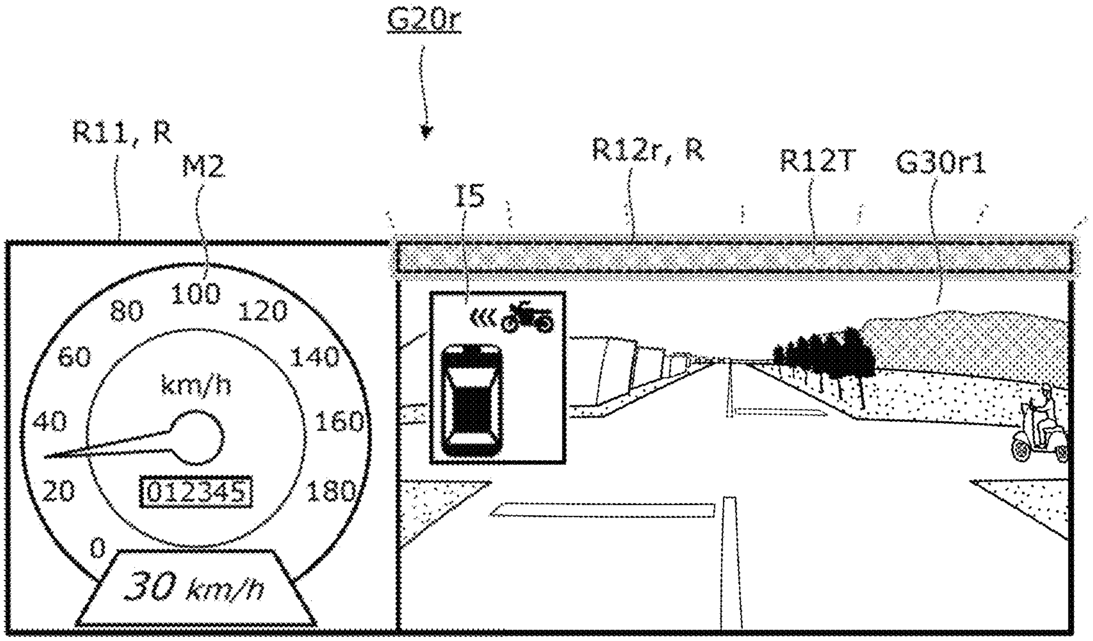
FIG. 32 is an explanatory drawing showing a variation of an auxiliary image according to Embodiment 18.

FIG. 32 is an explanatory drawing showing a variation of an auxiliary image according to Embodiment 18. As shown in FIG. 32, controller 500 causes first display device 100 to display, along with surround view image G30*r*1, icon 15 indicating the situation surrounding vehicle 1. Icon 15 shown in FIG. 32 indicates an alarming object that is ahead of vehicle 1 and is approaching vehicle 1 from the right.

Figure 33:
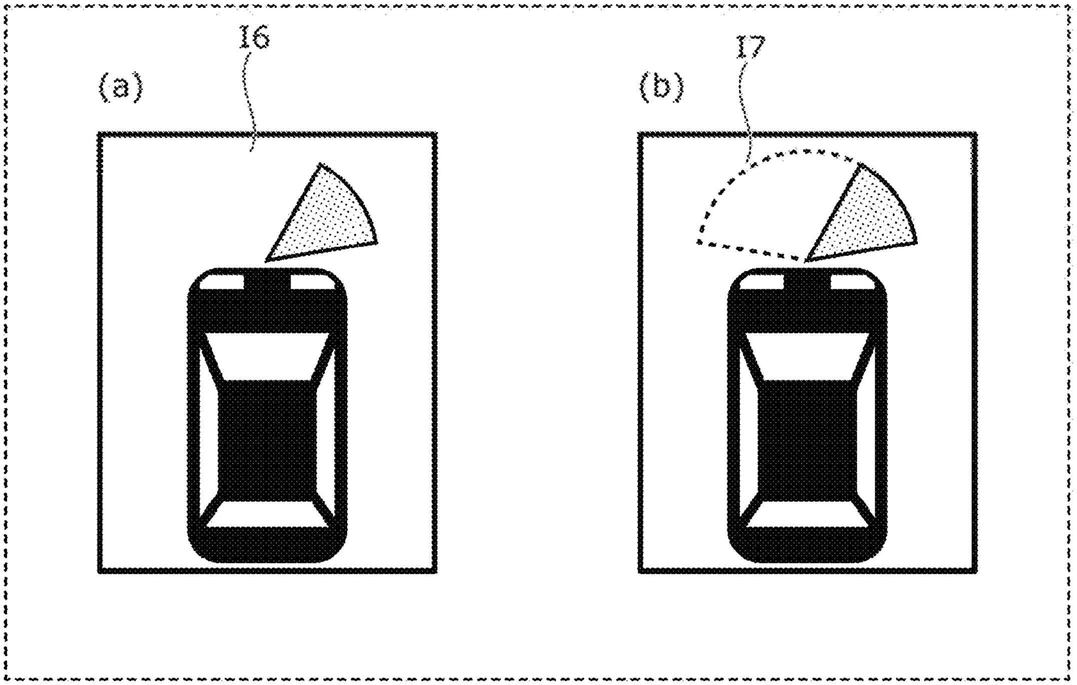
FIG. 33 is an explanatory drawing showing another example of an icon according to Embodiment 18.

FIG. 33 is an explanatory drawing showing other examples of an icon according to Embodiment 18. Icon 16 shown in (a) of FIG. 33 indicates by the use of a fan-shaped mark that an alarming object is present ahead of and to the right of vehicle 1. Icon 17 shown in (b) of FIG. 33 indicates by the use of a fan-shaped mark an alarming object that is ahead of vehicle 1 and is approaching vehicle 1 from the right. This fan-shaped mark may spread along the dashed line, and this spread indicates the level of alarm that the alarming object poses.

Embodiment 19

Figure 34:
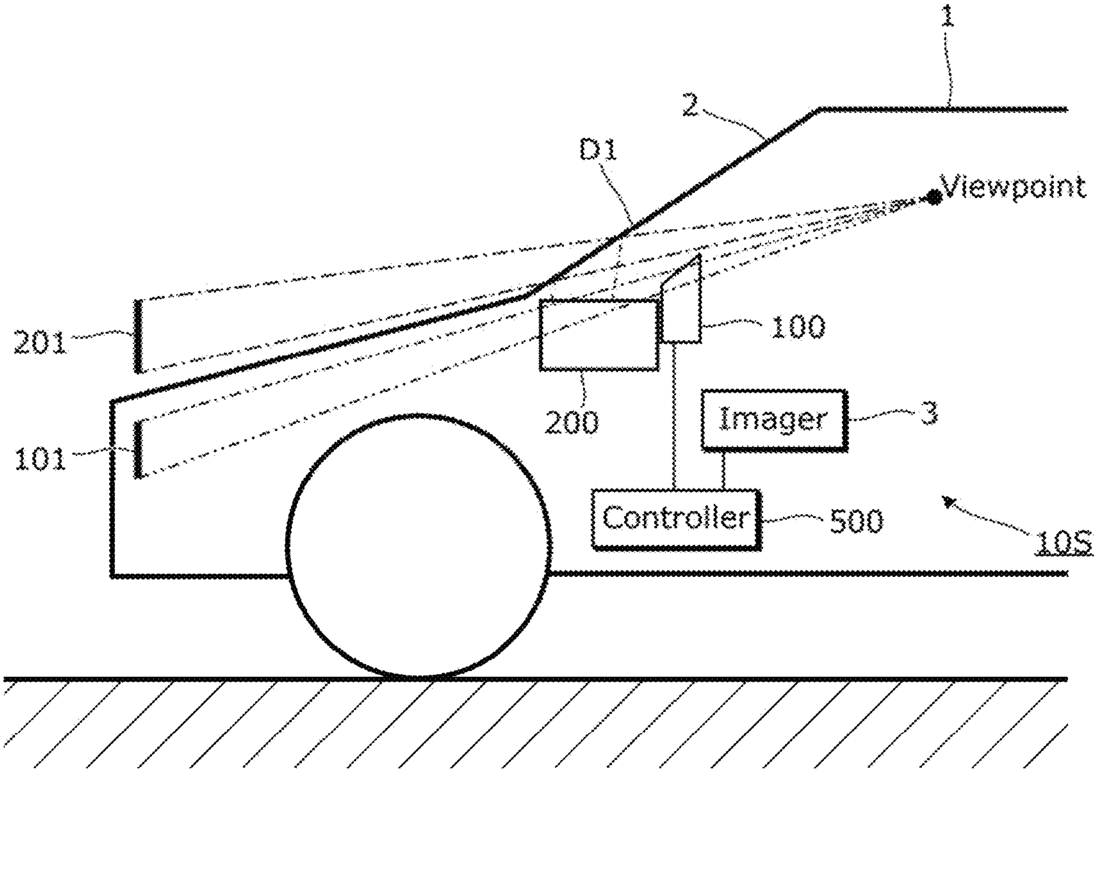
FIG. 34 is a schematic diagram showing a display system according to Embodiment 19.

Embodiment 19 will now be described. FIG. 34 is a schematic diagram showing display system 10S according to Embodiment 19. As shown in FIG. 34, display system 10S further includes second display device 200 that projects second virtual image 201 ahead of the driver and above first virtual image 101.

Second display unit 200 is an augmented reality head-up display (AR-HUD). Second display device 200 projects light toward region D1 of windshield (front glass) 2 serving as a display medium. The projected light is reflected by windshield 2. This reflected light travels toward the eyes of a user of second display device 200, that is, the driver in the driver's seat. The driver perceives the reflected light entering his or her eyes as second virtual image 201 appearing on the other side of windshield 2 (on the outside of the vehicle) with the actual objects that are present and visible through windshield 2 in the background.

Figure 35:
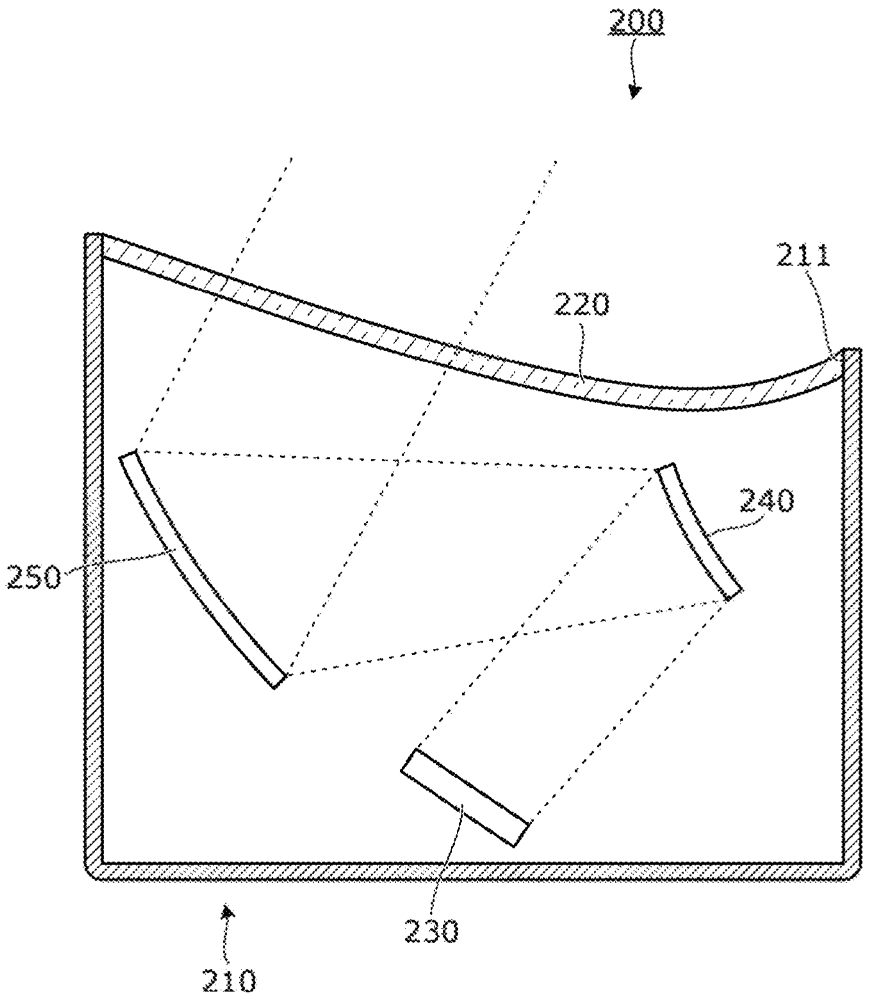
FIG. 35 is a schematic sectional view showing a second display device according to Embodiment 19.

Next, a configuration of second display device 200 will be described with reference to FIG. 35. FIG. 35 is a schematic sectional view showing second display device 200 according to Embodiment 19.

As shown in FIG. 35, second display device 200 includes housing 210, cover portion 220, display element 230, first optical element 240, and second optical element 250. First optical element 240 and second optical element 250 constitute an optical system for projecting image light from display element 230 to form second virtual image 201.

Housing 210 is a box-shaped member formed of a light blocking resin or metal. Specifically, housing 210 is substantially rectangular parallelepipedal, and has opening 211 formed in its upper part. Opening 211 is covered by cover portion 220. The inner space defined by housing 210 and cover portion 220 houses display element 230, first optical element 240, and second optical element 250.

Cover portion 220 is a curved plate member formed, for example, of a light transmissive resin or glass. Specifically, cover portion 220 as a whole has a shape that is convex downward.

Display element 230 is, for example, a liquid crystal panel, and when illuminated with light from a light source (not shown), emits image light that forms second virtual image 201 toward first optical element 240. Display element 230 may be an organic EL panel. Display element 230 is formed in a rectangular shape as viewed in plan view, and is disposed in an orientation in which display element 230 is inclined relative to the horizontal plane.

First optical element 240 is an optical element that is disposed in the optical path of image light emitted from display element 230 and that reflects the image light toward second optical element 250. First optical element 240 is a convex mirror formed in a rectangular shape as viewed in plan view. First optical element 240 is disposed in an orientation in which first optical element 240 is inclined related to the vertical plane. The reflective surface of first optical element 240 faces display element 230 and second optical element 250. In other words, first optical element 240 is disposed such that the reflective surface of its mirror surface constituted by the convex mirror faces inward of housing 210 and its concave surface faces outward of housing 210.

Second optical element 250 is an optical member that is disposed in the optical path of the image light transmitted through first optical element 240 and that reflects the image light reflected by first optical element 240 toward opening 211. Specifically, second optical element 250 is a concave mirror formed in a rectangular shape as viewed in plan view. Second optical element 250 is disposed in an orientation in which second optical element 250 faces the reflective surface of first optical element 240 and is inclined relative to the vertical plane of housing 210. The reflective surface of second optical element 250 faces first optical element 240 and cover portion 220. In other words, second optical element 250 is disposed such that the reflective surface of its mirror surface constituted by the concave mirror faces inward of housing 210 and its convex surface faces outward of housing 210. The image light reflected by second optical element 250 is projected toward windshield 2 via opening 211. Upon being reflected, this image light travels toward the eyes of the driver in the driver's seat and produces second virtual image 201. FIG. 34 shows the position where, from the driver's viewpoint, he or she perceives second virtual image 201 to appear. This position can be set by adjusting the apparent distance of the image light emitted from display element 230 of second display device 200. The driver's viewpoint is, for example, a reference eye point.

Figure 36:
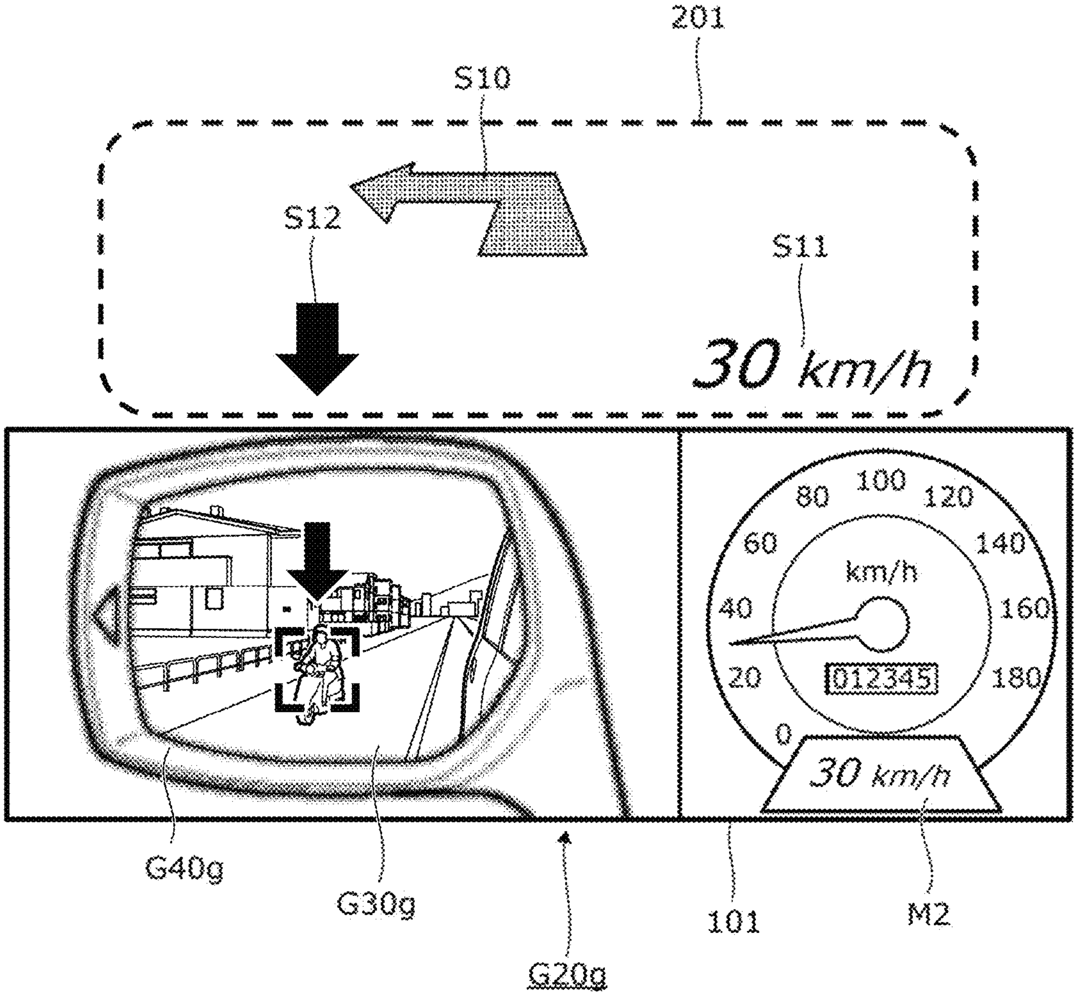
FIG. 36 is an explanatory drawing showing an example of display by a first display device and a second display device according to Embodiment 19.

Controller 500 is electrically connected to second display device 200 and controls the content to be displayed by display element 230. FIG. 36 is an explanatory drawing showing an example of display by first display device 100 and second display device 200 according to Embodiment 19. As shown in FIG. 36, in first virtual image 101 displayed by first display device 100, reference image G10 and auxiliary image G20*g* are displayed such that they can be switched freely therebetween (FIG. 36 shows a state held while auxiliary image G20*g* is displayed). Second virtual image 201 displayed by second display device 200 is positioned above and close to first virtual image 101, and displays navigation information S10 and so on of vehicle 1. Specifically, in second virtual image 201, an arrow instructing the driver to turn left, as navigation information G10, as well as vehicle speed meter S11 and gaze guiding arrow S12 is displayed. Gaze guiding arrow S12 is a guiding image for guiding the driver's gaze to an alarming object that appears in surround view image G30*g* within frame image G40*g*.

Since gaze guiding arrow S12 is included in second virtual image 201 in this manner, this configuration makes it possible to guide the driver's gaze to surround view image G30*g* in first virtual image 101 by gaze guiding arrow S12. Thus, the configuration above makes it possible for the driver to move his or her gaze smoothly to surround view image G30*g*.

Furthermore, controller 500 may switch from reference image G10 to auxiliary image G20*g* at a timing of displaying navigation information S10. Since surround view image G30*g* is displayed in conjunction with navigation information S10 in this manner, this configuration makes it possible for the driver to grasp navigation information S10 and surround view image G30*g* at once.

Embodiment 20

Figure 37:
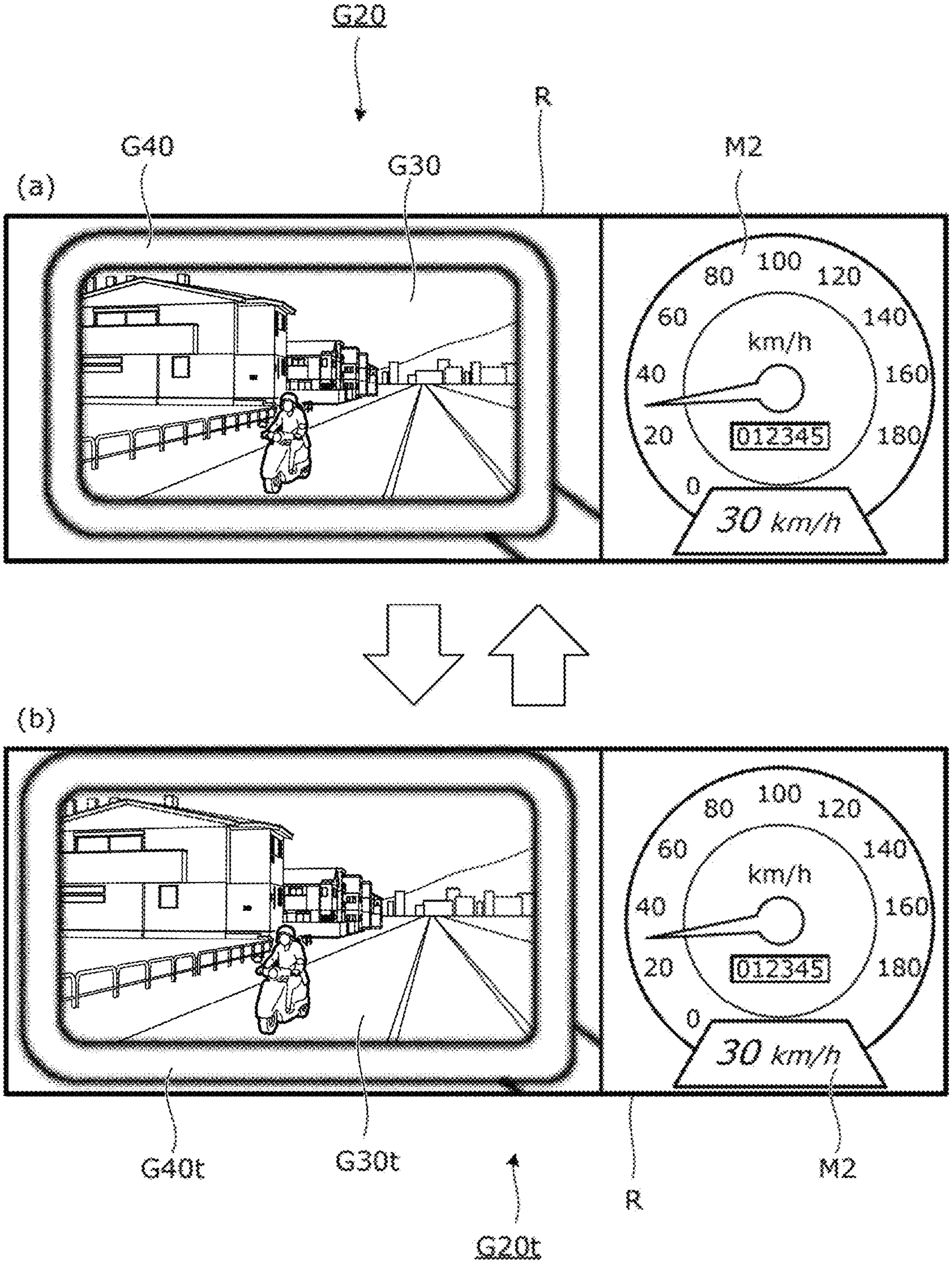
FIG. 37 is an explanatory drawing showing auxiliary images according to Embodiment 20.

Embodiment 20 will now be described. FIG. 37 is an explanatory drawing showing auxiliary images G20 and G20*t* according to Embodiment 20. According to Embodiment 20, auxiliary image G20 is displayed by first display device 100 when a predetermined condition is not satisfied, and auxiliary image G20 is switched to alternative auxiliary image G20*t* when the predetermined condition is satisfied.

Herein, (a) of FIG. 37 shows auxiliary image G20, and (b) of FIG. 37 shows alternative auxiliary image G20*t*. Auxiliary image G20 and auxiliary image G20*t* differ from each other visually in frame images G40 and G40*t*. Specifically, frame image G40 of auxiliary image G20 and frame image G40*t* of auxiliary image G20*t* differ in their sizes. In the case illustrated in FIG. 37, frame image G40*t* of auxiliary image G20*t* is larger than frame image G40 of auxiliary image G20. Alternatively, frame image G40*t* may be smaller than frame image G40. Surround view image G30*t* in frame image G40*t* may or may not be enlarged to match the size of frame image G40*t*.

When a predetermined condition is satisfied while auxiliary image G20 is being displayed by first display device 100, controller 500 switches auxiliary image G20 to auxiliary image G20*t* by controlling first display device 100. Herein, the predetermined condition may be at least one of, for example, a case in which the distance from vehicle 1 to an alarming object falls below a predetermined distance, a case in which an alarming object turns on the blinker in the direction of approaching vehicle 1, or a case in which an alarming object is traveling unstably (meandering or the like). Controller 500 makes a determination on these conditions by subjecting an image captured by imager 3 to a known detection process. Herein, the distance from vehicle 1 to an alarming object may be determined with the use of the detection result of a range finding sensor (a radar, a light detection and ranging (LiDAR), or the like) provided in vehicle 1.

While the predetermined condition is being satisfied, controller 500 may repeatedly switch between auxiliary image G20 and auxiliary image G20*t*. Alternatively, controller 500 may display only auxiliary image G20*t* while the predetermined condition is being satisfied and may revert to auxiliary image G20 once the predetermined condition ceases to be satisfied.

Since frame images G40 and G40*t* of different sizes are displayed depending on whether the predetermined condition is satisfied or not in this manner, this configuration makes it possible for the driver to grasp whether the predetermined condition is satisfied simply by recognizing the size difference.

Variations of the alternative auxiliary image will be described below. FIG. 38 to FIG. 41 are explanatory drawings showing alternative auxiliary images G20*u*, G20*v*, G20*w*, and G20*x* according to Embodiment 21. FIG. 38 to FIG. 41 correspond to FIG. 37.

Figure 38:
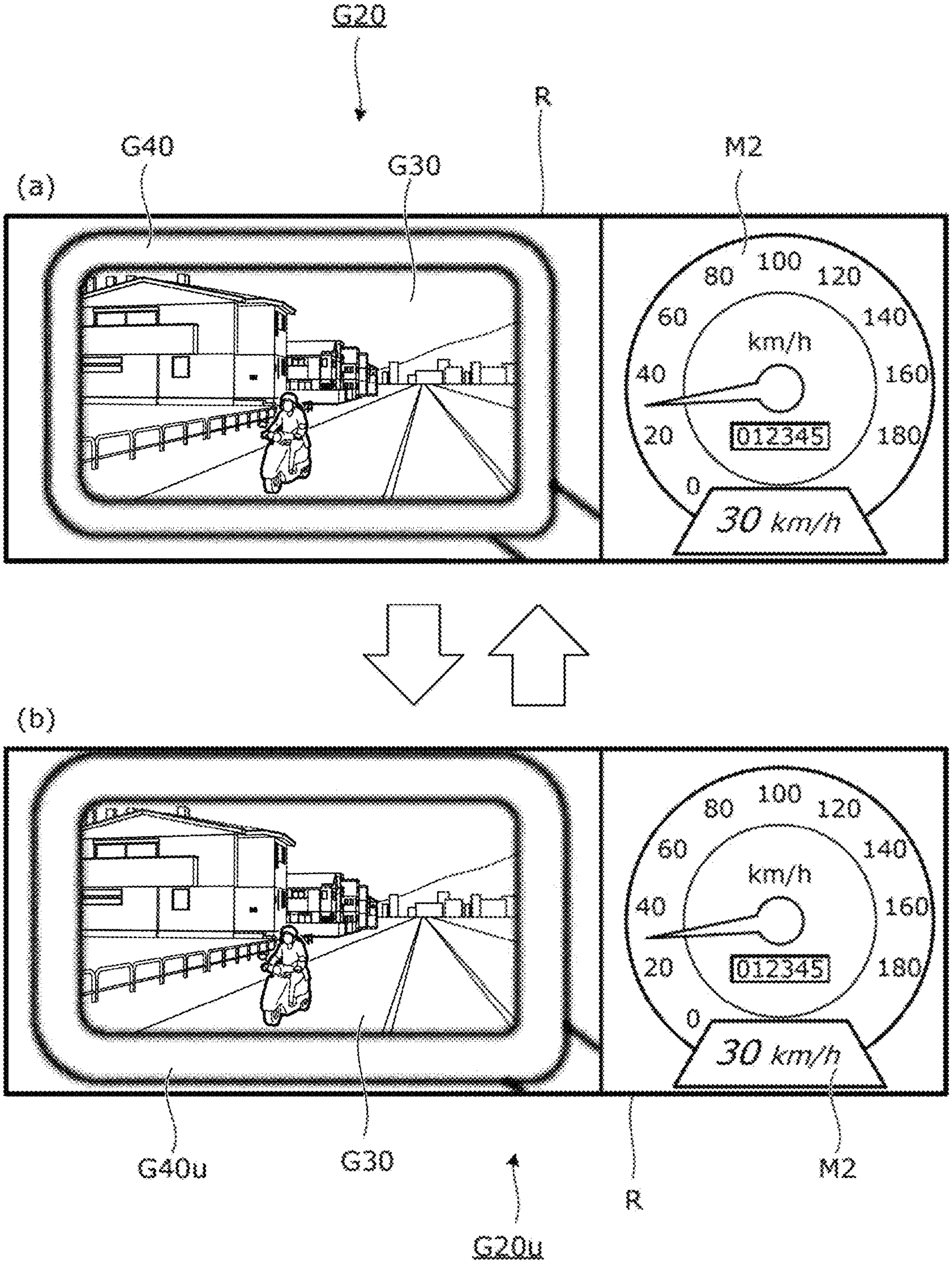
FIG. 38 is an explanatory drawing showing an alternative auxiliary image according to Embodiment 21.

Herein, (a) of FIG. 38 shows auxiliary image G20, and (b) of FIG. 38 shows alternative auxiliary image G20*u*. Auxiliary image G20 and auxiliary image G20*u* differ from each other visually as the frame lines of frame images G40 and G40*u* differ in thickness. In the case illustrated in FIG. 38, the frame line of frame image G40*u* of auxiliary image G20*u* is thicker than the frame line of frame image G40 of auxiliary image G20. Alternatively, this relationship may be reversed.

Since the thickness of the frame lines of frame images G40 and G40*u* differ from each other depending on whether the predetermined condition is satisfied or not in this manner, this configuration makes it possible for the driver to grasp whether the predetermined condition is satisfied simply by recognizing that difference.

Figure 39:
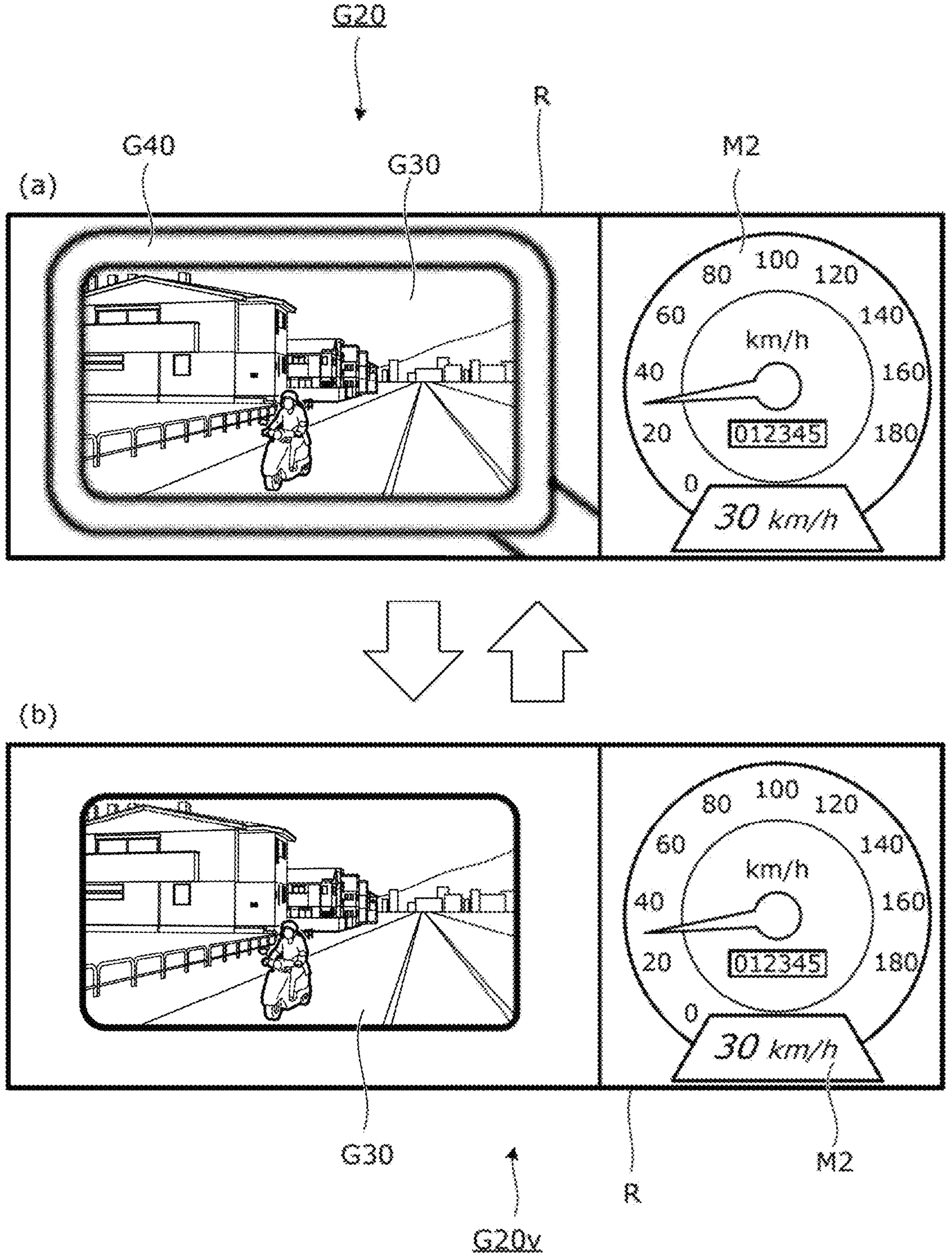
FIG. 39 is an explanatory drawing showing an alternative auxiliary image according to Embodiment 21.

Next, (a) of FIG. 39 shows auxiliary image G20, and (b) of FIG. 39 shows alternative auxiliary image G20*v*. Auxiliary image G20 and auxiliary image G20*v* differ from each other visually in the presence or absence of frame image G40. In other words, no frame image is displayed in auxiliary image G20*v*.

Since frame image G40 is present or absent depending on whether the predetermined condition is satisfied or not in this manner, this configuration makes it possible for the driver to grasp whether the predetermined condition is satisfied simply by recognizing that difference.

Figure 40:
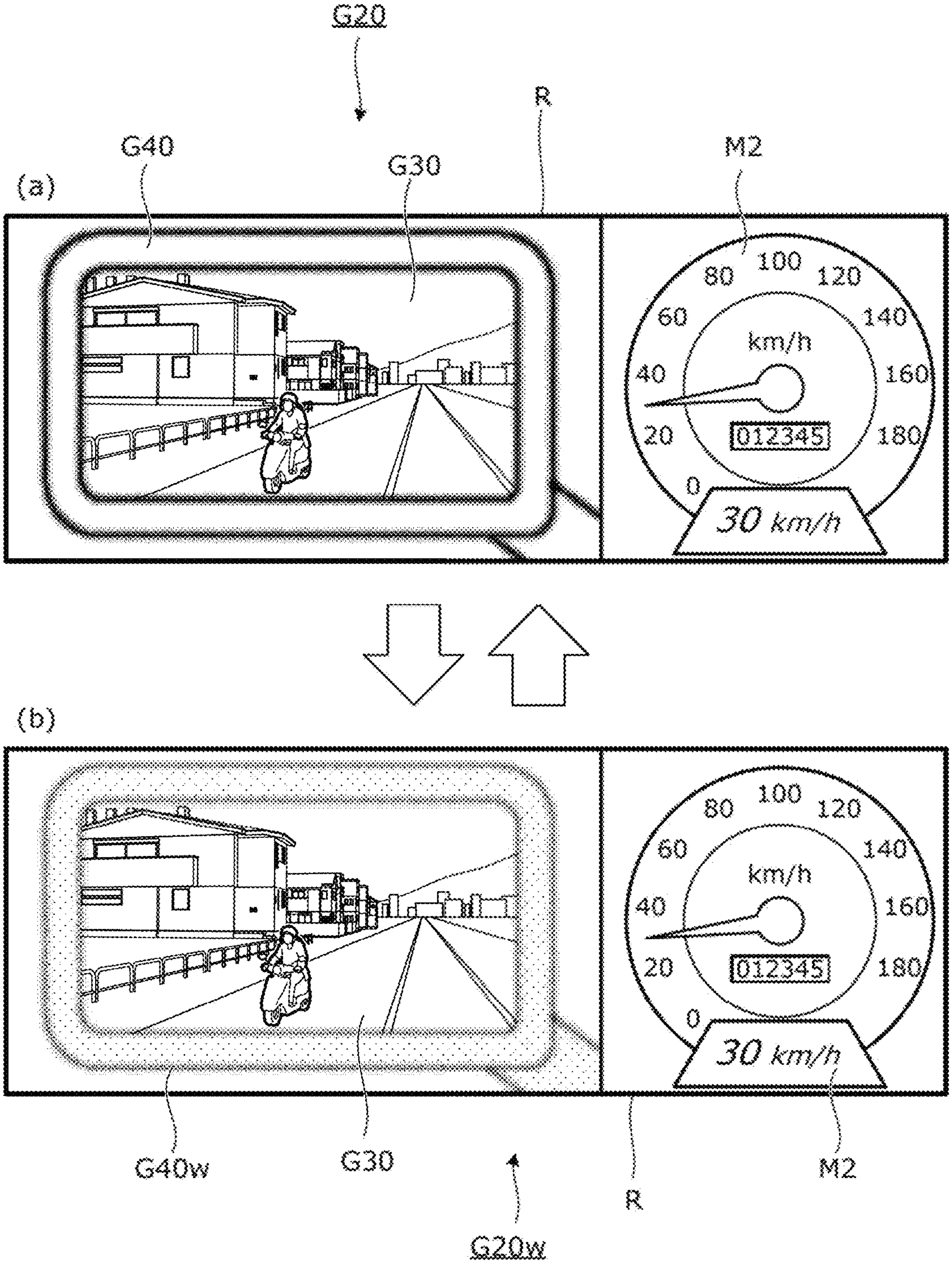
FIG. 40 is an explanatory drawing showing an alternative auxiliary image according to Embodiment 21.

Next, (a) of FIG. 40 shows auxiliary image G20, and (b) of FIG. 40 shows alternative auxiliary image G20*w*. Auxiliary image G20 and auxiliary image G20*w* differ from each other visually as frame images G40 and G40*w* differ in color. Herein, that two images differ in color means that the two images differ in terms of at least one of the chromaticity, the brightness, or the saturation.

Since the colors of frame images G40 and G40*w* differ from each other depending on whether the predetermined condition is satisfied or not in this manner, this configuration makes it possible for the driver to grasp whether the predetermined condition is satisfied simply by recognizing that difference.

Figure 41:
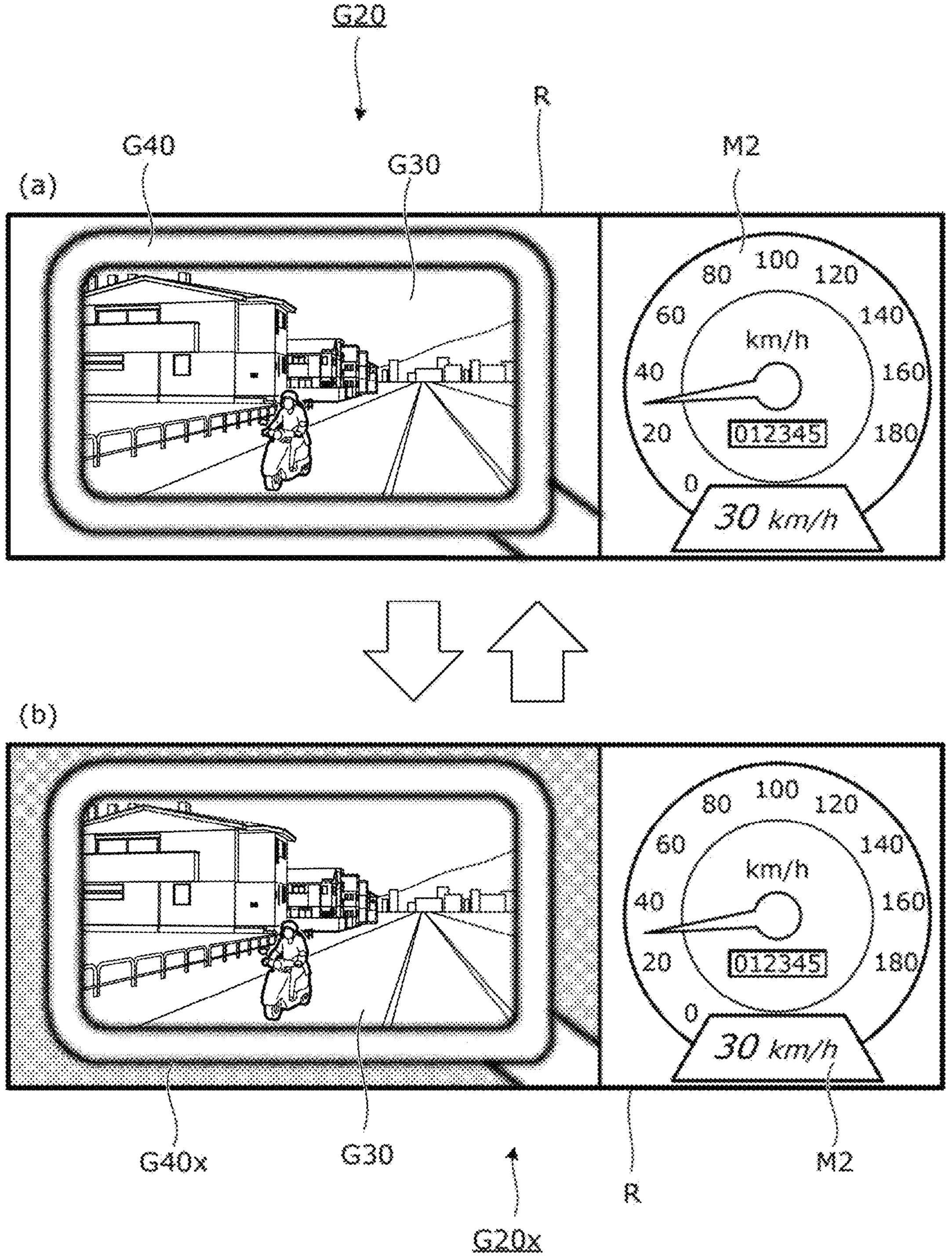
FIG. 41 is an explanatory drawing showing an alternative auxiliary image according to Embodiment 21.

Next, (a) of FIG. 41 shows auxiliary image G20, and (b) of FIG. 41 shows alternative auxiliary image G20*x*. Auxiliary image G20 and auxiliary image G20*x* differ from each other visually as frame images G40 and G40*w* differ in their backgrounds. In the case illustrated in FIG. 41, the backgrounds of frame images G40 and G40*x* differ from each other in color. Alternatively, frame images G40 and G40*x* may differ from each other in the content displayed in the background.

Since the backgrounds of frame images G40 and G40*x* differ from each other depending on whether the predetermined condition is satisfied or not in this manner, this configuration makes it possible for the driver to grasp whether the predetermined condition is satisfied simply by recognizing that difference.

Embodiment 21

Figure 42:
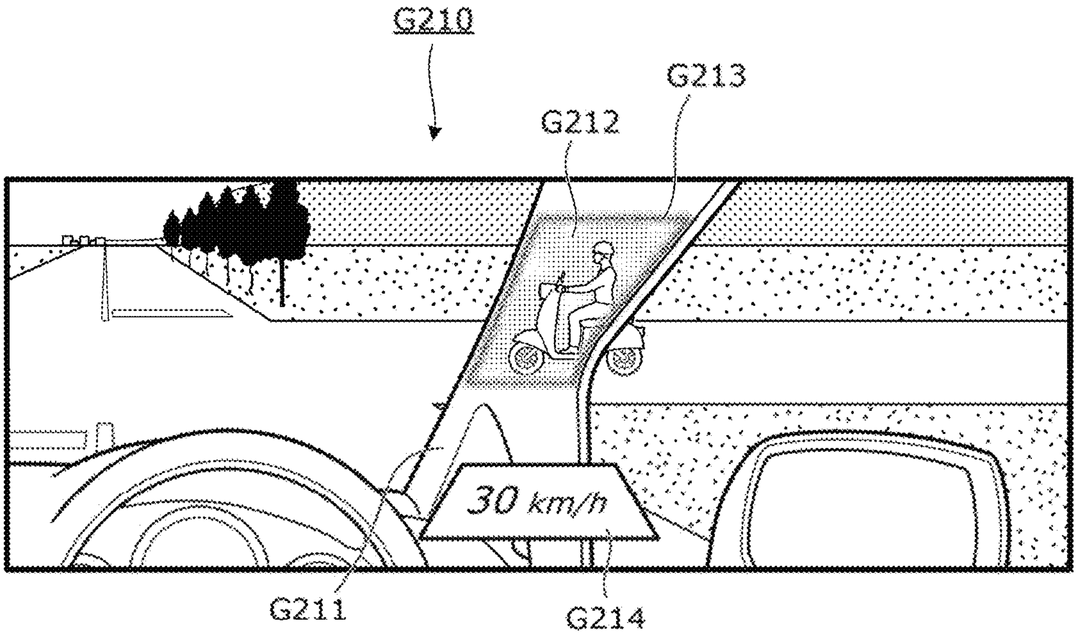
FIG. 42 is an explanatory drawing showing an auxiliary image according to Embodiment 21.

Embodiment 21 will now be described. FIG. 42 is an explanatory drawing showing auxiliary image G210 according to Embodiment 21. Auxiliary image G210 is an image showing a scene that is in the driver's blind spot created by a pillar of vehicle 1. FIG. 42 shows auxiliary image G210 corresponding to the right pillar of vehicle 1.

Furthermore, vehicle 1 includes an in-cabin camera that captures an image of the cabin space and a pillar camera that captures an image of the outer space that is in the blind spot created by the pillar. In auxiliary image G210, in-cabin image G211 captured by the in-cabin camera and vehicle exterior image G212 captured by the pillar camera are combined and displayed along with digital speed meter G214. The pillar camera is one example of the imager, and vehicle exterior image G212 is included in a front view image. In this example, whether an object of interest in vehicle exterior image G212 (the motorcycle in the example shown in FIG. 42) is in the driver's blind spot is determined based on the positional relationship between the object of interest in vehicle exterior image G212 and the viewpoint position of the driver detected by a camera provided separately in the cabin to monitor the driver. When an alarming object in vehicle exterior image G212 is determined to be in the driver's blind spot, the positional relationship of in-cabin image G211 and vehicle exterior image G212 to be held when they are superposed on each other is determined. Then, reference image G10 is switched to auxiliary image G210.

Controller 500 causes first display device 100 to display pillar image G213 showing a pillar of vehicle 1 as an edge image. At this point, controller 500 displays, as a surround view image, vehicle exterior image G212 so as to be contained within pillar image G213. Controller 500 controls first display device 100 such that one of vehicle exterior image G212 and at least a part of pillar image G213 is displayed more emphatically relative to the other.

According to this configuration, a front view image is displayed as vehicle exterior image G212 (a surround view image) to fit within pillar image G213, and thus pillar image G213 or the surround view image can be displayed emphatically. Accordingly, pillar image G213 as well makes it possible for the driver to grasp intuitively which direction the displayed surround view image corresponds to.

In this example, in-cabin image G211 is an image captured by an in-cabin camera. Alternatively, in-cabin image G211 may be a computer graphics image stored in advance in controller 500.

Embodiment 22

Figure 43:
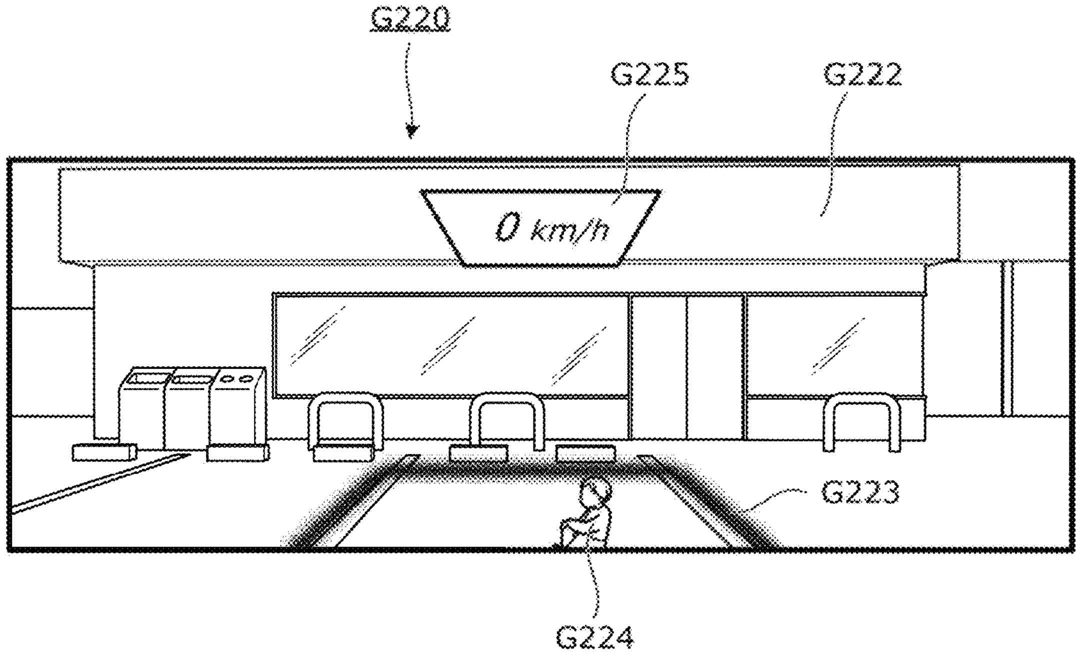
FIG. 43 is an explanatory drawing showing an auxiliary image according to Embodiment 22.

Embodiment 22 will now be described. FIG. 43 is an explanatory drawing showing auxiliary image G220 according to Embodiment 22. Auxiliary image G220 is an image showing a scene that is in the driver's blind spot created by the hood of vehicle 1.

Vehicle 1 includes a hood camera that captures an image of the outer space that is in a blind spot created by the hood. The hood camera is one example of the imager, and vehicle exterior image G222 captured by the hood camera is included in a front view image.

Controller 500 causes first display device 100 to display hood image G223 showing the hood of vehicle 1 as an edge image, along with digital speed meter G225. At this point, of vehicle exterior image G222, blind spot image G224 showing the space that is in the blind spot created by the hood serves as a surround view image, and controller 500 displays this surround view image to fit within hood image G223. Controller 500 controls first display device 100 such that one of blind spot image G224 and at least a part of hood image G223 is displayed more emphatically relative to the other.

According to this configuration, a front view image is displayed as blind spot image G224 (a surround view image) to fit within hood image G223, and thus hood image G223 or the surround view image can be displayed emphatically. Accordingly, hood image G223 as well makes it possible for the driver to grasp intuitively which direction the displayed surround view image corresponds to.

Herein, as in the case of in-cabin image G211, hood image G223 may be a computer graphics image stored in advance in controller 500.

Embodiment 23

Figure 44:
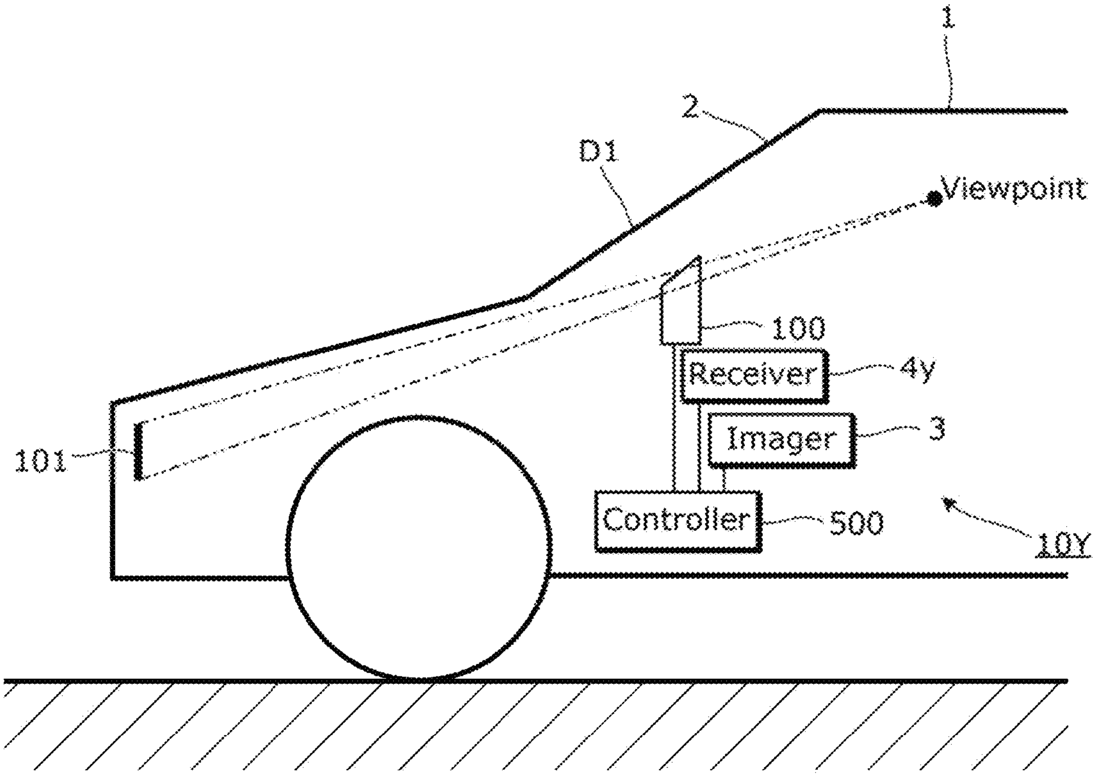
FIG. 44 is a schematic diagram showing a display system according to Embodiment 23.

Embodiment 23 will now be described. FIG. 44 is a schematic diagram showing display system 10Y according to Embodiment 23. As shown in FIG. 44, display system 10Y includes receiver 4*y* electrically connected to controller 500. Receiver 4*y* is an input device that receives from the driver a shape specification for specifying the shape of a frame image. Receiver 4*y* is, for example, a touch panel, a physical switch, or the like.

Figure 45:
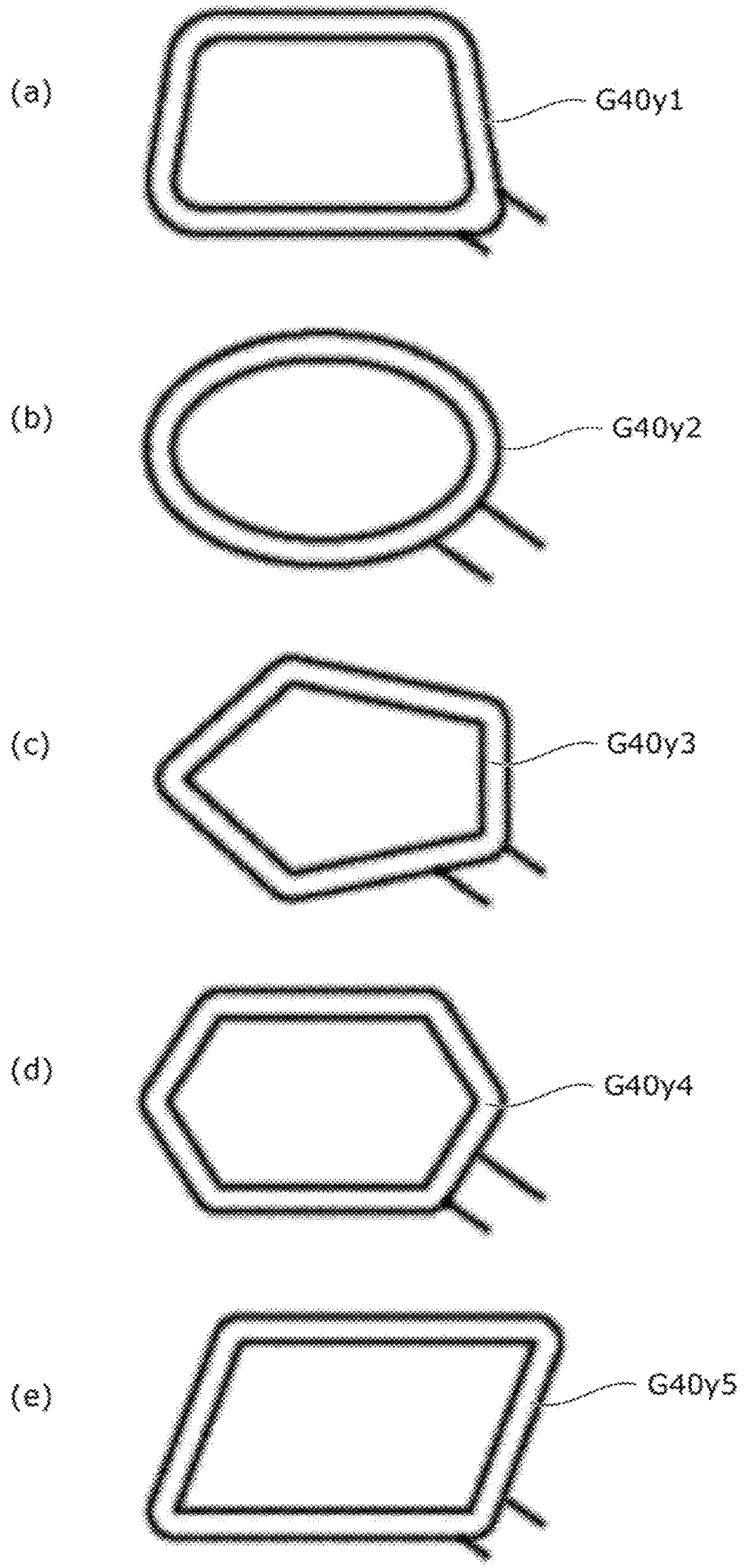
FIG. 45 is an explanatory drawing showing frame images formed based on a shape specification according to Embodiment 23.

Controller 500 controls first display device 100 such that a frame image has a shape matching the shape specification received by receiver 4*y*. FIG. 45 is an explanatory drawing showing frame images that are each displayed based on a shape specification according to Embodiment 23. Herein, (a) of FIG. 45 shows frame image G40*y*1 to be formed when the shape specification specifies a trapezoidal shape. Meanwhile, (b) of FIG. 45 shows frame image G40*y*2 to be formed when the shape specification specifies an oblong circle shape. Meanwhile, (c) of FIG. 45 shows frame image G40*y*3 to be formed when the shape specification specifies a pentagonal shape. Meanwhile, (d) of FIG. 45 shows frame image G40*y*4 to be formed when the shape specification specifies a hexagonal shape. Meanwhile, (e) of FIG. 45 shows frame image G40*y*5 to be formed when the shape specification specifies a parallelogrammic shape.

Since frame image G40*y*1, G40*y*2, G40*y*3, G40*y*4, or G40*y*5 of a side view mirror matching the shape specification received by receiver 4*y* is displayed in this manner, this configuration makes it possible to display frame image G40*y*1, G40*y*2, G40*y*3, G40*y*4, or G40*y*5 suited to the driver's preferences. Accordingly, the configuration above can increase the user-friendliness. Herein, the display of frame image G40*y*1, G40*y*2, G40*y*3, G40*y*4, or G40*y*5 matching a shape specification is not limited to a side view mirror image, and a pillar image or a hood image may also be displayed in accordance with a shape specification.

(Others)

Thus far, display systems according to one or more aspects of the present disclosure have been described based on the embodiments, but these embodiments do not limit the present disclosure. Unless departing from the spirit of the present disclosure, an embodiment obtained by making various modifications that a person skilled in the art can conceive of to the foregoing embodiments or an embodiment obtained by combining constituent elements in different embodiments may also be encompassed within the scope of the one or more aspects of the present disclosure.

For example, in the examples illustrated according to the foregoing embodiments, first display device 100 projects first virtual image 101. Alternatively, a first display device may be a display device, such as a liquid crystal display or an organic EL monitor, that, for example, displays an image. This also applies in a similar manner to the second display device.

Herein, as described according to the foregoing embodiments, an emphatic display includes displaying a surround view image emphatically by blurring at least a part of the periphery of the surround view image and displaying at least a part of the periphery of a surround view image emphatically by, for example, causing the at least part of the periphery of the surround view image to blink. In either case, an emphatic display is displayed by, with a surround view image kept unaltered, softening (blurring) the periphery of the surround view image relative to the surround view image or emphasizing (through blinking or the like) the periphery of the surround view image relative to the surround view image.

Therefore, one of a surround view image and at least a part of the periphery of the surround view image results in being displayed emphatically relative to the other.

(Supplementary Notes)

Through the foregoing description of the embodiments and so forth, the following techniques are disclosed.

[Technique 1]

A display system comprising:

a first display device that displays a display image ahead of a user in a vehicle; and a controller that causes the first display device to display a surround view image obtained by an imager that captures an image of a surrounding area of the vehicle, wherein the controller controls the first display device to display an emphatic display in which one of the surround view image displayed by the first display device or at least a part of a periphery of the surround view image is displayed more emphatically relative to an other of the surround view image displayed by the first display device or at least the part of the periphery of the surround view image.

[Technique 2]

The display system according to Technique 1, wherein the controller controls the first display device to display an emphatic display in which one of the surround view image or at least a part of an edge image surrounding the periphery of the surround view image is displayed more emphatically relative to an other of the surround view image or at least the part of an edge image surrounding the periphery of the surround view image.

[Technique 3]

The display system according to Technique 2, wherein when the controller causes the first display device to display a frame image showing a side view mirror frame of the vehicle as the edge image, the controller uses, of an image captured by the imager, a rear view image showing a space behind the vehicle as the surround view image, and causes the first display device to display the surround view image within a region corresponding to a mirror in the frame image.

[Technique 4]

The display system according to Technique 3, wherein the controller controls the first display device to blur the periphery of the surround view image to display the emphatic display.

[Technique 5]

The display system according to Technique 3 or 4, wherein the controller causes the first display device to display, along with the frame image, an arm image showing an arm extending from the side view mirror frame.

[Technique 6]

The display system according to any one of Techniques 3 to 5, wherein the controller causes the first display device to display, along with the frame image, an interior image showing an interior of the vehicle.

[Technique 7]

The display system according to any one of Techniques 3 to 6, wherein the controller causes the first display device to display the frame image in which the side view mirror frame is rendered realistically.

[Technique 8]

The display system according to any one of Techniques 3 to 7, wherein the controller causes the first display device to display, along with the frame image, a vehicle body image showing a vehicle body of the vehicle.

[Technique 9]

The display system according to any one of Techniques 3 to 8, wherein the controller causes the first display device to display, along with the frame image, a lighting image showing a lighting state of a blinker of the vehicle.

[Technique 10]

The display system according to any one of Techniques 3 to 9, wherein the controller causes the first display device to display the frame image with an aspect ratio different from an aspect ratio of the side view mirror frame.

[Technique 11]

The display system according to any one of Techniques 3 to 10, wherein the controller causes the first display device to display, of an image captured by the imager, a front view image showing a space ahead of the vehicle in a background of the frame image.

[Technique 12]

The display system according to any one of Techniques 3 to 11, wherein the controller causes the first display device to vary a background color of the frame image in accordance with an environment surrounding the vehicle.

[Technique 13]

The display system according to any one of Techniques 3 to 12, wherein the controller causes the first display device to display, of the surround view image, a front view image showing a space ahead of the vehicle next to the frame image.

[Technique 14]

The display system according to any one of Techniques 3 to 13, wherein the frame image includes a right frame image showing the side view mirror frame disposed on a right side of the vehicle, and a left frame image showing the side view mirror frame disposed on a left side of the vehicle, and the controller controls the first display device to display the right frame image on a right side and the left frame image on a left side.

[Technique 15]

The display system according to Technique 14, wherein the controller controls the first display device to display the right frame image and the left frame image in a horizontally asymmetric manner.

[Technique 16]

The display system according to Technique 14 or 15, wherein the controller controls the first display device to display the right frame image close to an upper right portion of a display region of the first display device and to display the left frame image close to an upper left portion of the display region of the first display device.

[Technique 17]

The display system according to any one of Techniques 1 to 16, wherein when an alarming object is displayed in the surround view image, the controller causes the first display device to display the alarming object emphatically.

[Technique 18]

The display system according to any one of Techniques 1 to 17, wherein the controller causes the first display device to display the surround view image that is distorted.

[Technique 19]

The display system according to any one of Techniques 1 to 18, wherein the controller causes the first display device to display, along with the surround view image, an icon showing a situation surrounding the vehicle.

[Technique 20]

The display system according to any one of Techniques 1 to 19, wherein the controller causes the first display device to display the surround view image in conjunction with navigation information for the vehicle.

[Technique 21]

The display system according to any one of Techniques 1 to 20, wherein the controller controls the first display device to use a scrolling effect when switching between a reference image and an auxiliary image including the surround view image.

[Technique 22]

The display system according to any one of Techniques 1 to 21, wherein the first display device displays the display image by projecting a first virtual image ahead of the user, and the first virtual image is positioned ahead of the first display device, as viewed from the user.

[Technique 23]

The display system according to any one of Techniques 1 to 22, further comprising:

a second display device that projects a second virtual image ahead of the user and above the display image, wherein the controller controls the second display device to project the second virtual image that includes a guiding image for guiding a gaze of the user to the surround view image.

[Technique 24]

The display system according to Technique 2, wherein the controller controls the first display device to display the edge image that differs visually between when a predetermined condition is not satisfied and when the predetermined condition is satisfied.

[Technique 25]

The display system according to Technique 24, wherein the controller controls the first display device to display the edge image that differs in size between when the predetermined condition is not satisfied and when the predetermined condition is satisfied.

[Technique 26]

The display system according to Technique 24, wherein the controller controls the first display device to display the edge image that differs in frame line thickness between when the predetermined condition is not satisfied and when the predetermined condition is satisfied.

[Technique 27]

The display system according to Technique 24, wherein the controller controls the first display device to display or not to display the edge image depending on whether the predetermined condition is satisfied.

[Technique 28]

The display system according to Technique 24, wherein the controller controls the first display device to display the edge image that differs in color between when the predetermined condition is not satisfied and when the predetermined condition is satisfied.

[Technique 29]

The display system according to Technique 24, wherein the controller controls the first display device to display the edge image that differs in background between when the predetermined condition is not satisfied and when the predetermined condition is satisfied.

[Technique 30]

The display system according to Technique 2, wherein when the controller causes the first display device to display a pillar image showing a pillar of the vehicle as the edge image, the controller uses, of an image captured by the imager, a front view image showing a space ahead of the vehicle as the surround view image, and causes the first display device to display the surround view image within the pillar image.

[Technique 31]

The display system according to Technique 2, wherein when the controller causes the display device to display a hood image showing a hood of the vehicle as the edge image, the controller uses, of an image captured by the imager, a front view image showing a space ahead of the vehicle as the surround view image, and causes the display device to display the surround view image within the hood image.

[Technique 32]

The display system according to any one of Techniques 2 to 31, further comprising:

a receiver that receives, from the user, a shape specification specifying a shape of the edge image, wherein the controller controls the first display device to display the edge image matching the shape specification received by the receiver.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2024-096377 filed on Jun. 14, 2024, and Japanese Patent Application No. 2024-193612 filed on Nov. 5, 2024.

INDUSTRIAL APPLICABILITY

The present disclosure can be used in a display system for displaying an image.

The invention claimed is:

1. A display system, comprising:

a first display device that displays a display image ahead of a user in a vehicle; and a controller that causes the first display device to display a surround view image obtained by a camera that captures an image of a surrounding area of the vehicle, wherein the controller controls the first display device to display an emphatic display in which a first one of the surround view image displayed by the first display device or at least a part of an edge image surrounding a periphery of the surround view image is displayed more emphatically relative to a second one of the surround view image displayed by the first display device or the at least the part of the edge image surrounding the periphery of the surround view image, when the controller causes the first display device to display a frame image showing a side view mirror frame of the vehicle as the edge image, the controller uses, of the image captured by the camera, a rear view image showing a space behind the vehicle as the surround view image, and causes the first display device to display the surround view image within a region corresponding to a mirror in the frame image, and the controller causes the first display device to display, of the image captured by the camera, a front view image showing a space ahead of the vehicle in a background of the frame image, superimposed on the rear view image and the frame image.

2. The display system according to claim 1, wherein the controller controls the first display device to display the emphatic display by blurring at least the part of edge image surrounding the periphery of the surround view image.

3. The display system according to claim 1, wherein the controller causes the first display device to display, along with the frame image, a lighting image showing a lighting state of a blinker of the vehicle.

4. The display system according to claim 1, wherein the controller causes the first display device to display the frame image with an aspect ratio different from an aspect ratio of the side view mirror frame.

5. The display system according to claim 1, wherein the controller causes the first display device to display, of the surround view image, a front view image showing a space ahead of the vehicle next to the frame image.

6. The display system according to claim 1, wherein the frame image includes a right frame image showing the side view mirror frame disposed on a right side of the vehicle, and a left frame image showing the side view mirror frame disposed on a left side of the vehicle, and the controller controls the first display device to display the right frame image on a right side and the left frame image on a left side.

7. The display system according to claim 1, wherein when an alarming object is displayed in the surround view image, the controller causes the first display device to display the alarming object emphatically.

8. The display system according to claim 1, wherein the controller causes the first display device to display the surround view image that is distorted.

9. The display system according to claim 1, wherein the controller causes the first display device to display, along with the surround view image, an icon showing a situation surrounding the vehicle.

10. The display system according to claim 1, wherein the controller causes the first display device to display the surround view image in conjunction with navigation information for the vehicle.

11. The display system according to claim 1, wherein the controller controls the first display device to use a scrolling effect when switching between a reference image and an auxiliary image including the surround view image.

12. The display system according to claim 1, wherein the first display device displays the display image by projecting a first virtual image ahead of the user, and the first virtual image is positioned ahead of the first display device, as viewed from the user.

13. The display system according to claim 1, further comprising:

a second display device that projects a second virtual image ahead of the user and above the display image, wherein the controller controls the second display device to project the second virtual image that includes a guiding image for guiding a gaze of the user to the surround view image.

14. The display system according to claim 1, wherein the controller controls the first display device to perform at least one of displaying at least the part of the edge image differently visually from the surround view image or displaying at least the part of the edge image differently in background between when a predetermined condition is not satisfied and when the predetermined condition is satisfied.

15. The display system according to claim 1, wherein when the controller causes the first display device to display a pillar image showing a pillar of the vehicle as the edge image, the controller uses, of the image captured by the camera, the front view image showing the space ahead of the vehicle as the surround view image, and causes the first display device to display the surround view image within the pillar image.

16. The display system according to claim 1, wherein when the controller causes the display device to display a hood image showing a hood of the vehicle as the edge image, the controller uses, of the image captured by the camera, the front view image showing the space ahead of the vehicle as the surround view image, and causes the display device to display the surround view image within the hood image.

17. The display system according to claim 1, further comprising:

a receiver that receives, from the user, a shape specification specifying a shape of the edge image, wherein the controller controls the first display device to display the edge image matching the shape specification received by the receiver.

18. A display system, comprising:

a first display device that displays a display image ahead of a user in a vehicle;

a controller that causes the first display device to display a surround view image obtained by a camera that captures an image of a surrounding area of the vehicle; and a second display device that projects a virtual image ahead of the user and above the display image, wherein the controller controls the first display device to display an emphatic display in which a first one of the surround view image displayed by the first display device or at least a part of a periphery of the surround view image is displayed more emphatically relative to a second one of the surround view image displayed by the first display device or at least the part of the periphery of the surround view image, and the controller controls the second display device to project the virtual image that includes a guiding image for guiding a gaze of the user to the surround view image.

19. A display system, comprising:

a first display device that displays a display image ahead of a user in a vehicle; and a controller that causes the first display device to display a surround view image obtained by a camera that captures an image of a surrounding area of the vehicle, wherein the controller controls the first display device to display an emphatic display in which a first one of the surround view image displayed by the first display device or at least a part of an edge image surrounding a periphery of the surround view image is displayed more emphatically relative to a second one of the surround view image displayed by the first display device or at least the part of the edge image surrounding the periphery of the surround view image, and the controller controls the first display device to perform at least one of displaying the edge image that differs visually or displaying the edge image that differs in background between when a predetermined condition is not satisfied and when the predetermined condition is satisfied.

* * * * *